United States Patent
Park et al.

(10) Patent No.: US 11,307,538 B2
(45) Date of Patent: *Apr. 19, 2022

(54) WEB SERVICES PLATFORM WITH CLOUD-EASED FEEDBACK CONTROL

(71) Applicant: Johnson Controls Technology Company, Auburn Hills, MI (US)

(72) Inventors: Youngchoon Park, Brookfield, WI (US); Sudhi R. Sinha, Milwaukee, WI (US); Vijaya S. Chennupati, Brookfield, WI (US); Vaidhyanathan Venkiteswaran, Brookfield, WI (US); Erik S. Paulson, Madison, WI (US)

(73) Assignee: JOHNSON CONTROLS TECHNOLOGY COMPANY, Auburn Hills, MI (US)

(*) Notice: Subject to any disclaimer, the term of this patent is extended or adjusted under 35 U.S.C. 154(b) by 58 days.

This patent is subject to a terminal disclaimer.

(21) Appl. No.: 16/142,578

(22) Filed: Sep. 26, 2018

(65) Prior Publication Data

US 2019/0025771 A1  Jan. 24, 2019

Related U.S. Application Data

(63) Continuation-in-part of application No. 15/644,581, filed on Jul. 7, 2017, now Pat. No. 10,169,486, and a
(Continued)

(51) Int. Cl.
*G06F 16/20* (2019.01)
*G05B 6/02* (2006.01)
(Continued)

(52) U.S. Cl.
CPC .............. *G05B 6/02* (2013.01); *G05B 15/02* (2013.01); *G06F 16/28* (2019.01);
(Continued)

(58) Field of Classification Search
None
See application file for complete search history.

(56) References Cited

U.S. PATENT DOCUMENTS

| 5,812,962 A | 9/1998 | Kovac |
| 6,240,326 B1 | 5/2001 | Gloudeman et al. |

(Continued)

FOREIGN PATENT DOCUMENTS

| AU | 2019226217 A1 | 11/2020 |
| AU | 2019226264 A1 | 11/2020 |

(Continued)

OTHER PUBLICATIONS

Chan et al. (Efficient Implementation of PID Control Algorithm using FPGA Technology, Mercy College, Department of Electrical & Computer Engineering University of Western Ontario, London, Ontario, N6A 5B9, Canada, 43rd IEEE Conference on Decision and Control, Dec. 14-17, 2004 (Year: 2004).*

(Continued)

*Primary Examiner* — Jau Shya Meng
(74) *Attorney, Agent, or Firm* — Foley & Lardner LLP

(57) ABSTRACT

A web services platform operates to monitor and control equipment of a building management system. The web services platform includes a data collector and a timeseries service. The data collector is configured to collect feedback samples provided by one or more sensors of a building management system and generate one or more feedback timeseries including a plurality of the feedback samples. The timeseries service is configured to identify a feedback control workflow that uses the feedback timeseries as an input and defines one or more processing operations to be applied to the feedback samples of the feedback timeseries, perform the one or more processing operations defined by the feedback control workflow to generate a control signal timeseries including a set of control signal samples, and provide
(Continued)

a control signal including at least one of the control signal samples or the control signal timeseries as an output to controllable building equipment of the building management system that operate using the control signal as an input.

21 Claims, 16 Drawing Sheets

Related U.S. Application Data continuation-in-part of application No. 15/644,560, filed on Jul. 7, 2017, now Pat. No. 10,417,245, and a continuation-in-part of application No. 15/644,519, filed on Jul. 7, 2017, now Pat. No. 10,095,756.

(60) Provisional application No. 62/564,247, filed on Sep. 27, 2017, provisional application No. 62/612,167, filed on Dec. 29, 2017, provisional application No. 62/457,654, filed on Feb. 10, 2017.

(51) Int. Cl.
*G06F 16/901* (2019.01)
*G05B 15/02* (2006.01)
*G06F 16/28* (2019.01)
*G05B 13/04* (2006.01)

(52) U.S. Cl.
CPC ........ *G06F 16/9024* (2019.01); *G05B 13/048* (2013.01); *G05B 2219/2642* (2013.01)

(56) References Cited

U.S. PATENT DOCUMENTS

| | | | |
|---|---|---|---|
| 6,487,457 B1 | 11/2002 | Hull et al. | |
| 6,493,755 B1 | 12/2002 | Hansen et al. | |
| 6,986,138 B1 | 1/2006 | Sakaguchi et al. | |
| 7,401,057 B2 | 7/2008 | Eder | |
| 7,552,467 B2 | 6/2009 | Lindsay | |
| 7,627,544 B2 | 12/2009 | Chkodrov et al. | |
| 7,818,249 B2 | 10/2010 | Lovejoy et al. | |
| 7,996,488 B1 | 8/2011 | Casabella et al. | |
| 8,229,470 B1 | 7/2012 | Ranjan et al. | |
| 8,401,991 B2 | 3/2013 | Wu et al. | |
| 8,495,745 B1 | 7/2013 | Schrecker et al. | |
| 8,516,016 B2 | 8/2013 | Park et al. | |
| 8,532,808 B2 | 9/2013 | Drees et al. | |
| 8,532,839 B2 | 9/2013 | Drees et al. | |
| 8,600,556 B2 | 12/2013 | Nesler et al. | |
| 8,635,182 B2 | 1/2014 | MacKay | |
| 8,682,921 B2 | 3/2014 | Park et al. | |
| 8,731,724 B2 | 5/2014 | Drees et al. | |
| 8,737,334 B2 | 5/2014 | Ahn et al. | |
| 8,751,487 B2 | 6/2014 | Byrne et al. | |
| 8,788,097 B2 | 7/2014 | Drees et al. | |
| 8,805,995 B1 | 8/2014 | Oliver | |
| 8,843,238 B2 | 9/2014 | Wenzel et al. | |
| 8,874,071 B2 | 10/2014 | Sherman et al. | |
| 8,941,465 B2 | 1/2015 | Pineau et al. | |
| 8,990,127 B2 | 3/2015 | Taylor | |
| 9,070,113 B2 | 6/2015 | Shafiee et al. | |
| 9,185,095 B1 | 11/2015 | Moritz et al. | |
| 9,196,009 B2 | 11/2015 | Drees et al. | |
| 9,229,966 B2 | 1/2016 | Aymeloglu et al. | |
| 9,286,582 B2 | 3/2016 | Drees et al. | |
| 9,344,751 B1 | 5/2016 | Ream et al. | |
| 9,354,968 B2 | 5/2016 | Wenzel et al. | |
| 9,507,686 B2 | 11/2016 | Horn et al. | |
| 9,524,594 B2 | 12/2016 | Ouyang et al. | |
| 9,558,196 B2 | 1/2017 | Johnston et al. | |
| 9,652,813 B2 | 5/2017 | Gifford et al. | |
| 9,753,455 B2 | 9/2017 | Drees | |
| 9,811,249 B2 | 11/2017 | Chen et al. | |
| 9,817,383 B1 | 11/2017 | Sinha et al. | |
| 9,886,478 B2 | 2/2018 | Mukherjee | |
| 9,948,359 B2 | 4/2018 | Horton | |
| 10,055,206 B2 | 8/2018 | Park et al. | |
| 10,169,454 B2 | 1/2019 | Ait-Mokhtar et al. | |
| 10,171,297 B2 | 1/2019 | Stewart et al. | |
| 10,171,586 B2 | 1/2019 | Shaashua et al. | |
| 10,187,258 B2 | 1/2019 | Nagesh et al. | |
| 10,564,993 B2 | 2/2020 | Deutsch et al. | |
| 10,599,478 B1 | 3/2020 | Ghare et al. | |
| 10,649,424 B2 | 5/2020 | Nixon et al. | |
| 10,760,815 B2 | 9/2020 | Janakiraman et al. | |
| 10,762,475 B2 | 9/2020 | Song et al. | |
| 10,824,120 B2 | 11/2020 | Ahmed | |
| 10,838,782 B2 | 11/2020 | Liongosari | |
| 10,845,771 B2 | 11/2020 | Harvey | |
| 10,921,760 B2 | 2/2021 | Harvey | |
| 10,969,133 B2 | 4/2021 | Harvey | |
| 11,041,650 B2 | 6/2021 | Li et al. | |
| 11,054,796 B2 | 7/2021 | Holaso | |
| 2002/0016639 A1 | 2/2002 | Smith et al. | |
| 2004/0021679 A1 | 2/2004 | Chapman et al. | |
| 2004/0128314 A1 | 7/2004 | Katibah et al. | |
| 2005/0055308 A1 | 3/2005 | Meyer et al. | |
| 2005/0154494 A1 | 7/2005 | Ahmed | |
| 2005/0278703 A1 | 12/2005 | Lo et al. | |
| 2005/0283337 A1 | 12/2005 | Sayal | |
| 2006/0200476 A1 | 9/2006 | Gottumukkala et al. | |
| 2006/0253205 A1 | 11/2006 | Gardiner | |
| 2006/0265751 A1 | 11/2006 | Cosquer et al. | |
| 2006/0271589 A1 | 11/2006 | Horowitz et al. | |
| 2007/0067062 A1 | 3/2007 | Mairs et al. | |
| 2007/0208693 A1* | 9/2007 | Chang ................ G06F 16/9024 | |
| 2007/0261062 A1 | 11/2007 | Bansal et al. | |
| 2007/0273497 A1 | 11/2007 | Kuroda et al. | |
| 2008/0034425 A1 | 2/2008 | Overcash et al. | |
| 2008/0094230 A1 | 4/2008 | Mock et al. | |
| 2008/0097816 A1 | 4/2008 | Freire et al. | |
| 2008/0186160 A1 | 8/2008 | Kim et al. | |
| 2008/0281472 A1 | 11/2008 | Podgorny et al. | |
| 2009/0195349 A1 | 8/2009 | Frader-Thompson et al. | |
| 2010/0131533 A1 | 5/2010 | Ortiz | |
| 2010/0281387 A1 | 11/2010 | Holland et al. | |
| 2010/0287130 A1 | 11/2010 | Guralnik et al. | |
| 2011/0004578 A1* | 1/2011 | Momma ................ G06N 20/00 706/12 |
| 2011/0015802 A1 | 1/2011 | Imes | |
| 2011/0047418 A1 | 2/2011 | Drees et al. | |
| 2011/0077950 A1 | 3/2011 | Hughston | |
| 2011/0087988 A1 | 4/2011 | Ray et al. | |
| 2011/0088000 A1 | 4/2011 | MacKay | |
| 2011/0125737 A1 | 5/2011 | Pothering et al. | |
| 2011/0153603 A1 | 6/2011 | Adiba et al. | |
| 2011/0191343 A1 | 8/2011 | Heaton et al. | |
| 2011/0205022 A1 | 8/2011 | Cavallaro et al. | |
| 2011/0218777 A1 | 9/2011 | Chen et al. | |
| 2012/0064923 A1 | 3/2012 | Imes et al. | |
| 2012/0100825 A1 | 4/2012 | Sherman et al. | |
| 2012/0101637 A1 | 4/2012 | Imes et al. | |
| 2012/0135759 A1 | 5/2012 | Imes et al. | |
| 2012/0158633 A1 | 6/2012 | Eder | |
| 2012/0259583 A1 | 10/2012 | Noboa et al. | |
| 2012/0278051 A1 | 11/2012 | Jiang et al. | |
| 2012/0296451 A1 | 11/2012 | Kaps et al. | |
| 2013/0007063 A1 | 1/2013 | Kalra et al. | |
| 2013/0097706 A1 | 4/2013 | Titonis et al. | |
| 2013/0103221 A1 | 4/2013 | Raman et al. | |
| 2013/0167035 A1 | 6/2013 | Imes et al. | |
| 2013/0173062 A1 | 7/2013 | Koenig-Richardson | |
| 2013/0204836 A1 | 8/2013 | Choi et al. | |
| 2013/0247205 A1 | 9/2013 | Schrecker et al. | |
| 2013/0275174 A1 | 10/2013 | Bennett et al. | |
| 2013/0298244 A1 | 11/2013 | Kumar et al. | |
| 2013/0331995 A1 | 12/2013 | Rosen | |
| 2013/0338970 A1 | 12/2013 | Reghetti | |
| 2014/0032506 A1 | 1/2014 | Hoey et al. | |
| 2014/0081652 A1 | 3/2014 | Klindworth | |
| 2014/0172184 A1 | 6/2014 | Schmidt et al. | |
| 2014/0189861 A1 | 7/2014 | Gupta et al. | |
| 2014/0269614 A1 | 9/2014 | Maguire et al. | |

(56) References Cited

U.S. PATENT DOCUMENTS

| | | |
|---|---|---|
| 2014/0278461 A1 | 9/2014 | Artz |
| 2014/0313032 A1 | 10/2014 | Sager et al. |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0148961 A1 | 5/2015 | Kim et al. |
| 2015/0156031 A1 | 6/2015 | Fadell et al. |
| 2015/0172300 A1 | 6/2015 | Cochenour |
| 2015/0185261 A1 | 7/2015 | Frader-Thompson et al. |
| 2015/0186777 A1 | 7/2015 | Lecue et al. |
| 2015/0204563 A1 | 7/2015 | Imes et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0323948 A1 | 11/2015 | Jeong et al. |
| 2015/0341212 A1 | 11/2015 | Hsiao et al. |
| 2015/0348417 A1 | 12/2015 | Ignaczak et al. |
| 2016/0023960 A1 | 1/2016 | Goodwin |
| 2016/0033946 A1 | 2/2016 | Zhu et al. |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1* | 10/2016 | Risbeck ............... G05B 15/02 |
| 2016/0313752 A1 | 10/2016 | Przybylski |
| 2016/0350364 A1 | 12/2016 | Anicic et al. |
| 2016/0357169 A1* | 12/2016 | Di Cairano .......... G05B 13/048 |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0070775 A1 | 3/2017 | Taxier et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0180147 A1 | 6/2017 | Brandman et al. |
| 2017/0188216 A1 | 6/2017 | Koskas et al. |
| 2017/0198932 A1 | 7/2017 | Sato et al. |
| 2017/0212482 A1 | 7/2017 | Boettcher et al. |
| 2017/0212668 A1 | 7/2017 | Shah et al. |
| 2017/0235817 A1 | 8/2017 | Deodhar et al. |
| 2017/0251182 A1 | 8/2017 | Siminoff et al. |
| 2017/0277769 A1 | 9/2017 | Pasupathy et al. |
| 2017/0278003 A1 | 9/2017 | Liu |
| 2017/0315697 A1 | 11/2017 | Jacobson et al. |
| 2017/0323389 A1 | 11/2017 | Vavrasek |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2019/0005025 A1 | 1/2019 | Malabarba |
| 2019/0017719 A1 | 1/2019 | Sinha et al. |
| 2019/0037135 A1 | 1/2019 | Hedge |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0158309 A1 | 5/2019 | Park et al. |
| 2019/0310979 A1 | 10/2019 | Masuzaki et al. |
| 2019/0377306 A1 | 12/2019 | Harvey |
| 2020/0159173 A1 | 5/2020 | Goyal |
| 2020/0159182 A1 | 5/2020 | Goyal |
| 2020/0159376 A1 | 5/2020 | Goyal |
| 2020/0159723 A1 | 5/2020 | Goyal |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0043221 A1 | 2/2021 | Yelchuru et al. |
| 2021/0325070 A1 | 10/2021 | Endel et al. |
| 2021/0342961 A1 | 11/2021 | Winter et al. |

FOREIGN PATENT DOCUMENTS

| | | |
|---|---|---|
| CN | 101206673 A | 6/2008 |
| CN | 101248984 A | 8/2008 |
| CN | 101478848 A | 7/2009 |
| CN | 102004859 A | 4/2011 |
| CN | 102201065 A | 9/2011 |
| CN | 104731896 A | 6/2015 |
| CN | 105659263 A | 6/2016 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 3 268 821 B1 | 1/2018 |
| JP | 2002-056054 A | 2/2002 |
| JP | 2005-050098 A | 2/2005 |
| JP | 2008-107930 A | 5/2008 |
| KR | 2016/0102923 A | 8/2016 |
| WO | WO-2009/020158 A1 | 2/2009 |
| WO | WO-2011/100255 A2 | 8/2011 |
| WO | WO-2012/110089 | 8/2012 |
| WO | WO-2015/106702 A1 | 7/2015 |
| WO | WO-2015/145648 A1 | 10/2015 |
| WO | WO-2016/020953 A1 | 2/2016 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

(56) References Cited

FOREIGN PATENT DOCUMENTS

WO  WO-2018/132112 A1  7/2018
WO  WO-2020/061621 A1  4/2020

OTHER PUBLICATIONS

Li et al., Event Stream Processing with Out-of-Order Data Arrival, International Conferences on Distributed Computing Systems, 2007, 8 pages.
Office Action for U.S. Appl. No. 15/644,519, dated Sep. 12, 2017, 9 pages.
Office Action for U.S. Appl. No. 15/644,581, dated Sep. 26, 2017, 13 pages.
Office Action for U.S. Appl. No. 15/644,560, dated Nov. 3, 2017, 24 pages.
Office Action for U.S. Appl. No. 15/644,519, dated Mar. 31, 2018, 8 pages.
Office Action for U.S. Appl. No. 15/644,560, dated May 21, 2018, 31 pages.
Notice of Allowance for U.S. Appl. No. 15/644,519, dated Jul. 26, 2018, 12 pages.
Notice of Allowance for U.S. Appl. No. 15/644,581, dated Aug. 8, 2018, 9 pages.
Balaji et al, "Brick: Towards a Unified Metadata Schema for Buildings," dated Nov. 16-17, 2016, 10 pages.
Balaji et al, Brick: Metadata schema for portable smart building applications, dated Sep. 25, 2017, 20 pages.
Balaji et al, Demo Abstract: Portable Queries Using the Brick Schema for Building Applications, dated Nov. 16-17, 2016, 2 pages.
Bhattacharya et al., Short Paper: Analyzing Metadata Schemas for Buildings—The Good, The Bad and The Ugly, ACM, dated Nov. 4-5, 2015, 4 pages.
Brick: Metadata schema for portable smart building applications, dated Sep. 15, 2018, 3 pages, (Abstract).
Brick: Towards a Unified Metadata Schema For Buildings, dated Nov. 16, 2016, 46 pages.
Building Blocks for Smart Buildings, BrickSchema.org, dated Mar. 2019, 17 pages.
Extended European Search Report issued in EP Application No. 18196948.6, dated Apr. 10, 2019, 9 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
International Search Report and Written Opinion for PCT/US2017/013831, dated Mar. 31, 2017, 14 pages.
International Search Report and Written Opinion for PCT/US2017/035524, dated Jul. 24, 2017, 14 pages.
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
Koh et al., "Scrabble: Transferrable Semi-Automated Semantic Metadata Normalization using Intermediate Representation," dated Nov. 7-8, 2018, 10 pages.
Koh et al., Plaster: An Integration, Benchmark, and Development Framework for Metadata Normalization Methods, dated Nov. 7-8, 2018, 10 pages.
Koh et al., Who can Access What, and When?, dated Nov. 13-14, 2019, 4 pages.
Metadata Schema for Buildings, Brickschema.org, Retrieved Dec. 24, 2019, 3 pages.
Results of the Partial International Search for PCT/US2018/052971, dated Jan. 3, 2019, 3 pages.
Search Report and Written Opinion for Singapore Patent App. No. 11201907381U dated Oct. 7, 2020, 9 pages.
Wei et al., "Development and Implementation of Software Gateways of Fire Fighting Subsystem Running on EBI," Control, Automation and Systems Engineering, IITA International Conference on, IEEE, Jul. 2009, pp. 9-12.
Written Opinion for Singapore Application No. 11201907381U, dated Sep. 20, 2021, 6 pages.
Chinese Office Action on CN Appl. No. 201780089444.9 dated Feb. 17, 2022 (67 pages with English language translation).

\* cited by examiner

| Raw Data Timeseries | | Average Quarter-Hour Timeseries | | Average Hourly Timeseries | | Average Daily Timeseries | |
|---|---|---|---|---|---|---|---|
| Timestamp | Value | Timestamp | Value | Timestamp | Value | Timestamp | Value |
| 2015-12-31T23:10:00 | 10 | 2015-12-31T23:00:00 | 10 | 2015-12-31T23:00:00 | 28.8 | 2015-12-31T23:00:00 | 28.8 |
| 2015-12-31T23:20:01 | 20 | 2015-12-31T23:15:00 | 20 | | | | |
| 2015-12-31T23:30:02 | 30 | 2015-12-31T23:30:00 | 35 | | | | |
| 2015-12-31T23:40:03 | 40 | 2015-12-31T23:45:00 | 50 | | | | |
| 2015-12-31T23:50:04 | 50 | 2016-01-01T00:00:00 | 65 | 2016-01-01T00:00:00 | 87.5 | 2016-01-01T00:00:00 | 87.5 |
| 2016-01-01T00:00:05 | 60 | 2016-01-01T00:15:00 | 80 | | | | |
| 2016-01-01T00:10:06 | 70 | 2016-01-01T00:30:00 | 95 | | | | |
| 2016-01-01T00:20:07 | 80 | 2016-01-01T00:45:00 | 110 | | | | |
| 2016-01-01T00:30:08 | 90 | | | | | | |
| 2016-01-01T00:40:09 | 100 | | | | | | |
| 2016-01-01T00:50:10 | 110 | | | | | | |

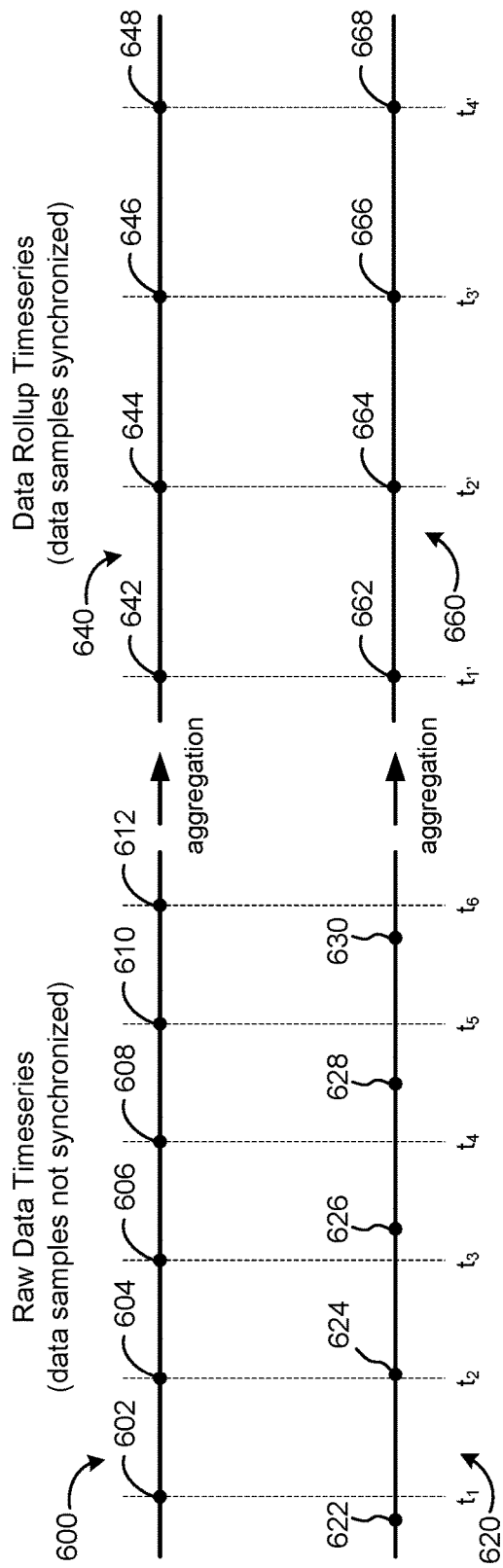
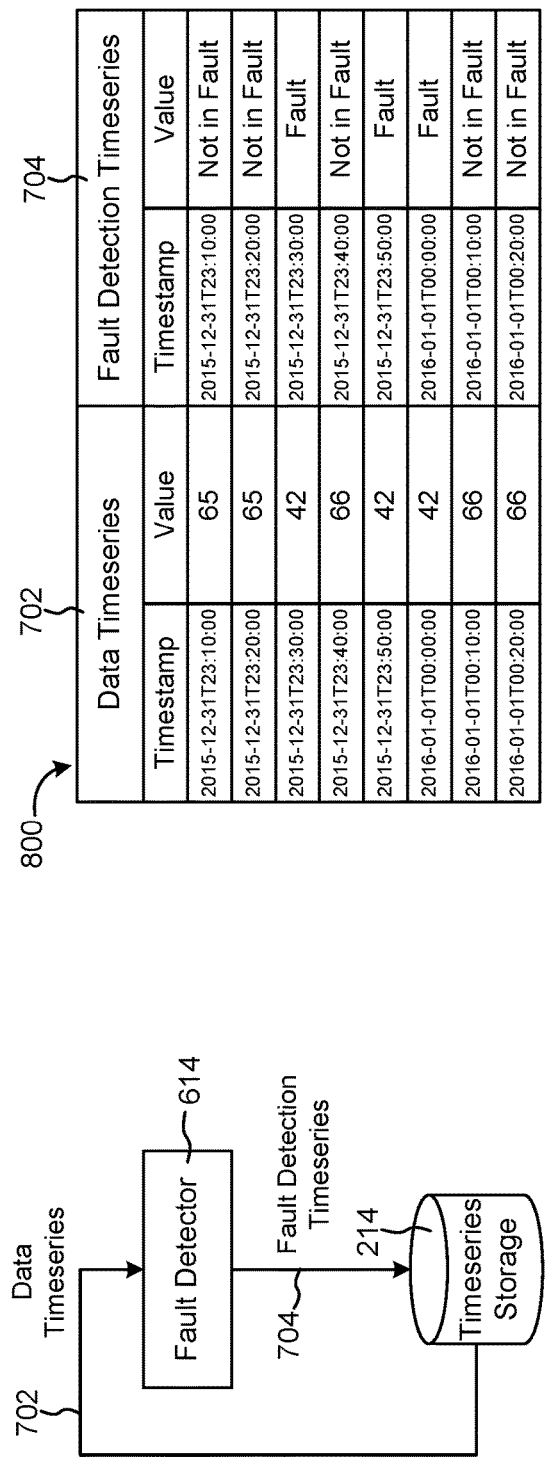
FIG. 6
FIG. 7
FIG. 8

| Event ID | Start Time | End Time | State |
|---|---|---|---|
| 1 | 00:00 | 01:59 | Cold |
| 2 | 02:00 | 08:59 | Cool |
| 3 | 09:00 | 11:59 | Warm |
| 4 | 12:00 | 15:59 | Hot |
| 5 | 16:00 | 18:59 | Warm |
| 6 | 19:00 | 21:59 | Cool |
| 7 | 22:00 | 23:59 | Cold |

| Timestamp | OAT | State |
|---|---|---|
| 00:00 | 43 | Cold |
| 01:00 | 48 | Cold |
| 02:00 | 51 | Cool |
| 03:00 | 54 | Cool |
| 04:00 | 57 | Cool |
| 05:00 | 60 | Cool |
| 06:00 | 65 | Cool |
| 07:00 | 69 | Cool |
| 08:00 | 76 | Cool |
| 09:00 | 83 | Warm |
| 10:00 | 94 | Warm |
| 11:00 | 99 | Warm |
| 12:00 | 108 | Hot |
| 13:00 | 110 | Hot |
| 14:00 | 110 | Hot |
| 15:00 | 106 | Hot |
| 16:00 | 98 | Warm |
| 17:00 | 91 | Warm |
| 18:00 | 81 | Warm |
| 19:00 | 74 | Cool |
| 20:00 | 65 | Cool |
| 21:00 | 54 | Cool |
| 22:00 | 48 | Cold |
| 23:00 | 44 | Cold |

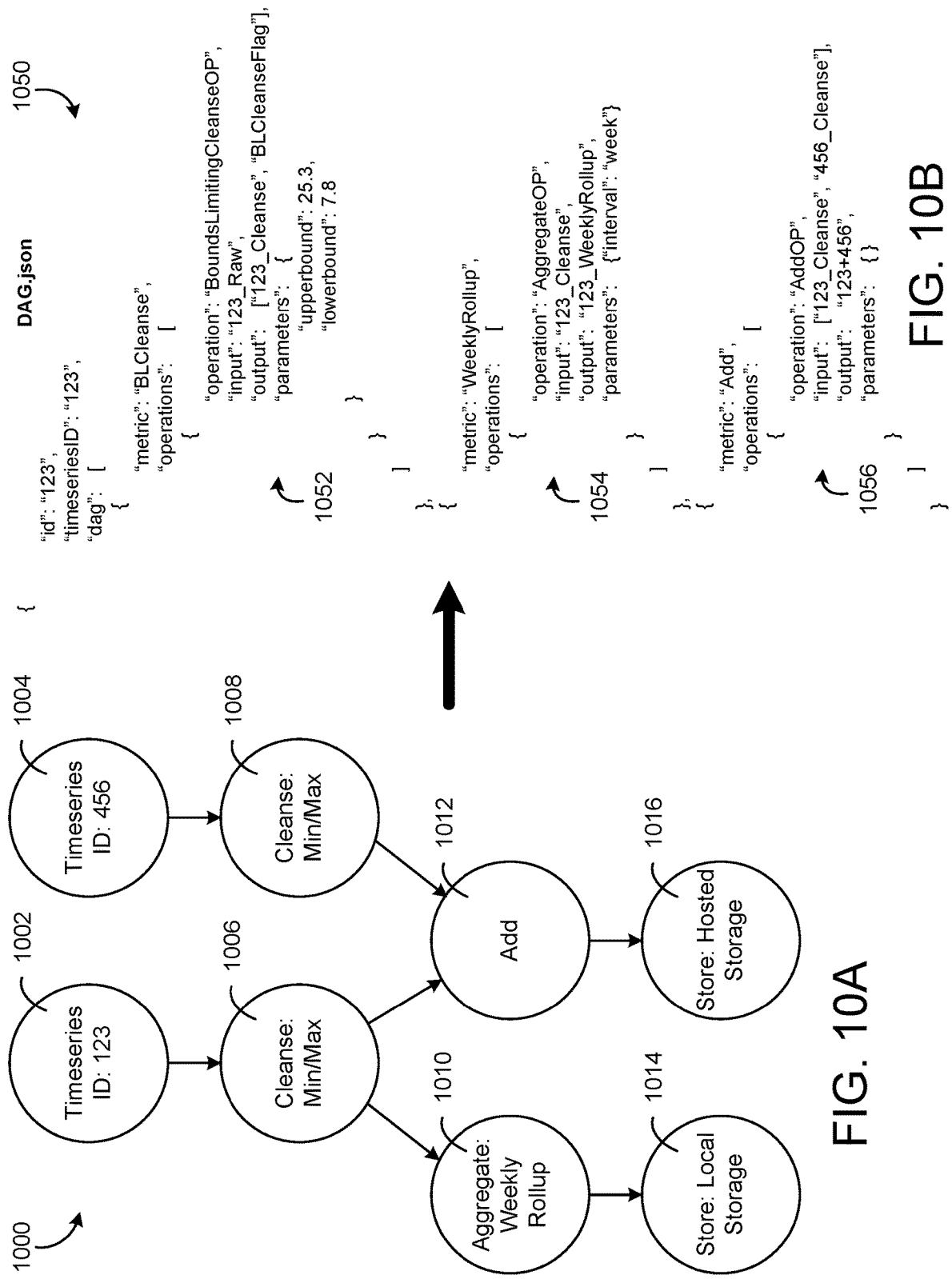

WEB SERVICES PLATFORM WITH CLOUD-EASED FEEDBACK CONTROL

CROSS-REFERENCE TO RELATED PATENT APPLICATIONS

This application claims the benefit of and priority to U.S. Provisional Patent Application No. 62/564,247 filed Sep. 27, 2017, and U.S. Provisional Patent Application No. 62/612,167 filed Dec. 29, 2017. This application is also a continuation-in-part of U.S. patent application Ser. No. 15/644,519 filed Jul. 7, 2017, which claims the benefit of and priority to U.S. Provisional Patent Application No. 62/457,654 filed Feb. 10, 2017. This application is also a continuation-in-part of U.S. patent application Ser. No. 15/644,581 filed Jul. 7, 2017, which claims the benefit of and priority to U.S. Provisional Patent Application No. 62/457,654 filed Feb. 10, 2017. This application is also a continuation-in-part of U.S. patent application Ser. No. 15/644,560 filed Jul. 7, 2017, which claims the benefit of and priority to U.S. Provisional Patent Application No. 62/457,654 filed Feb. 10, 2017. The entire disclosure of each of these patent applications is incorporated by reference herein.

BACKGROUND

The present disclosure relates generally to a web services platform and more particularly to a web services platform configured to ingest, process, and store timeseries data.

A web services platform can collect data from sensors and other types of networked devices (e.g., IoT devices). Data can be collected over time and combined into streams of timeseries data. Each sample of the timeseries data can include a timestamp and a data value. Some web services platforms store raw timeseries data in a relational database without significant organization or processing at the time of data collection. Applications that consume the timeseries data are typically responsible for retrieving the raw timeseries data from the database and generating views of the timeseries data that can be presented via a chart, graph, or other user interface. These processing steps are typically performed in response to a request for the timeseries data, which can significantly delay data presentation at query time.

SUMMARY

One implementation of the present disclosure is a web services platform monitoring and controlling equipment of a building management system. The web services platform includes a data collector and a timeseries service. The data collector is configured to collect feedback samples provided by one or more sensors of a building management system and generate one or more feedback timeseries including a plurality of the feedback samples. The timeseries service is configured to identify a feedback control workflow that uses the feedback timeseries as an input and defines one or more processing operations to be applied to the feedback samples of the feedback timeseries, perform the one or more processing operations defined by the feedback control workflow to generate a control signal timeseries including a set of control signal samples, and provide a control signal including at least one of the control signal samples or the control signal timeseries as an output to controllable building equipment of the building management system that operate using the control signal as an input.

In some embodiments, the sensors include at least one of a temperature sensor, a humidity sensor, a lighting sensor, an air quality sensor, or an occupancy sensor configured to sense an environmental condition within a building space. In some embodiments, the sensors include at least one of a temperature sensor, a flow rate sensor, an enthalpy sensor, or a voltage sensor configured to sense an operating state or condition of central plant equipment within a central plant. In some embodiments, the data sources include internet of things (IoT) devices. In some embodiments, the controllable building equipment include at least one of HVAC equipment, security equipment, lighting equipment, or access control equipment installed within a building.

In some embodiments, generating the control signal timeseries includes transforming one or more samples of the feedback timeseries into one or more samples of the control signal samples by applying the one or more samples of the feedback timeseries as an input to the feedback control workflow and assembling the control samples to form the control signal timeseries.

In some embodiments, the timeseries service is configured to identify one or more other timeseries required as inputs to the feedback control workflow and generate an enriched feedback control workflow including the feedback control workflow, the feedback timeseries, and the one or more other timeseries. In some embodiments, the one or more other timeseries include a setpoint timeseries including a plurality of setpoint samples, each of the setpoint samples defining a setpoint corresponding to one of the feedback samples.

In some embodiments, the web services platform includes a timeseries database that stores a plurality of timeseries. The timeseries service may include a timeseries identifier configured to identify the feedback timeseries from the plurality of timeseries stored in the timeseries database.

In some embodiments, the web services platform includes a directed acyclic graph (DAG) database storing a plurality of feedback DAGs. Each of the DAGs may define a feedback control workflow. In some embodiments, the timeseries service includes a DAG identifier configured to determine whether any of the feedback control DAGs stored in the DAG database use the feedback timeseries as an input.

In some embodiments, the timeseries service is distributed across multiple systems or devices.

In some embodiments, the feedback control workflow includes at least one of a state-based control workflow, an extremum seeking control (ESC) workflow, a proportional-integral (PI) control workflow, a proportional-integral-derivative (PID) control workflow, or a model predictive control (MPC) workflow that causes the timeseries service to transform the feedback timeseries into the control signal timeseries using a feedback control technique.

In some embodiments, the feedback control workflow comprises a proportional-integral-derivative (PID) control workflow that causes the timeseries service to generate an error timeseries that includes a plurality of error samples. Each of the error samples may indicate a difference between one or the feedback samples and a corresponding setpoint. The PID control workflow may cause the timeseries service to generate the control signal timeseries by applying a set of PID control operations to the error timeseries.

In some embodiments, applying the set of PID control operations to the error timeseries includes generating an integrated error timeseries based on a plurality of the error samples and generating a derivative error timeseries based on a change in value between consecutive samples of the error timeseries.

In some embodiments, applying the set of PID control operations to the error timeseries includes calculating a proportional gain component by multiplying the error timeseries by a proportional gain parameter, calculating an integral gain component by multiplying the integrated error timeseries by an integral gain parameter, calculating a derivative gain component by multiplying the derivative error timeseries by a derivative gain parameter, and combining the proportional gain component, the integral gain component, and the derivative gain component to generate the control signal timeseries.

Another implementation of the present disclosure is web services platform for monitoring and controlling equipment of a building management system. The web services platform includes one or more computer-readable storage media having instructions stored thereon that, when executed by one or more processors, cause the one or more processors to collect feedback samples provided by one or more sensors of the building management system and generate one or more feedback timeseries including a plurality of the feedback samples, identify a feedback control workflow that uses the feedback timeseries as an input and defines one or more processing operations to be applied to the feedback samples of the feedback timeseries, perform the one or more processing operations defined by the feedback control workflow to generate a control signal timeseries including a set of control signal samples, and provide a control signal including at least one of the control signal samples or the control signal timeseries as an output to controllable building equipment of the building management system that operate using the control signal as an input.

In some embodiments, the sensors include at least one of a temperature sensor, a humidity sensor, a lighting sensor, an air quality sensor, or an occupancy sensor configured to sense an environmental condition within a building space. In some embodiments, the sensors include at least one of a temperature sensor, a flow rate sensor, an enthalpy sensor, or a voltage sensor configured to sense an operating state or condition of central plant equipment within a central plant. In some embodiments, the data sources include internet of things (IoT) devices. In some embodiments, the controllable building equipment include at least one of HVAC equipment, security equipment, lighting equipment, or access control equipment installed within a building.

In some embodiments, generating the control signal timeseries includes transforming one or more samples of the feedback timeseries into one or more samples of the control signal samples by applying the one or more samples of the feedback timeseries as an input to the feedback control workflow and assembling the control samples to form the control signal timeseries.

In some embodiments, the instructions cause the one or more processors to identify one or more other timeseries required as inputs to the feedback control workflow and generate an enriched feedback control workflow including the feedback control workflow, the feedback timeseries, and the one or more other timeseries. In some embodiments, the one or more other timeseries include a setpoint timeseries including a plurality of setpoint samples, each of the setpoint samples defining a setpoint corresponding to one of the feedback samples.

In some embodiments, the web services platform includes a timeseries database that stores a plurality of timeseries. In some embodiments, the instructions cause the one or more processors to identify the feedback timeseries from the plurality of timeseries stored in the timeseries database.

In some embodiments, the web services platform includes a directed acyclic graph (DAG) database storing a plurality of feedback DAGs, each of the DAGs defining a feedback control workflow. In some embodiments, the instructions cause the one or more processors to determine whether any of the feedback control DAGs stored in the DAG database use the feedback timeseries as an input.

In some embodiments, the one or more processors are distributed across multiple systems or devices.

In some embodiments, the feedback control workflow includes at least one of a state-based control workflow, an extremum seeking control (ESC) workflow, a proportional-integral (PI) control workflow, a proportional-integral-derivative (PID) control workflow, or a model predictive control (MPC) workflow that causes the one or more processors to transform the feedback timeseries into the control signal timeseries using a feedback control technique.

In some embodiments, the feedback control workflow comprises a proportional-integral-derivative (PID) control workflow that causes the one or more processors to generate an error timeseries that includes a plurality of error samples. Each of the error samples may indicate a difference between one or the feedback samples and a corresponding setpoint. The PID control workflow may cause the one or more processors to generate the control signal timeseries by applying a set of PID control operations to the error timeseries.

In some embodiments, applying the set of PID control operations to the error timeseries includes generating an integrated error timeseries based on a plurality of the error samples and generating a derivative error timeseries based on a change in value between consecutive samples of the error timeseries.

In some embodiments, applying the set of PID control operations to the error timeseries includes calculating a proportional gain component by multiplying the error timeseries by a proportional gain parameter, calculating an integral gain component by multiplying the integrated error timeseries by an integral gain parameter, calculating a derivative gain component by multiplying the derivative error timeseries by a derivative gain parameter, and combining the proportional gain component, the integral gain component, and the derivative gain component to generate the control signal timeseries.

Another implementation of the present disclosure is a method for monitoring and controlling equipment of a building management system. The method includes collecting feedback samples provided by one or more sensors of the building management system and generating one or more feedback timeseries including a plurality of the feedback samples, identifying a feedback control workflow that uses the feedback timeseries as an input and defines one or more processing operations to be applied to the feedback samples of the feedback timeseries, performing the one or more processing operations defined by the feedback control workflow to generate a control signal timeseries including a set of control signal samples, and providing a control signal including at least one of the control signal samples or the control signal timeseries as an output to controllable building equipment of the building management system that operate using the control signal as an input.

In some embodiments, the sensors include at least one of a temperature sensor, a humidity sensor, a lighting sensor, an air quality sensor, or an occupancy sensor configured to sense an environmental condition within a building space. In some embodiments, the sensors include at least one of a temperature sensor, a flow rate sensor, an enthalpy sensor, or a voltage sensor configured to sense an operating state or condition of central plant equipment within a central plant. In some embodiments, the data sources include internet of things (IoT) devices. In some embodiments, the controllable building equipment include at least one of HVAC equipment, security equipment, lighting equipment, or access control equipment installed within a building.

In some embodiments, generating the control signal timeseries includes transforming one or more samples of the feedback timeseries into one or more samples of the control signal samples by applying the one or more samples of the feedback timeseries as an input to the feedback control workflow and assembling the control samples to form the control signal timeseries and assembling the control samples to form the control signal timeseries.

In some embodiments, the method includes identifying one or more other timeseries required as inputs to the feedback control workflow and generating an enriched feedback control workflow including the feedback control workflow, the feedback timeseries, and the one or more other timeseries. In some embodiments, the one or more other timeseries include a setpoint timeseries including a plurality of setpoint samples, each of the setpoint samples defining a setpoint corresponding to one of the feedback samples.

In some embodiments, the method includes accessing a timeseries database that stores a plurality of timeseries and identifying the feedback timeseries from the plurality of timeseries stored in the timeseries database.

In some embodiments, the method includes accessing a directed acyclic graph (DAG) database that stores a plurality of feedback DAGs, each of the DAGs defining a feedback control workflow, and determining whether any of the feedback control DAGs stored in the DAG database use the feedback timeseries as an input.

In some embodiments, the one or more processing operations defined by the feedback control workflow are distributed across multiple systems or devices.

In some embodiments, the feedback control workflow includes at least one of a state-based control workflow, an extremum seeking control (ESC) workflow, a proportional-integral (PI) control workflow, a proportional-integral-derivative (PID) control workflow, or a model predictive control (MPC) workflow that causes the feedback timeseries to be transformed into the control signal timeseries using a feedback control technique.

In some embodiments, the feedback control workflow comprises a proportional-integral-derivative (PID) control workflow. Performing the one or more processing operations defined by the feedback control workflow may include generating an error timeseries that includes a plurality of error samples. Each of the error samples may indicate a difference between one or the feedback samples and a corresponding setpoint. Performing the one or more processing operations defined by the feedback control workflow may include generating the control signal timeseries by applying a set of PID control operations to the error timeseries.

In some embodiments, applying the set of PID control operations to the error timeseries includes generating an integrated error timeseries based on a plurality of the error samples and generating a derivative error timeseries based on a change in value between consecutive samples of the error timeseries.

In some embodiments, applying the set of PID control operations to the error timeseries includes calculating a proportional gain component by multiplying the error timeseries by a proportional gain parameter, calculating an integral gain component by multiplying the integrated error timeseries by an integral gain parameter, calculating a derivative gain component by multiplying the derivative error timeseries by a derivative gain parameter, and combining the proportional gain component, the integral gain component, and the derivative gain component to generate the control signal timeseries.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 6 is a drawing of several timeseries illustrating the synchronization of data samples which can be performed by the data aggregator shown in FIG. 3, according to some embodiments.

FIG. 7 is a flow diagram illustrating the creation and storage of a fault detection timeseries which can be performed by the fault detector shown in FIG. 3, according to some embodiments.

FIG. 8 is a data table which can be used to store the raw data timeseries and the fault detection timeseries, according to some embodiments.

FIG. 9A is a data table which can be used to store states assigned to samples of a data timeseries, according to some embodiments.

FIG. 9B is a data table including various events generated based on the assigned states shown in the table of FIG. 9A, according to some embodiments.

FIG. 10A is a directed acyclic graph (DAG) which can be generated by the DAG generator of FIG. 3, according to some embodiments.

FIG. 10B is a code snippet which can be automatically generated by the DAG generator of FIG. 3 based on the DAG, according to some embodiments.

DETAILED DESCRIPTION

Overview

Figure 1:
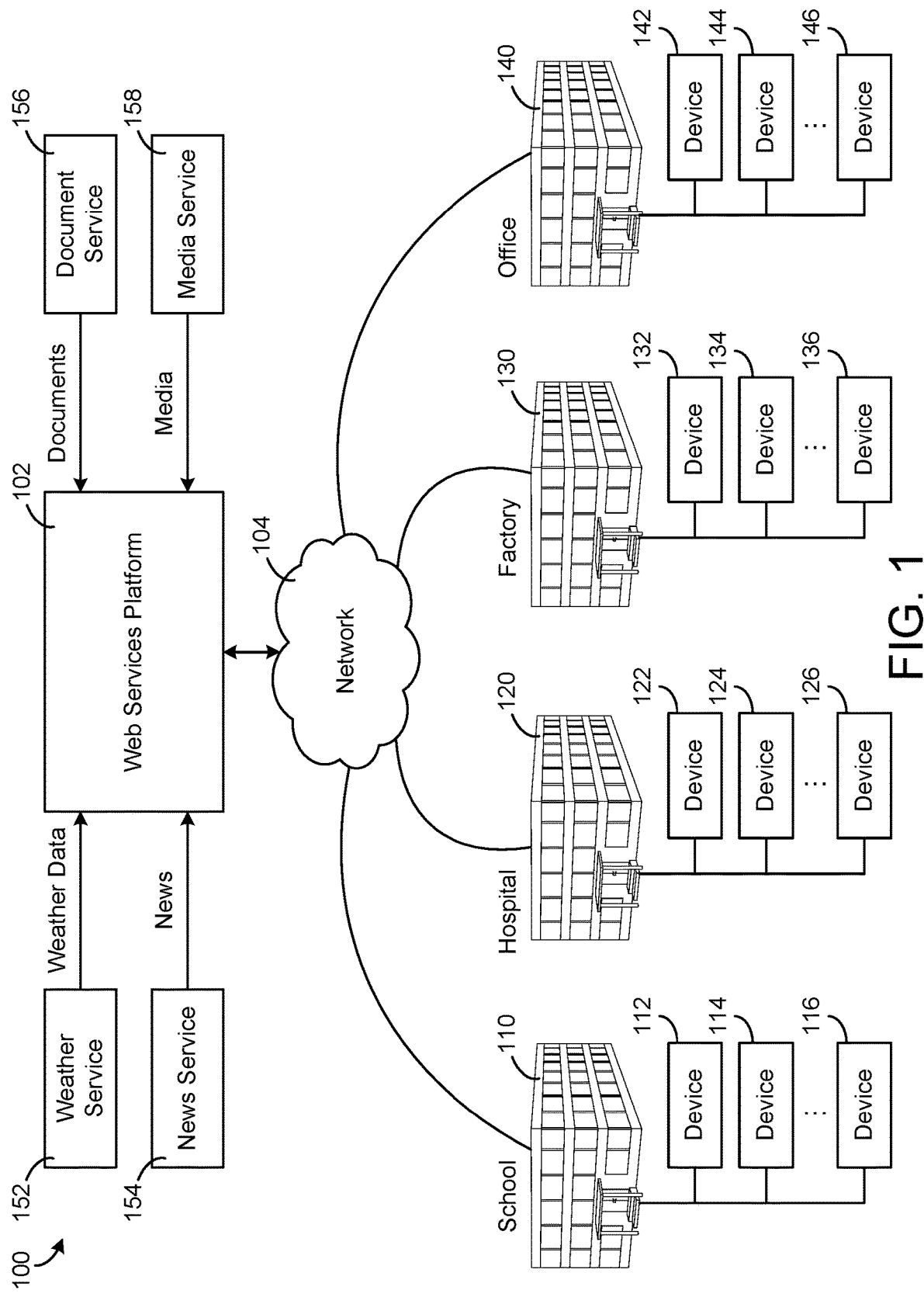
FIG. 1 is a block diagram of a web services system including a web services platform, according to some embodiments.

Referring generally to the FIGURES, a web services platform with nested stream generation is shown, according to various embodiments. The web services platform is configured to collect data samples from a variety of data sources (e.g., sensors, controllable devices, IoT devices, etc.) and generate raw timeseries data from the data samples. The web services platform can process the raw timeseries data using a variety of platform services to generate derived timeseries data (e.g., data rollup timeseries, virtual point timeseries, fault detection timeseries, etc.). The derived timeseries data can be provided to various applications and/or stored in local or hosted storage. In some embodiments, the web services platform includes three different layers that separate (1) data collection, (2) data storage, retrieval, and analysis, and (3) data visualization. This allows the web services platform to support a variety of applications that use the derived timeseries data and allows new applications to reuse the infrastructure provided by the platform services.

In some embodiments, the web services platform includes a data collector configured to collect raw data samples from the data sources. The data collector can generate a raw data timeseries including a plurality of the raw data samples and store the raw data timeseries in the timeseries database. In some embodiments, the data collector stores each of the raw data samples with a timestamp. The timestamp can include a local time indicating the time at which the raw data sample was collected in whichever time zone the raw data sample was collected. The timestamp can also include a time offset indicating a difference between the local time and universal time. The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs.

In some embodiments, the platform services include a sample aggregator. The sample aggregator can aggregate predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by the data aggregator provide an efficient mechanism for various applications to query the timeseries data. For example, the applications can construct visualizations of the timeseries data (e.g., charts, graphs, etc.) using the pre-aggregated data rollups instead of the raw timeseries data. This allows the applications to simply retrieve and present the pre-aggregated data rollups without requiring applications to perform an aggregation in response to the query. Since the data rollups are pre-aggregated, the applications can present the data rollups quickly and efficiently without requiring additional processing at query time to generate aggregated timeseries values.

In some embodiments, the platform services include a virtual point calculator. The virtual point calculator can calculate virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, the virtual point calculator can calculate a virtual data point (pointID$_3$) by adding two or more actual data points (pointID$_1$ and pointID$_2$) (e.g., pointID$_3$=pointID$_1$+pointID$_2$). As another example, the virtual point calculator can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

Applications can access and use the virtual data points in the same manner as the actual data points. The applications do not need to know whether a data point is an actual data point or a virtual data point since both types of data points can be stored as derived timeseries data and can be handled in the same manner by the applications. In some embodiments, the derived timeseries data are stored with attributes designating each data point as either a virtual data point or an actual data point. Such attributes allow the applications to identify whether a given timeseries represents a virtual data point or an actual data point, even though both types of data points can be handled in the same manner by the applications.

In some embodiments, the platform services include a fault detector configured to analyze the timeseries data to detect faults. Fault detection can be performed by applying a set of fault detection rules to the timeseries data to determine whether a fault is detected at each interval of the timeseries. Fault detections can be stored as derived timeseries data. For example, new timeseries can be generated with data values that indicate whether a fault was detected at each interval of the timeseries. The time series of fault detections can be stored along with the raw timeseries data and/or derived timeseries data in local or hosted data storage.

In some embodiments, the web services platform collects feedback samples (e.g., measurements, samples of monitored variables, system states, values of points, etc.) from sensors of a building management system. The web services platform uses the feedback samples as an input to a cloud-based feedback control algorithm (e.g., PID, MPC, etc.) that uses the feedback samples to generate control signal samples. In some embodiments, the web services platform treats the feedback samples as samples of an input timeseries and processes the input timeseries using a feedback control workflow. The feedback control workflow converts the feedback samples into control signal samples, which are a type of derived timeseries samples. The control signal samples are then provided as a control signal to controllable equipment of the building management system. These and other features of the web services platform are described in greater detail below.

Web Services System

Referring now to FIG. 1, a block diagram of a web services system 100 is shown, according to an exemplary embodiment. Web services system 100 is shown to include a web services platform 102. Web services platform 102 can be configured to collect data from a variety of different data sources. For example, web services platform 102 is shown collecting data from a variety of devices 112-116, 122-126, 132-136, and 142-146. In some embodiments, devices 112-116, 122-126, 132-136, and 142-146 are internet of things (IoT) devices. Several examples of IoT devices which can provide data to web services platform 102 are described in detail with reference to FIG. 2. While the devices described herein are generally referred to as IoT devices, it should be understood that, in various embodiments, the devices references in the present disclosure could be any type of devices capable to communication of data over an electronic network.

Web services platform 102 can collect data from a variety of external systems or services. For example, web services platform 102 is shown receiving weather data from a weather service 152, news data from a news service 154, documents and other document-related data from a document service 156, and media (e.g., video, images, audio, social media, etc.) from a media service 158. In some embodiments, web services platform 102 generates data internally. For example, web services platform 102 may include a web advertising system, a website traffic monitoring system, a web sales system, or other types of platform services that generate data. The data generated by web services platform 102 can be collected, stored, and processed along with the data received from other data sources. Web services platform 102 can collect data directly from external systems or devices or via a network 104 (e.g., a WAN, the Internet, a cellular network, etc.). Web services platform 102 can process and transform collected data to generate timeseries data and entity data. Several features of web services platform 102 are described in detail below.

Web Services Platform

Figure 2:
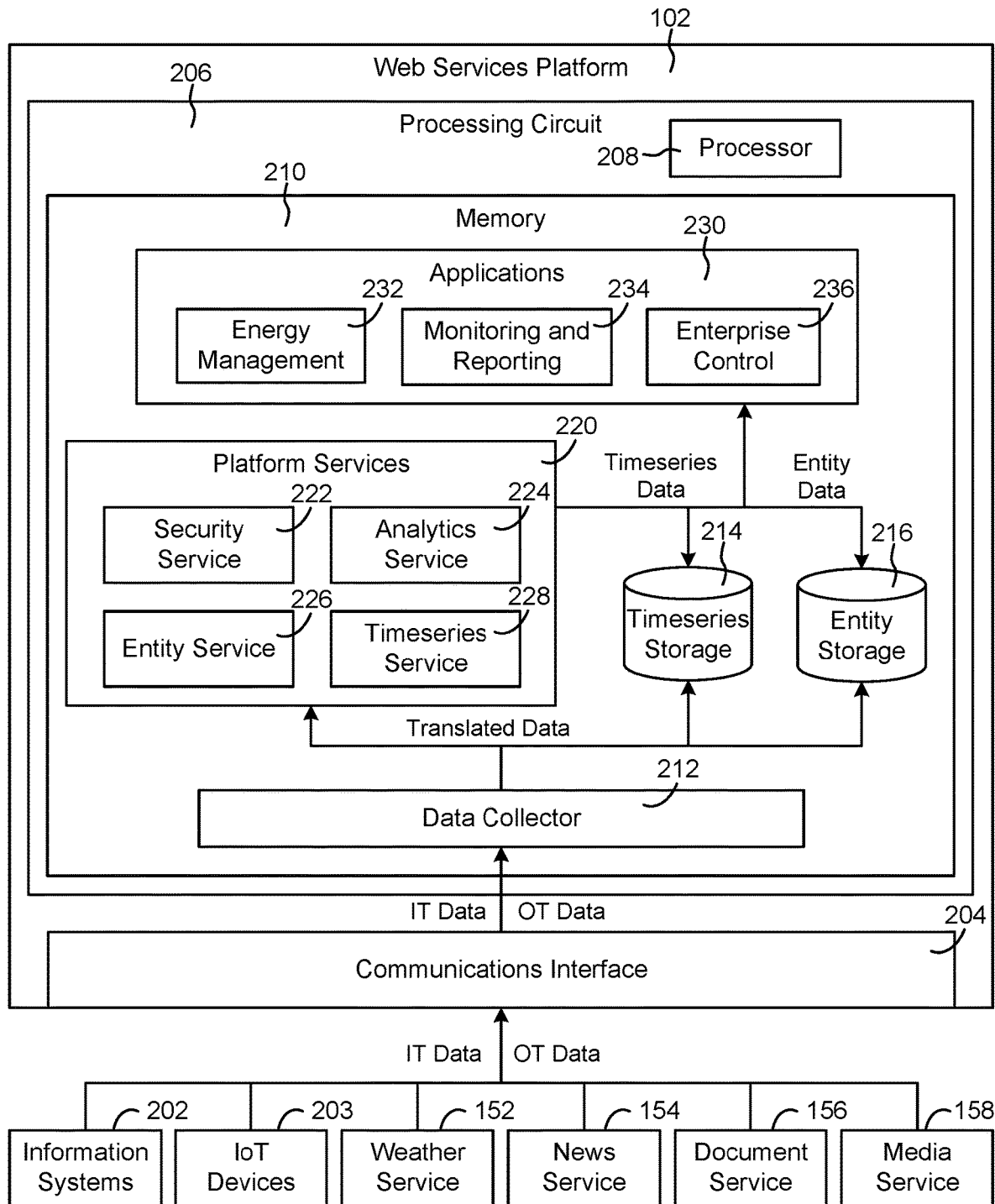
FIG. 2 is a block diagram illustrating the web services platform of FIG. 1 in greater detail including a data collector, platform services, and applications, according to some embodiments.

Referring now to FIG. 2, a block diagram illustrating web services platform 102 in greater detail is shown, according to some embodiments. Web services platform 102 can be configured to collect data from a variety of different data sources. For example, web services platform 102 is shown collecting data from information systems 202, internet of things (IoT) devices 203, weather service 152, news service 154, document service 156, and media service 158. In some embodiments, web services platform 102 separates data collection/ingestion; data storage, retrieval, and analysis; and data visualization into three different layers. This allows web services platform 102 to support a variety of applications 230 that use the data and allows new applications 230 to reuse the existing infrastructure provided by platform services 220.

Information systems 202 can also include any type of system configured to manage information associated with any of a variety of devices, systems, people and/or the activities thereof. For example, information systems 202 can include a human resources (HR) system, an accounting system, a payroll system, a customer relationship management (CRM) system, a marketing system, an enterprise resource planning system, or any other type of system that can be used to manage devices, systems, people, and/or the information associated therewith.

IoT devices 203 may include any of a variety of physical devices, sensors, actuators, electronics, vehicles, home appliances, and/or other items having network connectivity which enable IoT devices 203 to communicate with web services platform 102. For example, IoT devices 203 can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. In some embodiments, IoT devices 203 include some or all of devices 112-116, 122-126, 132-136, and 142-146, as described with reference to FIG. 1.

Weather service 152, news service 154, document service 156, and media service 158 may be the same as previously described. For example, weather service 152 can be configured to provide weather data to web services platform 102. News service 154 can be configured to provide news data to web services platform 102. Document service 156 can be configured to provide documents and other document-related data to web services platform 102. Media service 158 can be configured to provide media (e.g., video, images, audio, social media, etc.) to web services platform 102. In some embodiments, media service 158 includes an internet-based advertising system or click tracking system. For example, media service 158 can provide event data to web services platform 102 in response to a web server delivering a webpage, advertisement, or receiving a click from a user. Web services platform 102 can be configured to ingest, process, store, and/or publish data from these and any of a variety of other data sources.

Web services platform 102 is shown receiving two main types of data: information technology (IT) data and operational technology (OT) data. IT data may include data that describes various entities (e.g., people, spaces, devices, etc.) and the relationships therebetween. For example, IT data may include an entity graph that describes the relationships between spaces, equipment, and other entities (e.g., person A owns device B, device B controls device C, sensor D provides input to device C, person E is part of employee team F, floor G contains room C, etc.). IT data may include human resources data that describes a set of employees and includes details about the employees (e.g., name, employee ID, job title/role, responsibilities, payroll information, address, etc.). IT data may include IoT device information (e.g., device locations, descriptions, device relationships, etc.), and/or other information that provides context for the data received by web services platform 102 or describes the entities managed by web services platform 102. In some embodiments, IT data is preexisting/static and can be provided to web services platform 102 as a batch. However, it is contemplated that IT data can be updated after it has been created if changes occur to the entities or relationships described by the IT data.

As used herein, the term "static" refers to data, characteristics, attributes, or other information that does not change over time or change infrequently. For example, a device name or address may be referred to as a static characteristic of the device because it does not change frequently. However, should be understood that "static" items are not limited to permanently fixed information. Some types of static items may change occasionally or infrequently. For example, a device address may be a type of static attribute that can be changed if desired but is not expected to change frequently. Static data is contrasted with dynamic data that is expected to change relatively frequently.

OT data may include data that is generated and/or updated in real-time as a result of operating the systems and devices that provide data to web services platform 102. For example, OT data may include timeseries data received from IoT devices 203 (e.g., sensor measurements, status indications, alerts, notifications, etc.), weather information received from weather service 152, a news feed received from news service 154, document updates received from document service 156, media updates received from media service 158, and/or other types of telemetry data. In general, OT data can be described as real-time operational data, dynamic data, or streaming data, whereas IT data can be described as institutional or contextual data that is not continuously updated. For example, the OT data associated with a particular sensor may include measurements from the sensor, whereas the IT data associated with the sensor may include the sensor name, sensor type, and sensor location.

Web services platform 102 can process and transform/translate the OT data and IT data using platform services 220 to generate timeseries data and entity data. Throughout this disclosure, the term "raw timeseries data" is used to describe the raw data samples of OT data received by web services platform 102. The term "derived timeseries data" is used to describe the result or output of a transformation or other timeseries processing operation performed by platform services 220 (e.g., data aggregation, data cleansing, virtual point calculation, etc.). The raw timeseries data and derived timeseries data can be provided to various applications 230 and/or stored in timeseries storage 214 (e.g., as materialized views of the raw timeseries data). The term "entity data" is used to describe the attributes of various entities (e.g., people, spaces, things, etc.) and relationships between entities. The entity data can be created by platform services 220 as a result of processing the IT data and/or OT data received by web services platform 102 and can be stored in entity storage 216.

Before discussing web services platform 102 in greater detail, it should be noted that the components of web services platform 102 can be integrated within a single device (e.g., a web server, a supervisory controller, a computing system, etc.) or distributed across multiple separate systems or devices. For example, the components of web services platform 102 can be implemented as part of a cloud computing platform configured to receive and process data from multiple IoT devices and other data sources. In other embodiments, the components of web services platform 102 can be implemented as part of a suite of cloud-hosted services. In other embodiments, some or all of the components of web services platform 102 can be components of a subsystem level controller, a plant controller, a device controller, a field controller, a computer workstation, a client device, or any other system or device that receives and processes data from IoT devices or other data sources.

Still referring to FIG. 2, web services platform 102 is shown to include a communications interface 204. Communications interface 204 can include wired or wireless communications interfaces (e.g., jacks, antennas, transmitters, receivers, transceivers, wire terminals, etc.) for conducting data communications with information systems 202, IoT devices 203, weather service 152, news service 154, document service 156, media service 158, or other external systems or devices. Communications conducted via communications interface 204 can be direct (e.g., local wired or wireless communications) or via a communications network 104 (e.g., a WAN, the Internet, a cellular network, etc.).

Communications interface 204 can facilitate communications between web services platform 102 and external applications (e.g., remote systems and applications) for allowing user control, monitoring, and adjustment to web services platform 102 and/or the devices that communicate with web services platform 102. Communications interface 204 can also facilitate communications between web services platform 102 and client devices (e.g., computer workstations, laptop computers, tablets, mobile devices, etc.). Web services platform 102 can be configured to communicate with external systems and devices using any of a variety of communications protocols (e.g., HTTP(S), WebSocket, CoAP, MQTT, etc.), industrial control protocols (e.g., MTConnect, OPC, OPC-UA, etc.), process automation protocols (e.g., HART, Profibus, etc.), home automation protocols, or any of a variety of other protocols. Advantageously, web services platform 102 can receive, ingest, and process data from any type of system or device regardless of the communications protocol used by the system or device.

Web services platform 102 is shown to include a processing circuit 206 including a processor 208 and memory 210. Processor 208 can be a general purpose or specific purpose processor, an application specific integrated circuit (ASIC), one or more field programmable gate arrays (FPGAs), a group of processing components, or other suitable processing components. Processor 208 is configured to execute computer code or instructions stored in memory 210 or received from other computer readable media (e.g., CDROM, network storage, a remote server, etc.).

Memory 210 can include one or more devices (e.g., memory units, memory devices, storage devices, etc.) for storing data and/or computer code for completing and/or facilitating the various processes described in the present disclosure. Memory 210 can include random access memory (RAM), read-only memory (ROM), hard drive storage, temporary storage, non-volatile memory, flash memory, optical memory, or any other suitable memory for storing software objects and/or computer instructions. Memory 210 can include database components, object code components, script components, or any other type of information structure for supporting the various activities and information structures described in the present disclosure. Memory 210 can be communicably connected to processor 208 via processing circuit 206 and can include computer code for executing (e.g., by processor 208) one or more processes described herein. When processor 208 executes instructions stored in memory 210, processor 208 generally configures processing circuit 206 to complete such activities.

In some embodiments, web services platform 102 includes a plurality of processors, memories, interfaces, and other components distributed across multiple devices or systems. For example, in a cloud-based or distributed implementation, web services platform 102 may include multiple discrete computing devices, each of which includes a processor 208, memory 210, communications interface 204, data collector 212, and/or other components of web services platform 102. Tasks performed by web services platform 102 can be distributed across multiple systems or devices, which may be located within a single building or facility or distributed across multiple buildings or facilities. In some embodiments, multiple data collectors 212 are implemented using different processors, computing devices, servers, and/or other components and carry out portions of the features described herein.

Still referring to FIG. 2, web services platform 102 is shown to include a data collector 212. Data collector 212 can receive the IT data and OT data via communications interface 204 and can provide translated IT data and OT data to platform services 220, timeseries storage 214, and/or entity storage 216. For example, data collector 212 can be configured to translate the incoming IT data and OT data from a protocol or format used by the data sources into a protocol or format used by platform services 220. In some embodiments, the OT data include timestamps and data values for various data points. The data values can be measured or calculated values, depending on the type of data point. For example, a data point received from a temperature sensor can include a measured data value indicating a temperature measured by the temperature sensor. A data point received from a device controller can include a calculated data value indicating a calculated efficiency of the device. Data collector 212 can receive data samples from multiple different devices.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, pressure sensor, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to web services platform 102. For example, data samples received via a first protocol can include a variety of descriptive attributes along with the data value, whereas data samples received via the second protocol may include a lesser number of attributes (e.g., only the data value without any corresponding attributes).

In some embodiments, each data sample is received with a timestamp indicating a time at which the corresponding data value was measured or calculated. In other embodiments, data collector 212 adds timestamps to the data samples based on the times at which the data samples are received. Data collector 212 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 212 is as follows:

[<key, timestamps, value$_1$>, <key, timestamp$_2$, value$_2$>, <key, timestamp$_3$, value$_3$>]

where key is an identifier of the source of the raw data samples (e.g., timeseries ID, sensor ID, etc.), timestamp$_i$ identifies the time at which the ith sample was collected, and value$_i$ indicates the value of the ith sample.

Data collector 212 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 212 organizes the raw timeseries data. Data collector 212 can identify a system or device associated with each of the data points. For example, data collector 212 can associate a data point with an IoT device, a sensor, a networking device, or any other type of system or device. In various embodiments, data collector 212 uses the name of the data point, a range of values of the data point, statistical characteristics of the data point, or other attributes of the data point to identify a particular system or device associated with the data point. Data collector 212 can then determine how that system or device relates to the other systems or devices. For example, data collector 212 can determine that the identified system or device is part of a larger system (e.g., a vehicle control system) or is associated with a particular space (e.g., a particular factory, a room or zone of the factory, etc.). In some embodiments, data collector 212 uses or creates an entity graph when organizing the timeseries data. An example of such an entity graph is described in greater detail with reference to FIG. 12.

In some embodiments, data collector 212 uses the IT data and OT data to update the attributes of various entities. As described above, an entity is a virtual representation (e.g., a data object) of a person, space, system, device, or thing that provides data to web services platform 102. For example, a vehicle entity may be a virtual representation of a physical vehicle (e.g., a car, truck, airplane, boat, etc.). The vehicle entity may include a variety of attributes that describe the vehicle. For example, the vehicle may include a "location"

attribute that describes where the vehicle is located, a "contains" attribute that identifies one or more systems or devices of equipment contained within the vehicle, a "temperature" attribute that indicates the current air temperature within the vehicle, an "occupancy" attribute that indicates whether the vehicle is occupied or unoccupied, or any of a variety of other attributes. Data collector 212 can use the OT data to update the values of the attributes of various entities each time a new data sample or event is received. Similarly, data collector 212 can use the IT data to update the values of the attributes of various entities when the relationships between entities or other attributes indicated by the IT data changes. In other embodiments, entity attributes are updated by entity service 226 of platform services 220.

Data collector 212 can provide the timeseries data and entity data to platform services 220 and/or store the timeseries data and entity data in timeseries storage 214 and entity storage 216, respectively. In some embodiments, timeseries storage 214 and entity storage 216 can be data storage internal to web services platform 102 (e.g., within memory 210) or other on-site data storage local to the location at which the IT data and OT data are collected. In other embodiments, timeseries storage 214 and entity storage 216 can include a remote database, cloud-based data hosting, or other remote data storage. For example, timeseries storage 214 and entity storage 216 can include remote data storage located off-site relative to the location at which the IT data and OT data are collected. Timeseries storage 214 can be configured to store the raw timeseries data obtained by data collector 212, and/or the derived timeseries data generated by platform services 220. Similarly, entity storage 216 can be configured to store the IT data and OT data collected by data collector 212 and/or the entity data generated by platform services 220. Directed acyclic graphs (DAGs) used by platform services 220 to process the timeseries data can be stored in DAG storage 330 (shown in FIG. 3).

Still referring to FIG. 2, web services platform 102 is shown to include platform services 220. Platform services 220 can receive the translated IT data and OT data from data collector 212 and/or retrieve the timeseries data and entity data from timeseries storage 214 and entity storage 216. Platform services 220 can include a variety of services configured to analyze, process, and transform the IT data and OT data to create timeseries data and entity data. For example, platform services 220 are shown to include a security service 222, an analytics service 224, an entity service 226, and a timeseries service 228. Security service 222 can assign security attributes to the IT data and OT data to ensure that the IT data and OT data are only accessible to authorized individuals, systems, or applications.

Analytics service 224 can use the translated IT data and OT data as inputs to various analytics (e.g., fault detection, energy consumption, web traffic, revenue, etc.) to derive an analytic result from the IT data and OT data. Analytics service 224 can apply a set of fault detection rules to the IT data and OT data to determine whether a fault is detected at each interval of a timeseries. Fault detections can be stored as derived timeseries data. For example, analytics service 224 can generate a new fault detection timeseries with data values that indicate whether a fault was detected at each interval of the timeseries. The fault detection timeseries can be stored as derived timeseries data along with the raw timeseries data in timeseries storage 214.

Entity service 226 can use the translated IT data and OT data provided by data collector 212 to create or update the attributes of various entities managed by web services platform 102. Some entity attributes may be the most recent value of a data point provided to web services platform 102 as OT data. For example, the "temperature" attribute of a vehicle entity may be the most recent value of a temperature data point provided by a temperature sensor located in the vehicle. Entity service 226 can use the IT data to identify the temperature sensor located in the vehicle and can use the OT data associated with the identified temperature sensor to update the "temperature" attribute each time a new sample of the temperature data point is received. As another example, a "most recent view" attribute of a webpage entity may indicate the most recent time at which the webpage was viewed. Entity service 226 can use the OT data from a click tracking system or web server to determine when the most recent view occurred and can update the "most recent view" attribute accordingly.

Other entity attributes may be the result of an analytic, transformation, calculation, or other processing operation based on the OT data and IT data. For example, entity service 226 can use the IT data to identify an access control device (e.g., an electronic lock, a keypad, etc.) at the entrance/exit of a vehicle. Entity service 226 can use OT data received from the identified access control device to track the number of occupants entering and exiting the vehicle. Entity service 226 can update a "number of occupants" attribute of an entity representing the vehicle each time a person enters or exits the vehicle such that the "number of occupants" attribute reflects the current number of occupants within the vehicle. As another example, a "total revenue" attribute associated with a product line entity may be the summation of all the revenue generated from sales of the corresponding product. Entity service 226 can use the OT data received from a sales tracking system (e.g., a point of sale system, an accounting database, etc.) to determine when a sale of the product occurs and identify the amount of revenue generated by the sale. Entity service 226 can then update the "total revenue" attribute by adding the most recent sales revenue to the previous value of the attribute.

In some embodiments, entity service 226 uses IT data and/or OT data from multiple different data sources to update the attributes of various entities. For example, an entity representing a person may include a "risk" attribute that quantifies the person's level of risk attributable to various physical, environmental, or other conditions. Entity service 226 can use OT data from a card reader or IT data from a human resources system to determine the physical location of the person at any given time. Entity service 226 can use weather data from weather service 152 to determine whether any severe weather is approaching the person's location. Similarly, entity service 226 can use emergency data from news service 154 or media service 158 to determine whether the person's location is experiencing any emergency conditions (e.g., active shooter, police response, fire response, etc.). Entity service 226 can use data from information systems 202 to determine whether the person's location is experiencing any emergency conditions (e.g., fire, building lockdown, etc.) or environmental hazards (e.g., detected air contaminants, pollutants, extreme temperatures, etc.) that could increase the person's level of risk. Entity service 226 can use these and other types of data as inputs to a risk function that calculates the value of the person's "risk" attribute and can update the person entity accordingly.

Still referring to FIG. 2, timeseries service 228 can apply various transformations, operations, or other functions to the raw timeseries data provided by data collector 212 to generate derived timeseries data. In some embodiments, timeseries service 228 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 228 provide an efficient mechanism for applications 230 to query the timeseries data. For example, applications 230 can construct visualizations of the timeseries data (e.g., charts, graphs, etc.) using the pre-aggregated data rollups instead of the raw timeseries data. This allows applications 230 to simply retrieve and present the pre-aggregated data rollups without requiring applications 230 to perform an aggregation in response to the query. Since the data rollups are pre-aggregated, applications 230 can present the data rollups quickly and efficiently without requiring additional processing at query time to generate aggregated timeseries values.

In some embodiments, timeseries service 228 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 228 can calculate a virtual data point (pointID$_3$) by adding two or more actual data points (pointID$_1$ and pointID$_2$) (e.g., pointID$_3$=pointID$_1$+pointID$_2$). As another example, timeseries service 228 can calculate an enthalpy data point (pointID$_4$) based on a measured temperature data point (pointID$_2$) and a measured pressure data point (pointID$_6$) (e.g., pointID$_4$=enthalpy(pointID$_2$, pointID$_6$)). The virtual data points can be stored as derived timeseries data.

Applications 230 can access and use the virtual data points in the same manner as the actual data points. Applications 230 do not need to know whether a data point is an actual data point or a virtual data point since both types of data points can be stored as derived timeseries data and can be handled in the same manner by applications 230. In some embodiments, the derived timeseries are stored with attributes designating each data point as either a virtual data point or an actual data point. Such attributes allow applications 230 to identify whether a given timeseries represents a virtual data point or an actual data point, even though both types of data points can be handled in the same manner by applications 230.

Still referring to FIG. 2, web services platform 102 is shown to include several applications 230 including an energy management application 232, monitoring and reporting applications 234, and enterprise control applications 236. Although only a few applications 230 are shown, it is contemplated that applications 230 can include any of a variety of applications configured to use the derived timeseries generated by platform services 220. In some embodiments, applications 230 exist as a separate layer of web services platform 102 (i.e., separate from platform services 220 and data collector 212). This allows applications 230 to be isolated from the details of how the IT data and OT data are collected and how the timeseries data and entity data are generated. In other embodiments, applications 230 can exist as remote applications that run on remote systems or devices (e.g., remote systems and applications, client devices, etc.).

Applications 230 can use the derived timeseries data to perform a variety data visualization, monitoring, and/or control activities. For example, energy management application 232 and monitoring and reporting application 234 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 236 can use the derived timeseries data to perform various control activities. For example, enterprise control application 236 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for IoT devices 203.

Timeseries Platform Service

Figure 3:
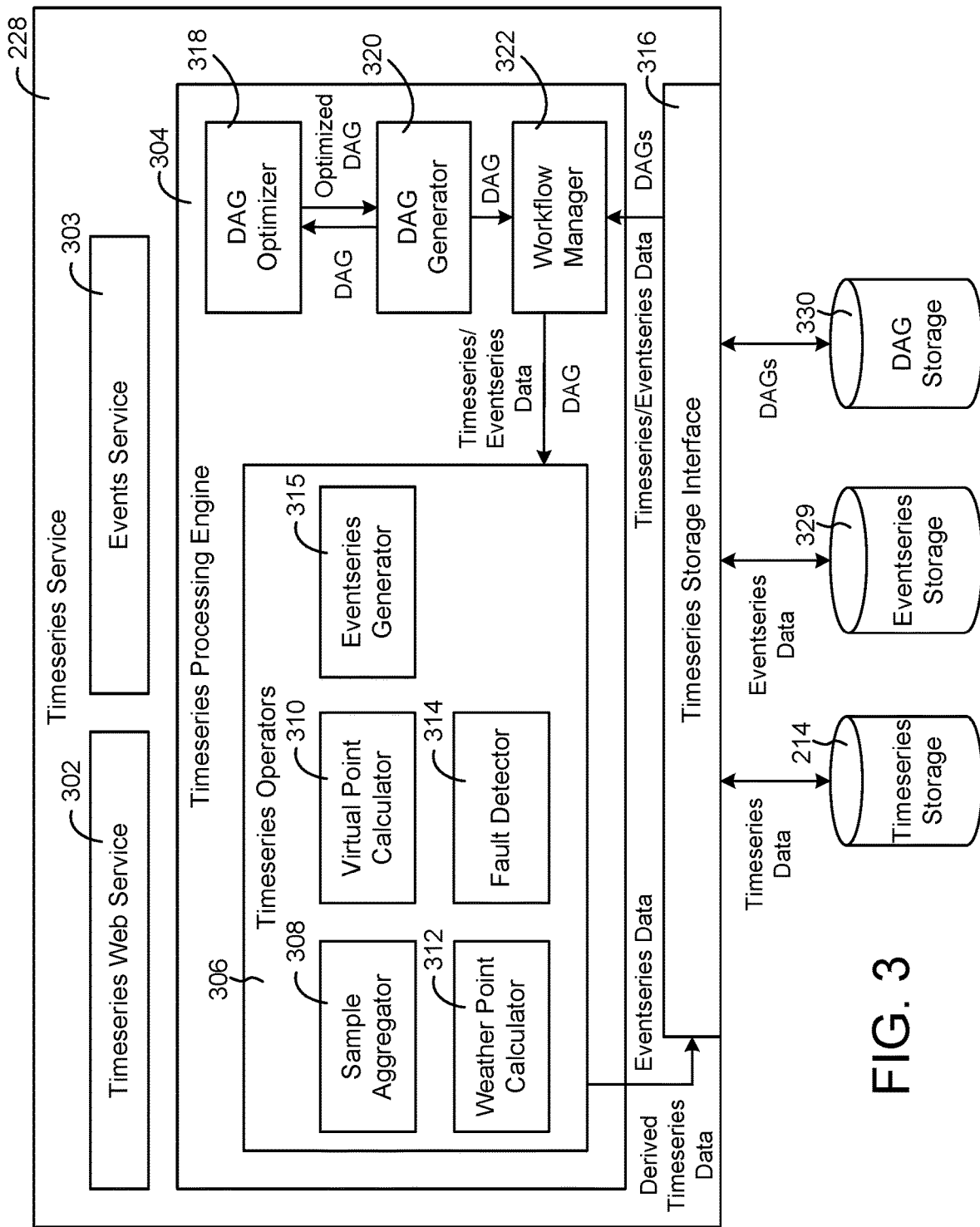
FIG. 3 is a block diagram of a timeseries service which can be implemented as some of the platform services shown in FIG. 2, according to some embodiments.

Referring now to FIG. 3, a block diagram illustrating timeseries service 228 in greater detail is shown, according to some embodiments. Timeseries service 228 is shown to include a timeseries web service 302, an events service 303, a timeseries processing engine 304, and a timeseries storage interface 316. Timeseries web service 302 can be configured to interact with web-based applications to send and/or receive timeseries data. In some embodiments, timeseries web service 302 provides timeseries data to web-based applications. For example, if one or more of applications 230 are web-based applications, timeseries web service 302 can provide derived timeseries data and raw timeseries data to the web-based applications. In some embodiments, timeseries web service 302 receives raw timeseries data from a web-based data collector. For example, if data collector 212 is a web-based application, timeseries web service 302 can receive data samples or raw timeseries data from data collector 212.

Timeseries storage interface 316 can be configured to store and read samples of various timeseries (e.g., raw timeseries data and derived timeseries data) and eventseries (described in greater detail below). Timeseries storage interface 316 can interact with timeseries storage 214, eventseries storage 329, and/or DAG storage 330. In some embodiments, timeseries storage interface 316 can read samples from timeseries storage 214 from a specified start time or start position in the timeseries to a specified stop time or a stop position in the timeseries. Similarly, timeseries storage interface 316 can retrieve eventseries data from eventseries storage 329. Timeseries storage interface 316 can also store timeseries data in timeseries storage 214 and can store eventseries data in eventseries storage 329. Advantageously, timeseries storage interface 316 provides a consistent interface which enables logical data independence.

In some embodiments, timeseries storage interface 316 stores timeseries as lists of data samples, organized by time. For example, timeseries storage interface 316 can store timeseries in the following format:
[<key, timestamp$_1$, value$_1$>, <key, timestamp$_2$, value$_2$>, <key, timestamp$_3$, value$_3$>]
where key is an identifier of the source of the data samples (e.g., timeseries ID, sensor ID, etc.), timestamp$_i$ identifies a time associated with the ith sample, and value$_i$ indicates the value of the ith sample.

In some embodiments, timeseries storage interface 316 stores eventseries as lists of events having a start time, an end time, and a state. For example, timeseries storage interface 316 can store eventseries in the following format:

[<eventID$_1$, start_timestamp$_1$, end_timestamp$_1$, state$_1$>, . . . , <eventID$_N$, start_timestamp$_N$, end_timestamp$_N$, state$_N$>]

where eventID$_i$ is an identifier of the ith event, start_timestamp$_i$ is the time at which the ith event started, end_timestamp$_i$ is the time at which the ith event ended, state$_i$ describes a state or condition associated with the ith event (e.g., cold, hot, warm, etc.), and N is the total number of events in the eventseries.

In some embodiments, timeseries storage interface 316 stores timeseries and eventseries in a tabular format. Timeseries storage interface 316 can store timeseries and eventseries in various tables having a column for each attribute of the timeseries/eventseries samples (e.g., key, timestamp, value). The timeseries tables can be stored in timeseries storage 214, whereas the eventseries tables can be stored in eventseries storage 329. In some embodiments, timeseries storage interface 316 caches older data in timeseries storage 214 but stores newer data in RAM. This may improve read performance when the newer data are requested for processing.

In some embodiments, timeseries storage interface 316 omits one or more of the attributes when storing the timeseries samples. For example, timeseries storage interface 316 may not need to repeatedly store the key or timeseries ID for each sample in the timeseries. In some embodiments, timeseries storage interface 316 omits timestamps from one or more of the samples. If samples of a particular timeseries have timestamps at regular intervals (e.g., one sample each minute), timeseries storage interface 316 can organize the samples by timestamps and store the values of the samples in a row. The timestamp of the first sample can be stored along with the interval between the timestamps. Timeseries storage interface 316 can determine the timestamp of any sample in the row based on the timestamp of the first sample and the position of the sample in the row.

In some embodiments, timeseries storage interface 316 stores one or more samples with an attribute indicating a change in value relative to the previous sample value. The change in value can replace the actual value of the sample when the sample is stored in timeseries storage 214. This allows timeseries storage interface 316 to use fewer bits when storing samples and their corresponding values. Timeseries storage interface 316 can determine the value of any sample based on the value of the first sample and the change in value of each successive sample.

In some embodiments, timeseries storage interface 316 creates containers or data objects in which samples of timeseries data and/or eventseries data can be stored. The containers can be JSON objects or other types of containers configured to store one or more timeseries samples and/or eventseries samples. Timeseries storage interface 316 can be configured to add samples to the containers and read samples from the containers. For example, timeseries storage interface 316 can receive a set of samples from data collector 212, timeseries web service 302, events service 303, and/or timeseries processing engine 304. Timeseries storage interface 316 can add the set of samples to a container and send the container to timeseries storage 214.

Timeseries storage interface 316 can use containers when reading samples from timeseries storage 214. For example, timeseries storage interface 316 can retrieve a set of samples from timeseries storage 214 and add the samples to a container. In some embodiments, the set of samples include all samples within a specified time period (e.g., samples with timestamps in the specified time period) or eventseries samples having a specified state. Timeseries storage interface 316 can provide the container of samples to timeseries web service 302, events service 303, timeseries processing engine 304, applications 230, and/or other components configured to use the timeseries/eventseries samples.

Still referring to FIG. 3, timeseries processing engine 304 is shown to include several timeseries operators 306. Timeseries operators 306 can be configured to apply various operations, transformations, or functions to one or more input timeseries to generate output timeseries and/or eventseries. The input timeseries can include raw timeseries data and/or derived timeseries data. Timeseries operators 306 can be configured to calculate aggregate values, averages, or apply other mathematical operations to the input timeseries. In some embodiments, timeseries operators 306 generate virtual point timeseries by combining two or more input timeseries (e.g., adding the timeseries together), creating multiple output timeseries from a single input timeseries, or applying mathematical operations to the input timeseries. In some embodiments, timeseries operators 306 perform data cleansing operations or deduplication operations on an input timeseries. In some embodiments, timeseries operators 306 use the input timeseries to generate eventseries based on the values of the timeseries samples (described in greater detail below). The output timeseries can be stored as derived timeseries data in timeseries storage 214. Similarly, the eventseries can be stored as eventseries data in eventseries storage 329.

In some embodiments, timeseries operators 306 do not change or replace the raw timeseries data, but rather generate various "views" of the raw timeseries data. The views can be queried in the same manner as the raw timeseries data. For example, samples can be read from the raw timeseries data, transformed to create the view, and then provided as an output. Because the transformations used to create the views can be computationally expensive, the views can be stored as "materialized views" in timeseries storage 214. These materialized views are referred to as derived timeseries data throughout the present disclosure.

Timeseries operators 306 can be configured to run at query time (e.g., when a request for derived timeseries data is received) or prior to query time (e.g., when new raw data samples are received, in response to a defined event or trigger, etc.). This flexibility allows timeseries operators 306 to perform some or all of their operations ahead of time and/or in response to a request for specific derived data timeseries. For example, timeseries operators 306 can be configured to pre-process one or more timeseries that are read frequently to ensure that the timeseries are updated whenever new data samples are received. However, timeseries operators 306 can be configured to wait until query time to process one or more timeseries that are read infrequently to avoid performing unnecessary processing operations.

In some embodiments, timeseries operators 306 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in DAG storage 330, or internally within timeseries processing engine 304. DAGs can be retrieved by workflow manager 322 and used to determine how and when to process incoming data samples. Exemplary systems and methods for creating and using DAGs are described in greater detail below.

Timeseries operators 306 can perform aggregations for dashboards, cleansing operations, logical operations for rules and fault detection, machine learning predictions or classifications, call out to external services, or any of a variety of other operations which can be applied to timeseries data. The operations performed by timeseries operators 306 are not limited to sensor data. Timeseries operators 306 can also operate on event data or function as a billing engine for a consumption or tariff-based billing system.

Sample Aggregation

Still referring to FIG. 3, timeseries operators 306 are shown to include a sample aggregator 308. Sample aggregator 308 can be configured to generate derived data rollups from the raw timeseries data. For each data point, sample aggregator 308 can aggregate a set of data values having timestamps within a predetermined time interval (e.g., a quarter-hour, an hour, a day, etc.) to generate an aggregate data value for the predetermined time interval. For example, the raw timeseries data for a particular data point may have a relatively short interval (e.g., one minute) between consecutive samples of the data point. Sample aggregator 308 can generate a data rollup from the raw timeseries data by aggregating all of the samples of the data point having timestamps within a relatively longer interval (e.g., a quarter-hour) into a single aggregated value that represents the longer interval.

For some types of timeseries, sample aggregator 308 performs the aggregation by averaging all of the samples of the data point having timestamps within the longer interval. Aggregation by averaging can be used to calculate aggregate values for timeseries of non-cumulative variables such as measured value. For other types of timeseries, sample aggregator 308 performs the aggregation by summing all of the samples of the data point having timestamps within the longer interval. Aggregation by summation can be used to calculate aggregate values for timeseries of cumulative variables such as the number of faults detected since the previous sample.

Figures 4, 5:
FIG. 4 is a block diagram illustrating an aggregation technique which can be used by the sample aggregator shown in FIG. 3 to aggregate raw data samples, according to some embodiments.
FIG. 5 is a data table which can be used to store raw data timeseries and a variety of derived data timeseries which can be generated by the timeseries service of FIG. 3, according to some embodiments.

Referring now to FIGS. 4-5, a block diagram 400 and a data table 450 illustrating an aggregation technique which can be used by sample aggregator 308 is shown, according to some embodiments. In FIG. 4, a data point 402 is shown. Data point 402 is an example of a measured data point for which timeseries values can be obtained. For example, data point 402 is shown as an outdoor air temperature point and has values which can be measured by a temperature sensor. Although a specific type of data point 402 is shown in FIG. 4, it should be understood that data point 402 can be any type of measured or calculated data point. Timeseries values of data point 402 can be collected by data collector 212 and assembled into a raw data timeseries 404.

As shown in FIG. 5, the raw data timeseries 404 includes a timeseries of data samples, each of which is shown as a separate row in data table 450. Each sample of raw data timeseries 404 is shown to include a timestamp and a data value. The timestamps of raw data timeseries 404 are ten minutes and one second apart, indicating that the sampling interval of raw data timeseries 404 is ten minutes and one second. For example, the timestamp of the first data sample is shown as 2015-12-31T23:10:00 indicating that the first data sample of raw data timeseries 404 was collected at 11:10:00 PM on Dec. 31, 2015. The timestamp of the second data sample is shown as 2015-12-31T23:20:01 indicating that the second data sample of raw data timeseries 404 was collected at 11:20:01 PM on Dec. 31, 2015. In some embodiments, the timestamps of raw data timeseries 404 are stored along with an offset relative to universal time, as previously described. The values of raw data timeseries 404 start at a value of 10 and increase by 10 with each sample. For example, the value of the second sample of raw data timeseries 404 is 20, the value of the third sample of raw data timeseries 404 is 30, etc.

In FIG. 4, several data rollup timeseries 406-414 are shown. Data rollup timeseries 406-414 can be generated by sample aggregator 308 and stored as derived timeseries data. The data rollup timeseries 406-414 include an average quarter-hour timeseries 406, an average hourly timeseries 408, an average daily timeseries 410, an average monthly timeseries 412, and an average yearly timeseries 414. Each of the data rollup timeseries 406-414 is dependent upon a parent timeseries. In some embodiments, the parent timeseries for each of the data rollup timeseries 406-414 is the timeseries with the next shortest duration between consecutive timeseries values. For example, the parent timeseries for average quarter-hour timeseries 406 is raw data timeseries 404. Similarly, the parent timeseries for average hourly timeseries 408 is average quarter-hour timeseries 406; the parent timeseries for average daily timeseries 410 is average hourly timeseries 408; the parent timeseries for average monthly timeseries 412 is average daily timeseries 410; and the parent timeseries for average yearly timeseries 414 is average monthly timeseries 412.

Sample aggregator 308 can generate each of the data rollup timeseries 406-414 from the timeseries values of the corresponding parent timeseries. For example, sample aggregator 308 can generate average quarter-hour timeseries 406 by aggregating all of the samples of data point 402 in raw data timeseries 404 that have timestamps within each quarter-hour. Similarly, sample aggregator 308 can generate average hourly timeseries 408 by aggregating all of the timeseries values of average quarter-hour timeseries 406 that have timestamps within each hour. Sample aggregator 308 can generate average daily timeseries 410 by aggregating all of the time series values of average hourly timeseries 408 that have timestamps within each day. Sample aggregator 308 can generate average monthly timeseries 412 by aggregating all of the time series values of average daily timeseries 410 that have timestamps within each month. Sample aggregator 308 can generate average yearly timeseries 414 by aggregating all of the time series values of average monthly timeseries 412 that have timestamps within each year.

In some embodiments, the timestamps for each sample in the data rollup timeseries 406-414 are the beginnings of the aggregation interval used to calculate the value of the sample. For example, the first data sample of average quarter-hour timeseries 406 is shown to include the timestamp 2015-12-31T23:00:00. This timestamp indicates that the first data sample of average quarter-hour timeseries 406 corresponds to an aggregation interval that begins at 11:00:00 PM on Dec. 31, 2015. Since only one data sample of raw data timeseries 404 occurs during this interval, the value of the first data sample of average quarter-hour timeseries 406 is the average of a single data value (i.e., average(10)=10). The same is true for the second data sample of average quarter-hour timeseries 406 (i.e., average (20)=20).

The third data sample of average quarter-hour timeseries 406 is shown to include the timestamp 2015-12-31T23:30:00. This timestamp indicates that the third data sample of average quarter-hour timeseries 406 corresponds to an aggregation interval that begins at 11:30:00 PM on Dec. 31, 2015. Since each aggregation interval of average quarter-hour timeseries 406 is a quarter-hour in duration, the end of the aggregation interval is 11:45:00 PM on Dec. 31, 2015.

This aggregation interval includes two data samples of raw data timeseries 404 (i.e., the third raw data sample having a value of 30 and the fourth raw data sample having a value of 40). Sample aggregator 308 can calculate the value of the third sample of average quarter-hour timeseries 406 by averaging the values of the third raw data sample and the fourth raw data sample (i.e., average(30, 40)=35). Accordingly, the third sample of average quarter-hour timeseries 406 has a value of 35. Sample aggregator 308 can calculate the remaining values of average quarter-hour timeseries 406 in a similar manner.

Still referring to FIG. 5, the first data sample of average hourly timeseries 408 is shown to include the timestamp 2015-12-31T23:00:00. This timestamp indicates that the first data sample of average hourly timeseries 408 corresponds to an aggregation interval that begins at 11:00:00 PM on Dec. 31, 2015. Since each aggregation interval of average hourly timeseries 408 is an hour in duration, the end of the aggregation interval is 12:00:00 AM on Jan. 1, 2016. This aggregation interval includes the first four samples of average quarter-hour timeseries 406. Sample aggregator 308 can calculate the value of the first sample of average hourly timeseries 408 by averaging the values of the first four values of average quarter-hour timeseries 406 (i.e., average (10, 20, 35, 50)=28.8). Accordingly, the first sample of average hourly timeseries 408 has a value of 28.8. Sample aggregator 308 can calculate the remaining values of average hourly timeseries 408 in a similar manner.

The first data sample of average daily timeseries 410 is shown to include the timestamp 2015-12-31T00:00:00. This timestamp indicates that the first data sample of average daily timeseries 410 corresponds to an aggregation interval that begins at 12:00:00 AM on Dec. 31, 2015. Since each aggregation interval of the average daily timeseries 410 is a day in duration, the end of the aggregation interval is 12:00:00 AM on Jan. 1, 2016. Only one data sample of average hourly timeseries 408 occurs during this interval. Accordingly, the value of the first data sample of average daily timeseries 410 is the average of a single data value (i.e., average(28.8)=28.8). The same is true for the second data sample of average daily timeseries 410 (i.e., average (87.5)=87.5).

In some embodiments, sample aggregator 308 stores each of the data rollup timeseries 406-414 in a single data table (e.g., data table 450) along with raw data timeseries 404. This allows applications 230 to retrieve all of the timeseries 404-414 quickly and efficiently by accessing a single data table. In other embodiments, sample aggregator 308 can store the various timeseries 404-414 in separate data tables which can be stored in the same data storage device (e.g., the same database) or distributed across multiple data storage devices. In some embodiments, sample aggregator 308 stores data timeseries 404-414 in a format other than a data table. For example, sample aggregator 308 can store timeseries 404-414 as vectors, as a matrix, as a list, or using any of a variety of other data storage formats.

In some embodiments, sample aggregator 308 automatically updates the data rollup timeseries 406-414 each time a new raw data sample is received. Updating the data rollup timeseries 406-414 can include recalculating the aggregated values based on the value and timestamp of the new raw data sample. When a new raw data sample is received, sample aggregator 308 can determine whether the timestamp of the new raw data sample is within any of the aggregation intervals for the samples of the data rollup timeseries 406-414. For example, if a new raw data sample is received with a timestamp of 2016-01-01T00:52:00, sample aggregator 308 can determine that the new raw data sample occurs within the aggregation interval beginning at timestamp 2016-01-01T00:45:00 for average quarter-hour timeseries 406. Sample aggregator 308 can use the value of the new raw data point (e.g., value=120) to update the aggregated value of the final data sample of average quarter-hour timeseries 406 (i.e., average(110, 120)=115).

If the new raw data sample has a timestamp that does not occur within any of the previous aggregation intervals, sample aggregator 308 can create a new data sample in average quarter-hour timeseries 406. The new data sample in average quarter-hour timeseries 406 can have a new data timestamp defining the beginning of an aggregation interval that includes the timestamp of the new raw data sample. For example, if the new raw data sample has a timestamp of 2016-01-01T01:00:11, sample aggregator 308 can determine that the new raw data sample does not occur within any of the aggregation intervals previously established for average quarter-hour timeseries 406. Sample aggregator 308 can generate a new data sample in average quarter-hour timeseries 406 with the timestamp 2016-01-01T01:00:00 and can calculate the value of the new data sample in average quarter-hour timeseries 406 based on the value of the new raw data sample, as previously described.

Sample aggregator 308 can update the values of the remaining data rollup timeseries 408-414 in a similar manner. For example, sample aggregator 308 determine whether the timestamp of the updated data sample in average quarter-hour timeseries is within any of the aggregation intervals for the samples of average hourly timeseries 408. Sample aggregator 308 can determine that the timestamp 2016-01-01T00:45:00 occurs within the aggregation interval beginning at timestamp 2016-01-01T00:00:00 for average hourly timeseries 408. Sample aggregator 308 can use the updated value of the final data sample of average quarter-hour timeseries 406 (e.g., value=115) to update the value of the second sample of average hourly timeseries 408 (i.e., average(65, 80, 95, 115)=88.75). Sample aggregator 308 can use the updated value of the final data sample of average hourly timeseries 408 to update the final sample of average daily timeseries 410 using the same technique.

In some embodiments, sample aggregator 308 updates the aggregated data values of data rollup timeseries 406-414 each time a new raw data sample is received. Updating each time a new raw data sample is received ensures that the data rollup timeseries 406-414 always reflect the most recent data samples. In other embodiments, sample aggregator 308 updates the aggregated data values of data rollup timeseries 406-414 periodically at predetermined update intervals (e.g., hourly, daily, etc.) using a batch update technique. Updating periodically can be more efficient and require less data processing than updating each time a new data sample is received, but can result in aggregated data values that are not always updated to reflect the most recent data samples.

In some embodiments, sample aggregator 308 is configured to cleanse raw data timeseries 404. Cleansing raw data timeseries 404 can include discarding exceptionally high or low data. For example, sample aggregator 308 can identify a minimum expected data value and a maximum expected data value for raw data timeseries 404. Sample aggregator 308 can discard data values outside this range as bad data. In some embodiments, the minimum and maximum expected values are based on attributes of the data point represented by the timeseries. For example, data point 402 represents a measured outdoor air temperature and therefore has an expected value within a range of reasonable outdoor air temperature values for a given geographic location (e.g., between −20° F. and 110° F.). Sample aggregator 308 can discard a data value of 330 for data point 402 since a temperature value of 330° F. is not reasonable for a measured outdoor air temperature.

In some embodiments, sample aggregator 308 identifies a maximum rate at which a data point can change between consecutive data samples. The maximum rate of change can be based on physical principles (e.g., heat transfer principles), weather patterns, or other parameters that limit the maximum rate of change of a particular data point. For example, data point 402 represents a measured outdoor air temperature and therefore can be constrained to have a rate of change less than a maximum reasonable rate of change for outdoor temperature (e.g., five degrees per minute). If two consecutive data samples of the raw data timeseries 404 have values that would require the outdoor air temperature to change at a rate in excess of the maximum expected rate of change, sample aggregator 308 can discard one or both of the data samples as bad data.

Sample aggregator 308 can perform any of a variety of data cleansing operations to identify and discard bad data samples. In some embodiments, sample aggregator 308 performs the data cleansing operations for raw data timeseries 404 before generating the data rollup timeseries 406-414. This ensures that raw data timeseries 404 used to generate data rollup timeseries 406-414 does not include any bad data samples. Accordingly, the data rollup timeseries 406-414 do not need to be re-cleansed after the aggregation is performed.

Virtual Points

Referring again to FIG. 3, timeseries operators 306 are shown to include a virtual point calculator 310. Virtual point calculator 310 is configured to create virtual data points and calculate timeseries values for the virtual data points. A virtual data point is a type of calculated data point derived from one or more actual data points. In some embodiments, actual data points are measured data points, whereas virtual data points are calculated data points. Virtual data points can be used as substitutes for actual sensor data when the sensor data desired for a particular application does not exist, but can be calculated from one or more actual data points. For example, a virtual data point representing the enthalpy of a refrigerant can be calculated using actual data points measuring the temperature and pressure of the refrigerant. Virtual data points can also be used to provide timeseries values for calculated quantities such as efficiency, coefficient of performance, and other variables that cannot be directly measured.

Virtual point calculator 310 can calculate virtual data points by applying any of a variety of mathematical operations or functions to actual data points or other virtual data points. For example, virtual point calculator 310 can calculate a virtual data point ($pointID_3$) by adding two or more actual data points ($pointID_1$ and $pointID_2$) (e.g., $pointID_3 = pointID_1 + pointID_2$). As another example, virtual point calculator 310 can calculate an enthalpy data point ($pointID_4$) based on a measured temperature data point ($pointID_5$) and a measured pressure data point ($pointID_6$) (e.g., $pointID_4 = enthalpy(pointID_5, pointID_6)$). In some instances, a virtual data point can be derived from a single actual data point. For example, virtual point calculator 310 can calculate a saturation temperature ($pointID_7$) of a known refrigerant based on a measured refrigerant pressure ($pointID_8$) (e.g., $pointID_7 = T_{sat}(pointID_8)$). In general, virtual point calculator 310 can calculate the timeseries values of a virtual data point using the timeseries values of one or more actual data points and/or the timeseries values of one or more other virtual data points.

In some embodiments, virtual point calculator 310 uses a set of virtual point rules to calculate the virtual data points. The virtual point rules can define one or more input data points (e.g., actual or virtual data points) and the mathematical operations that should be applied to the input data point(s) to calculate each virtual data point. The virtual point rules can be provided by a user, received from an external system or device, and/or stored in memory 210. Virtual point calculator 310 can apply the set of virtual point rules to the timeseries values of the input data points to calculate timeseries values for the virtual data points. The timeseries values for the virtual data points can be stored as derived timeseries data in timeseries storage 214.

Virtual point calculator 310 can calculate virtual data points using the values of raw data timeseries 404 and/or the aggregated values of the data rollup timeseries 406-414. In some embodiments, the input data points used to calculate a virtual data point are collected at different sampling times and/or sampling rates. Accordingly, the samples of the input data points may not be synchronized with each other, which can lead to ambiguity in which samples of the input data points should be used to calculate the virtual data point. Using the data rollup timeseries 406-414 to calculate the virtual data points ensures that the timestamps of the input data points are synchronized and eliminates any ambiguity in which data samples should be used.

Referring now to FIG. 6, several timeseries 600, 620, 640, and 660 illustrating the synchronization of data samples resulting from aggregating the raw timeseries data are shown, according to some embodiments. Timeseries 600 and 620 are raw data timeseries. Raw data timeseries 600 has several raw data samples 602-610. Raw data sample 602 is collected at time $t_1$; raw data sample 604 is collected at time $t_2$; raw data sample 606 is collected at time $t_3$; raw data sample 608 is collected at time $t_4$; raw data sample 610 is collected at time $t_5$; and raw data sample 612 is collected at time $t_6$.

Raw data timeseries 620 also has several raw data samples 622, 624, 626, 628, and 630. However, raw data samples, 622-630 are not synchronized with raw data samples 602-612. For example, raw data sample 622 is collected before time $t_1$; raw data sample 624 is collected between times $t_2$ and $t_3$; raw data sample 626 is collected between times $t_3$ and $t_4$; raw data sample 628 is collected between times $t_4$ and $t_5$; and raw data sample 630 is collected between times $t_5$ and $t_6$. The lack of synchronization between data samples 602-612 and raw data samples 622-630 can lead to ambiguity in which of the data samples should be used together to calculate a virtual data point.

Timeseries 640 and 660 are data rollup timeseries. Data rollup timeseries 640 can be generated by sample aggregator 308 by aggregating raw data timeseries 600. Similarly, data rollup timeseries 660 can be generated by sample aggregator 308 by aggregating raw data timeseries 620. Both raw data timeseries 600 and 620 can be aggregated using the same aggregation interval. Accordingly, the resulting data rollup timeseries 640 and 660 have synchronized data samples. For example, aggregated data sample 642 is synchronized with aggregated data sample 662 at time $t_1'$. Similarly, aggregated data sample 644 is synchronized with aggregated data sample 664 at time $t_2'$; aggregated data sample 646 is synchronized with aggregated data sample 666 at time $t_3'$; and aggregated data sample 648 is synchronized with aggregated data sample 668 at time $t_4'$.

The synchronization of data samples in data rollup timeseries 640 and 660 allows virtual point calculator 310 to readily identify which of the data samples should be used together to calculate a virtual point. For example, virtual point calculator 310 can identify which of the samples of data rollup timeseries 640 and 660 have the same timestamp (e.g., data samples 642 and 662, data samples 644 and 664, etc.). Virtual point calculator 310 can use two or more aggregated data samples with the same timestamp to calculate a timeseries value of the virtual data point. In some embodiments, virtual point calculator 310 assigns the shared timestamp of the input data samples to the timeseries value of the virtual data point calculated from the input data samples.

Weather Points

Referring again to FIG. 3, timeseries operators 306 are shown to include a weather point calculator 312. Weather point calculator 312 is configured to perform weather-based calculations using the timeseries data. In some embodiments, weather point calculator 312 creates virtual data points for weather-related variables such as cooling degree days (CDD), heating degree days (HDD), cooling energy days (CED), heating energy days (HED), and normalized energy consumption. The timeseries values of the virtual data points calculated by weather point calculator 312 can be stored as derived timeseries data in timeseries storage 214.

Weather point calculator 312 can calculate CDD by integrating the positive temperature difference between the time-varying outdoor air temperature $T_{OA}$ and the cooling balance point $T_{bC}$ as shown in the following equation:

$$CDD = \int^{period} \max\{0, (T_{OA} - T_{bC})\} dt$$

where period is the integration period. In some embodiments, the outdoor air temperature $T_{OA}$ is a measured data point, whereas the cooling balance point $T_{bC}$ is a stored parameter. To calculate CDD for each sample of the outdoor air temperature $T_{OA}$, weather point calculator 312 can multiply the quantity $\max\{0, (T_{OA} - T_{bC})\}$ by the sampling period $\Delta t$ of the outdoor air temperature $T_{OA}$. Weather point calculator 312 can calculate CED in a similar manner using outdoor air enthalpy $E_{OA}$ instead of outdoor air temperature $T_{OA}$. Outdoor air enthalpy $E_{OA}$ can be a measured or virtual data point.

Weather point calculator 312 can calculate HDD by integrating the positive temperature difference between a heating balance point $T_{bH}$ and the time-varying outdoor air temperature $T_{OA}$ as shown in the following equation:

$$HDD = \int^{period} \max\{0, (T_{bH} - T_{OA})\} dt$$

where period is the integration period. In some embodiments, the outdoor air temperature $T_{OA}$ is a measured data point, whereas the heating balance point $T_{bH}$ is a stored parameter. To calculate HDD for each sample of the outdoor air temperature $T_{OA}$, weather point calculator 312 can multiply the quantity $\max\{0, (T_{bH} - T_{OA})\}$ by the sampling period $\Delta t$ of the outdoor air temperature $T_{OA}$. Weather point calculator 312 can calculate HED in a similar manner using outdoor air enthalpy $E_{OA}$ instead of outdoor air temperature $T_{OA}$.

In some embodiments, both virtual point calculator 310 and weather point calculator 312 calculate timeseries values of virtual data points. Weather point calculator 312 can calculate timeseries values of virtual data points that depend on weather-related variables (e.g., outdoor air temperature, outdoor air enthalpy, outdoor air humidity, outdoor light intensity, precipitation, wind speed, etc.). Virtual point calculator 310 can calculate timeseries values of virtual data points that depend on other types of variables (e.g., non-weather-related variables). Although only a few weather-related variables are described in detail here, it is contemplated that weather point calculator 312 can calculate virtual data points for any weather-related variable. The weather-related data points used by weather point calculator 312 can be received as timeseries data from various weather sensors and/or from a weather service.

Fault Detection

Still referring to FIG. 3, timeseries operators 306 are shown to include a fault detector 314. Fault detector 314 can be configured to detect faults in timeseries data. In some embodiments, fault detector 314 performs fault detection for timeseries data representing meter data (e.g., measurements from a sensor) and/or for other types of timeseries data. Fault detector 314 can detect faults in the raw timeseries data and/or the derived timeseries data. In some embodiments, fault detector 314 receives fault detection rules from analytics service 224. Fault detection rules can be defined by a user (e.g., via a rules editor) or received from an external system or device. In various embodiments, the fault detection rules can be stored within timeseries storage 214. Fault detector 314 can retrieve the fault detection rules from timeseries storage 214 and can use the fault detection rules to analyze the timeseries data.

In some embodiments, the fault detection rules provide criteria that can be evaluated by fault detector 314 to detect faults in the timeseries data. For example, the fault detection rules can define a fault as a data value above or below a threshold value. As another example, the fault detection rules can define a fault as a data value outside a predetermined range of values. The threshold value and predetermined range of values can be based on the type of timeseries data (e.g., meter data, calculated data, etc.), the type of variable represented by the timeseries data (e.g., temperature, humidity, energy consumption, etc.), the system or device that measures or provides the timeseries data (e.g., a sensor, an IoT device, etc.), and/or other attributes of the timeseries data.

Fault detector 314 can apply the fault detection rules to the timeseries data to determine whether each sample of the timeseries data qualifies as a fault. In some embodiments, fault detector 314 generates a fault detection timeseries containing the results of the fault detection. The fault detection timeseries can include a set of timeseries values, each of which corresponds to a data sample of the timeseries data evaluated by fault detector 314. In some embodiments, each timeseries value in the fault detection timeseries includes a timestamp and a fault detection value. The timestamp can be the same as the timestamp of the corresponding data sample of the data timeseries. The fault detection value can indicate whether the corresponding data sample of the data timeseries qualifies as a fault. For example, the fault detection value can have a value of "Fault" if a fault is detected and a value of "Not in Fault" if a fault is not detected in the corresponding data sample of the data timeseries. The fault detection timeseries can be stored in timeseries storage 214 along with the raw timeseries data and the derived timeseries data.

Referring now to FIGS. 7-8, a block diagram and data table 800 illustrating the fault detection timeseries is shown, according to some embodiments. In FIG. 7, fault detector 314 is shown receiving a data timeseries 702 from timeseries storage 214. Data timeseries 702 can be a raw data timeseries or a derived data timeseries. In some embodiments, data timeseries 702 is a timeseries of values of an actual data point (e.g., a measured temperature). In other embodiments, data timeseries 702 is a timeseries of values of a virtual data point (e.g., a calculated efficiency). As shown in table 800, data timeseries 702 includes a set of data samples. Each data sample includes a timestamp and a value. Most of the data samples have values within the range of 65-66. However, three of the data samples have values of 42.

Fault detector 314 can evaluate data timeseries 702 using a set of fault detection rules to detect faults in data timeseries 702. In some embodiments, fault detector 314 determines that the data samples having values of 42 qualify as faults according to the fault detection rules. Fault detector 314 can generate a fault detection timeseries 704 containing the results of the fault detection. As shown in table 800, fault detection timeseries 704 includes a set of data samples. Like data timeseries 702, each data sample of fault detection timeseries 704 includes a timestamp and a value. Most of the values of fault detection timeseries 704 are shown as "Not in Fault," indicating that no fault was detected for the corresponding sample of data timeseries 702 (i.e., the data sample with the same timestamp). However, three of the data samples in fault detection timeseries 704 have a value of "Fault," indicating that the corresponding sample of data timeseries 702 qualifies as a fault. As shown in FIG. 7, fault detector 314 can store fault detection timeseries 704 in timeseries storage 214 along with the raw timeseries data and the derived timeseries data.

Fault detection timeseries 704 can be used by web services platform 102 to perform various fault detection, diagnostic, and/or control processes. In some embodiments, fault detection timeseries 704 is further processed by timeseries processing engine 304 to generate new timeseries derived from fault detection timeseries 704. For example, sample aggregator 308 can use fault detection timeseries 704 to generate a fault duration timeseries. Sample aggregator 308 can aggregate multiple consecutive data samples of fault detection timeseries 704 having the same data value into a single data sample. For example, sample aggregator 308 can aggregate the first two "Not in Fault" data samples of fault detection timeseries 704 into a single data sample representing a time period during which no fault was detected. Similarly, sample aggregator 308 can aggregate the final two "Fault" data samples of fault detection timeseries 704 into a single data sample representing a time period during which a fault was detected.

In some embodiments, each data sample in the fault duration timeseries has a fault occurrence time and a fault duration. The fault occurrence time can be indicated by the timestamp of the data sample in the fault duration timeseries. Sample aggregator 308 can set the timestamp of each data sample in the fault duration timeseries equal to the timestamp of the first data sample in the series of data samples in fault detection timeseries 704 which were aggregated to form the aggregated data sample. For example, if sample aggregator 308 aggregates the first two "Not in Fault" data samples of fault detection timeseries 704, sample aggregator 308 can set the timestamp of the aggregated data sample to 2015-12-31T23:10:00. Similarly, if sample aggregator 308 aggregates the final two "Fault" data samples of fault detection timeseries 704, sample aggregator 308 can set the timestamp of the aggregated data sample to 2015-12-31T23:50:00.

The fault duration can be indicated by the value of the data sample in the fault duration timeseries. Sample aggregator 308 can set the value of each data sample in the fault duration timeseries equal to the duration spanned by the consecutive data samples in fault detection timeseries 704 which were aggregated to form the aggregated data sample. Sample aggregator 308 can calculate the duration spanned by multiple consecutive data samples by subtracting the timestamp of the first data sample of fault detection timeseries 704 included in the aggregation from the timestamp of the next data sample of fault detection timeseries 704 after the data samples included in the aggregation.

For example, if sample aggregator 308 aggregates the first two "Not in Fault" data samples of fault detection timeseries 704, sample aggregator 308 can calculate the duration of the aggregated data sample by subtracting the timestamp 2015-12-31T23:10:00 (i.e., the timestamp of the first "Not in Fault" sample) from the timestamp 2015-12-31T23:30:00 (i.e., the timestamp of the first "Fault" sample after the consecutive "Not in Fault" samples) for an aggregated duration of twenty minutes. Similarly, if sample aggregator 308 aggregates the final two "Fault" data samples of fault detection timeseries 704, sample aggregator 308 can calculate the duration of the aggregated data sample by subtracting the timestamp 2015-12-31T23:50:00 (i.e., the timestamp of the first "Fault" sample included in the aggregation) from the timestamp 2016-01-01T00:10:00 (i.e., the timestamp of the first "Not in Fault" sample after the consecutive "Fault" samples) for an aggregated duration of twenty minutes.

Eventseries

Referring again to FIG. 3, timeseries operators 306 are shown to include an eventseries generator 315. Eventseries generator 315 can be configured to generate eventseries based on the raw data timeseries and/or the derived data timeseries. Each eventseries may include a plurality of event samples that characterize various events and define the start times and end times of the events. In the context of eventseries, an "event" can be defined as a state or condition that occurs over a period of time. In other words, an event is not an instantaneous occurrence, but rather is a non-instantaneous state or condition observed over a time period having a non-zero duration (i.e., having both a start time and a subsequent stop time). The state or condition of the event can be based on the values of the timeseries samples used to generate the eventseries. In some embodiments, eventseries generator 315 assigns a state to each timeseries sample based on the value of the timeseries sample and then aggregates multiple consecutive samples having the same state to define the time period over which that state is observed.

Eventseries generator 315 can be configured to assign a state to each sample of an input timeseries (e.g., a raw data timeseries or a derived timeseries) by applying a set of rules to each sample. The process of assigning a state to each sample of the input timeseries can be described as an event-condition-action (ECA) process. ECA refers to the structure of active rules in event driven architecture and active database systems. For example, each rule in the set of rules may include an event, a condition, and an action. The event part of the rule may specify a signal that triggers invocation of the rule. The condition part of the rule may be a logical test (or series of logical tests) that, if satisfied or evaluates to true, causes the action to be carried out. The action part of the rule may specify one or more actions to be performed when the corresponding logical test is satisfied (e.g., assigning a particular state to a sample of the input timeseries).

In some embodiments, the event part is the arrival of a new sample of an input timeseries. Different rules may apply to different input timeseries. For example, the arrival of a new sample of a first input timeseries may qualify as a first event, whereas the arrival of a new sample of a second input timeseries may qualify as a second event. Eventseries generator 315 can use the identity of the input timeseries to determine which event has occurred when a new sample of a particular input timeseries is received. In other words, eventseries generator 315 can select a particular rule to evaluate based on the identity of the input timeseries.

In some embodiments, the condition includes one or more mathematical checks or logic statements that are evaluated by eventseries generator 315. For example, evaluating the condition of a particular rule may include comparing the value of the sample of the input timeseries to a threshold value. The condition may be satisfied if the value of the sample is less than the threshold value, equal to the threshold value, or greater than the threshold value, depending on the particular logic statement specified by the condition. In some embodiments, the condition includes a series of mathematical checks that are performed by eventseries generator 315 in a predetermined order. Each mathematical check may correspond to a different action to be performed if that mathematical check is satisfied. For example, the conditions and corresponding actions may be specified as follows:

If Value>$\theta_1$,Action=Action$_1$

Else If $\theta_1$>Value>$\theta_2$,Action=Action$_2$

Else If $\theta_2$>Value>$\theta_3$,Action=Action$_3$

Else If $\theta_3$>Value,Action=Action$_4$ where Value is the value of the sample of the input timeseries, $\theta_1$-$\theta_4$ are thresholds for the value, and Action$_1$-Action$_4$ are specific actions that are performed if the corresponding logic statement is satisfied. For example, Action$_1$ may be performed if the value of the sample is greater than $\theta_1$.

In some embodiments, the actions include assigning various states to the sample of the input timeseries. For example, Action$_1$ may include assigning a first state to the sample of the input timeseries, whereas Action$_2$ may include assigning a second state to the sample of the input timeseries. Accordingly, different states can be assigned to the sample based on the value of the sample relative to the threshold values. Each time a new sample of an input timeseries is received, eventseries generator 315 can run through the set of rules, select the rules that apply to that specific input timeseries, apply them in a predetermined order, determine which condition is satisfied, and assign a particular state to the sample based on which condition is satisfied.

One example of an eventseries which can be generated by eventseries generator 315 is an outdoor air temperature (OAT) eventseries. The OAT eventseries may define one or more temperature states and may indicate the time periods during which each of the temperature states is observed. In some embodiments, the OAT eventseries is based on a timeseries of measurements of the OAT received as a raw data timeseries. Eventseries generator 315 can use a set of rules to assign a particular temperature state (e.g., hot, warm, cool, cold) to each of the timeseries OAT samples. For example, eventseries generator 315 can apply the following set of rules to the samples of an OAT timeseries:

If OAT>100,State=Hot

Else If 100≥OAT>80,State=Warm

Else If 80≥OAT>50,State=Cool

Else If 50≥OAT,State=Cold where OAT is the value of a particular timeseries data sample. If the OAT is above 100, eventseries generator 315 can assign the timeseries sample to the "Hot" temperature state. If the OAT is less than or equal to 100 and greater than 80, eventseries generator 315 can assign the timeseries sample to the "Warm" temperature state. If the OAT is less than or equal to 80 and greater than 50, eventseries generator 315 can assign the timeseries sample to the "Cool" temperature state. If the OAT is less than or equal to 50, eventseries generator 315 can assign the timeseries sample to the "Cold" temperature state.

In some embodiments, eventseries generator 315 creates a new timeseries that includes the assigned states for each sample of the original input timeseries. The new timeseries may be referred to as a "state timeseries" because it indicates the state assigned to each timeseries sample. The state timeseries can be created by applying the set of rules to an input timeseries as previously described. In some embodiments, the state timeseries includes a state value and a timestamp for each sample of the state timeseries. An example of a state timeseries is as follows:

[(state$_1$, timestamp$_1$), (state$_2$, timestamp$_2$), . . . (state$_N$, timestamp$_N$)]

where state$_i$ is the state assigned to the ith sample of the input timeseries, timestamp$_i$ is the timestamp of the ith sample of the input timeseries, and N is the total number of samples in the input timeseries. In some instances, two or more of the state values may be the same if the same state is assigned to multiple samples of the input timeseries.

In some embodiments, the state timeseries also includes the original value of each sample of the input timeseries. For example, each sample of the state timeseries may include a state value, a timestamp, and an input data value, as shown in the following equation:

[$\langle$state$_1$, timestamp$_1$, value$_1\rangle$, . . . $\langle$state$_N$, timestamp$_N$, value$_N\rangle$]

where value$_i$ is the original value of the ith sample of the input timeseries. The state timeseries is a type of derived timeseries which can be stored and processed by timeseries service 228.

Referring now to FIG. 9A, a table 910 illustrating the result of assigning a temperature state to each timeseries sample is shown, according to some embodiments. Each timeseries sample is shown as a separate row of table 910. The "Time" column of table 910 indicates the timestamp associated with each sample, whereas the "OAT" column of table 910 indicates the value of each timeseries sample. The "State" column of table 910 indicates the state assigned to each timeseries sample by eventseries generator 315.

Referring now to FIG. 9B, a table 920 illustrating a set of events generated by eventseries generator 315 is shown, according to some embodiments. Each event is shown as a separate row of table 920. The "Event ID" column of table 920 indicates the unique identifier for each event (e.g., Event 1, Event 2, etc.). The "Start Time" column of table 920 indicates the time at which each event begins and the "End Time" column of table 920 indicates the time at which event ends. The "State" column of table 920 indicates the state associated with each event.

Eventseries generator 315 can generate each event shown in table 920 by identifying consecutive timeseries samples with the same assigned state and determining a time period that includes the identified samples. In some embodiments, the time period starts at the timestamp of the first sample having a given state and ends immediately before the timestamp of the next sample having a different state. For example, the first two timeseries samples shown in table 910 both have the state "Cold," whereas the third sample in table 910 has the state "Cool." Eventseries generator 315 can identify the first two samples as having the same state and can generate the time period 00:00-01:59 which includes both of the identified samples. This time period begins at the timestamp of the first sample (i.e., 00:00) and ends immediately before the timestamp of the third sample (i.e., 02:00). Eventseries generator 315 can create an event for each group of consecutive samples having the same state.

Eventseries generator 315 can perform a similar analysis for the remaining timeseries samples in table 910 to generate each of the events shown in table 920. In some instances, multiple events can have the same state associated therewith. For example, both Event 1 and Event 7 shown in table 920 have the "Cold" state. Similarly, both Event 2 and Event 6 have the "Cool" state and both Event 3 and Event 5 have the "Warm" state. It should be noted that an event defines not only a particular state, but also a time period (i.e., a series of consecutive time samples) during which that state is observed. If the same state is observed during multiple non-consecutive time periods, multiple events having the same state can be generated to represent each of the non-consecutive time periods.

In some embodiments, eventseries generator 315 creates an eventseries for a set of events. An eventseries is conceptually similar to a timeseries in that both represent a series of occurrences. However, the samples of a timeseries correspond to instantaneous occurrences having a single timestamp, whereas the samples of an eventseries correspond to non-instantaneous events having both a start time and a stop time. For example, eventseries generator 315 may create the following eventseries for the set of events shown in table 920:

[⟨ ID=1, State=Cold, StartTime=00:00, EndTime=01; 59⟩,
⟨ID=2, State=Cool, StartTime=02:00, EndTime=08; 59⟩,
⟨ID=3, State=Warm, StartTime=09:00, EndTime=11; 59 ⟩,
⟨ID=4, State=Hot, StartTime=12:00, EndTime=15; 59⟩,
⟨ID=5, State=Warm, StartTime=16:00, EndTime=18; 59 ⟩,
⟨ID=6, State=Cool, StartTime=19:00, EndTime=21; 59⟩,
⟨ID=7, State=Cold, StartTime=22:00, EndTime=23; 59⟩]

where each item within the bent brackets ⟨ ⟩ is an event having the attributes ID, State, StartTime, and EndTime. Events can be stored in a tabular format (as shown in FIG. 9B), as a text string (as shown above), as a data object (e.g., a JSON object), in a container format, or any of a variety of formats.

Eventseries Process

Figure 9C:
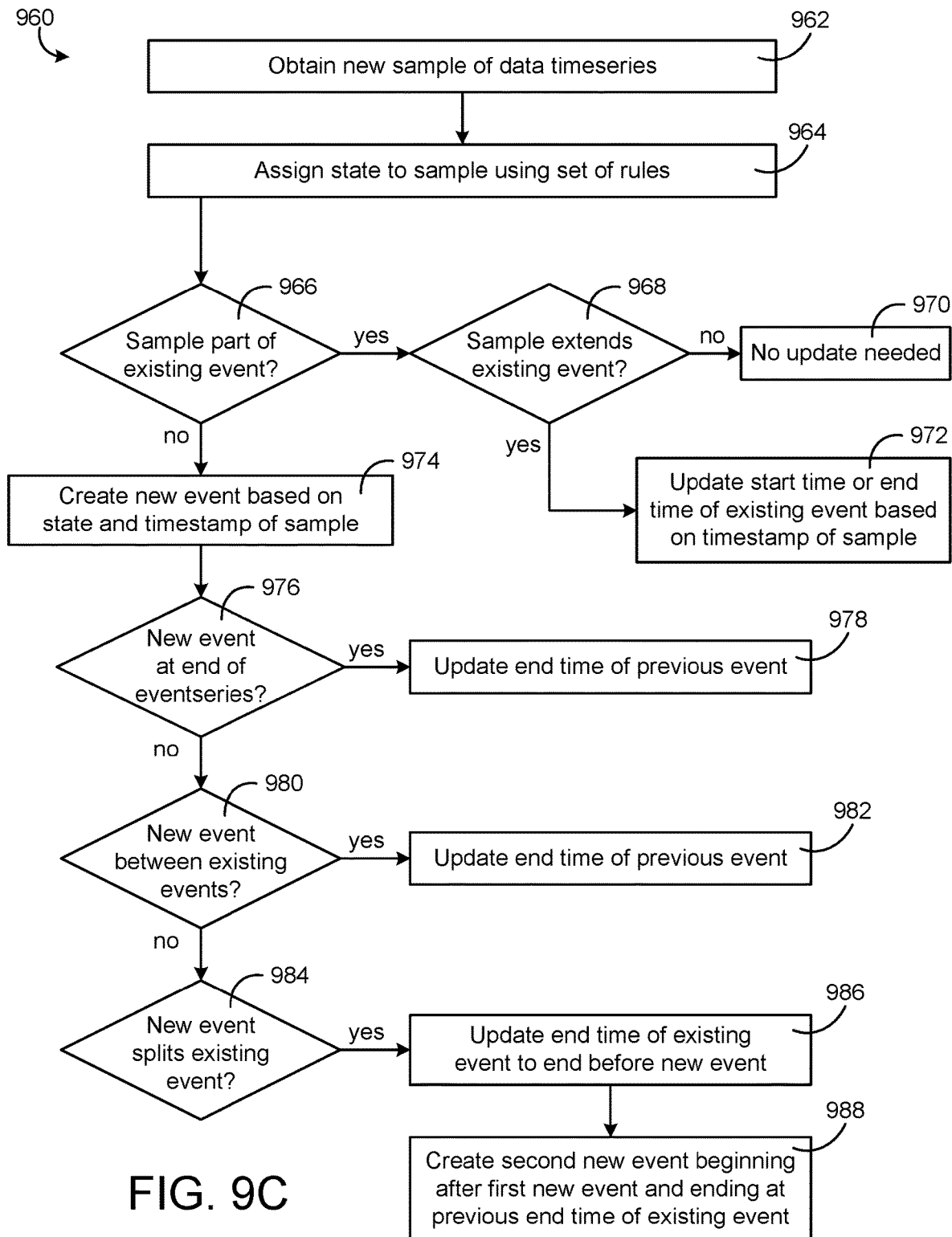
FIG. 9C is a flowchart of a process for generating and updating events and eventseries, according to some embodiments.

Referring now to FIG. 9C, a flowchart of a process 960 for creating and updating eventseries is shown, according to some embodiments. Process 960 can be performed by eventseries generator 315, as described with reference to FIGS. 3 and 7-8. In some embodiments, process 960 is performed to create an eventseries based on the samples of a data timeseries. Process 960 can be performed after all of the samples of the data timeseries have been collected or can be performed each time a new sample of the data timeseries is collected.

Process 960 is shown to include obtaining a new sample of a data timeseries (step 962) and assigning a state to the sample using a set of rules (step 964). In some embodiments, the sample is obtained from a sensor configured to measure a variable of interest. For example, the sample can be a sample of a raw data timeseries. In other embodiments, the sample is a sample of a derived data timeseries generated by sample aggregator 308, virtual point calculator 310, weather point calculator 312, or other timeseries operators 306. The sample can be obtained from a set of samples of a complete timeseries or can be received as the latest sample of an incoming data stream.

In some embodiments, step 964 includes applying a set of rules to the sample of the data timeseries to determine which state to assign. The set of rules may define various ranges of values and a corresponding state for each range of values. Step 964 can include assigning the sample to a particular state if the value of the value of the sample is within the corresponding range of values. For example, if the sample is a sample of outdoor air temperature (OAT), the set of rules may define various temperature ranges and a temperature state for each of the temperature ranges. One example of such a set of rules is as follows:

If OAT>100,State=Hot

Else If 100≥OAT>80,State=Warm

Else If 80≥OAT>50,State=Cool

Else If 50≥OAT,State=Cold where OAT is the value of a particular timeseries data sample. If the OAT is above 100, the sample can be assigned to the "Hot" temperature state. If the OAT is less than or equal to 100 and greater than 80, the sample can be assigned to the "Warm" temperature state. If the OAT is less than or equal to 80 and greater than 50, the sample can be assigned to the "Cool" temperature state. If the OAT is less than or equal to 50, the sample can be assigned to the "Cold" temperature state.

Still referring to FIG. 9C, process 960 is shown to include determining whether the sample is part of an existing event (step 966). Step 966 may include identifying all of the events in an existing eventseries and determining whether the sample belongs to any of the identified events. Each event may be defined by the combination of a particular state and a time period having both a start time and an end time. Step 966 may include determining that the sample is part of an existing event if the sample is both (1) assigned to the same state as the existing event and (2) has a timestamp that is either (a) within the time period associated with the existing event or (b) consecutive with the time period associated with the existing event. However, step 966 may include determining that the sample is not part of an existing event if the sample does not have the same state as the existing event or does not have a timestamp that that is either within the time period associated with the existing event or consecutive with the time period associated with the existing event.

In step 966, a timestamp may be considered within the time period associated with an existing event if the timestamp is between the start time of the event and the end time of the event. A timestamp may be considered consecutive with the time period associated with an existing event if the timestamp is immediately before the start time or immediately after the end time of the event. For example, if a new sample has a timestamp before the start time of an event and no other samples have intervening timestamps between the timestamp of the new sample and the start time of the event, the timestamp may be considered consecutive with the time period associated with the existing event. Similarly, if a new sample has a timestamp after the end time of an event and no other samples have intervening timestamps between the end time of the event and the timestamp of the new sample, the timestamp may be considered consecutive with the time period associated with the existing event.

If the new sample is part of an existing event (i.e., the result of step 966 is "yes"), process 960 may proceed to determining whether the new sample extends the existing event (step 968). Step 968 may include determining whether the timestamp of the new sample is consecutive with the time period associated with the existing event (i.e., immediately before the start time of the event or immediately after the end time of the event). If the timestamp of the new sample is consecutive with the time period associated with the existing event, step 968 may include determining that the sample extends the existing event. However, if the timestamp of the new sample is not consecutive with the time period associated with the existing event, step 968 may include determining that the sample does not extend the existing event.

If the sample does not extend the existing event (i.e., the result of step 968 is "no"), process 960 may include determining that no update to the existing event is needed. This situation may occur when the timestamp of the new sample is between the start time of the existing event and the end time of the existing event (i.e., within the time period associated with the existing event). Since the time period associated with the existing event already covers the timestamp of the new sample, it may be unnecessary to update the existing event to include the timestamp of the new sample.

However, if the sample extends the existing event (i.e., the result of step 968 is "yes"), process 960 may proceed to updating the start time or end time of the existing event based on the timestamp of the sample (step 972). Step 972 may include moving the start time of the event backward in time or moving the end time of the event forward in time such that the time period between the start time and the end time includes the timestamp of the new sample. For example, if the timestamp of the sample is before the start time of the event, step 972 may include replacing the start time of the existing event with the timestamp of the sample.

Similarly, if the timestamp of the sample is after the end time of the event, step 972 may include replacing the end time of the existing event with a new end time that occurs after the timestamp of the sample. For example, if the existing event has an original end time of 04:59 and the new sample has a timestamp of 05:00, step 972 may include updating the end time of the event to 05:59 (or any other time that occurs after 05:00) such that the adjusted time period associated with the event includes the timestamp of the new sample. If the original end time of the existing event is "Null" and the new sample extends the end time of the existing event, step 972 may maintain the original end time of "Null."

Returning to step 966, if the sample is not part of an existing event (i.e., the result of step 966 is "no"), process 960 may proceed to creating a new event based on the state and the timestamp of the new sample (step 974). The new event may have a state that matches the state assigned to the new sample in step 964. The new event may have a start time equal to the timestamp of the sample and an end time that occurs after the timestamp of the sample such that the time period associated with the new event includes the timestamp of the sample. The end time may have a value of "Null" if the new event is the last event in the eventseries or a non-null value of the new event is not the last event in the eventseries.

For example, if the next event in the timeseries begins at timestamp 06:00, step 974 may include setting the end time of the new event to 05:59.

After creating the new event in step 974, process 960 may perform steps 976-988 to update other events in the eventseries based on the new information provided by the new event. For example, if the new event is the last event in the eventseries (i.e., the result of step 976 is "yes"), process 960 may update the end time of the previous event (i.e., the event that occurs immediately before the new event) (step 978). The update performed in step 978 may include setting the end time of the previous event to a time immediately before the timestamp of the new sample. For example, if the new sample has a timestamp of 05:00, step 978 may include updating the end time of the previous event to 04:59. If the new event is not the last event in the eventseries (i.e., the result of step 976 is "no"), process 960 may proceed to step 980.

If the new event occurs between existing events in the eventseries (i.e., the result of step 980 is "yes"), process 960 may update the end time of the previous event (step 982). The update performed in step 982 may be the same as the update performed in step 978. For example, the update performed in step 982 may include setting the end time of the previous event to a time immediately before the timestamp of the new sample. If the new event does not occur between existing events in the eventseries (i.e., the result of step 980 is "no"), process 960 may proceed to step 984.

If the new event splits an existing event in the eventseries (i.e., the result of step 984 is "yes"), process 960 may split the existing event into two events with the new event in between. In some embodiments, splitting the existing event into two events includes updating the end time of the existing event to end before the new event (step 986) and creating a second new event beginning after the first new event and ending at the previous end time of the existing event (step 988). For example, consider a situation in which the existing event has a start time of 04:00, an end time of 11:59, and a state of "Warm." The new event added in step 974 may have a start time of 08:00, an end time of 08:59, and a state of "Hot." Accordingly, step 986 may include changing the end time of the existing event to 07:59 such that the existing event corresponds to a first "Warm" event and covers the time period from 04:00 to 07:59. The intervening "Hot" event may cover the time period from 08:00 to 08:59. The second new event created in step 988 (i.e., the second "Warm" event) may have a start time of 09:00 and an end time of 11:59. The state of the second new event may be the same as the state of the existing event.

Properties of Events and Eventseries

Similar to timeseries, an eventseries can be used in two ways. In some embodiments, an event series is used for storage only. For example, events can be created by an external application and stored in an eventseries. In this scenario, the eventseries is used only as a storage container. In other embodiments, eventseries can be used for both storage and processing. For example, events can be created by eventseries generator 315 based on raw or derived timeseries by applying a set of rules, as previously described. In this scenario, the eventseries is both the storage container and the mechanism for creating the events.

In some embodiments, each eventseries includes the following properties or attributes: EventseriesID, OrgID, InputTimeseriesID, StateTimeseriesID, Rules, and Status. The EventseriesID property may be a unique ID generated by eventseries generator 315 when a new eventseries is created. The EventseriesID property can be used to uniquely identify the eventseries and distinguish the eventseries from other eventseries. The OrgID property may identify the organization (e.g., "ABC Corporation") to which the eventseries belongs. Similar to timeseries, each eventseries may belong to a particular organization, customer, facility, or other entity (described in greater detail with reference to FIGS. 11A-11B).

The InputTimeseriesID property may identify the timeseries used to create the eventseries. For example, if the eventseries is a series of outdoor air temperature (OAT) events, the InputTimeseriesID property may identify the OAT timeseries from which the OAT eventseries is generated. In some embodiments, the input timeseries has the following format:

[<key, timestamp$_1$, value$_1$>, <key, timestamp$_2$, value$_2$>, <key, timestamp$_3$, value$_3$>]

where key is an identifier of the source of the data samples (e.g., timeseries ID, sensor ID, etc.), timestamp$_i$ identifies a time associated with the ith sample, and value$_i$ indicates the value of the ith sample.

The Rules property may identify a list of rules that are applied to the input timeseries to assign a particular state to each sample of the input timeseries. In some embodiments, the list of rules includes a plurality of rules that are applied in a particular order. The order may be defined by the logical structure of the rules. For example, the rules may include a set of "If" and "ElseIf" statements that are evaluated in the order in which the statements appear in the set of rules. An example of a set of rules is as follows:

If OAT>100,State=Hot

Else If 100≥OAT>80,State=Warm

Else If 80≥OAT>50,State=Cool

Else If 50≥OAT,State=Cold

The StateTimeseriesID property may identify the state timeseries in which the assigned states are stored. The state timeseries can be created by applying the set of rules to an input timeseries as previously described. In some embodiments, the state timeseries includes a state value and a timestamp for each sample of the state timeseries. An example of a state timeseries is as follows:

[⟨state$_1$, timestamp$_1$⟩, ⟨state$_2$, timestamp$_2$⟩, ... ⟨state$_N$, timestamp$_N$⟩]

where state$_i$ is the state assigned to the ith sample of the input timeseries, timestamp$_i$ is the timestamp of the ith sample of the input timeseries, and N is the total number of samples in the input timeseries.

The Status property may indicate whether the eventseries is active (i.e., Status=Active) or inactive (i.e., Status=Inactive). In some embodiments, an eventseries is active by default when the eventseries is created. An eventseries can be deactivated by events service 303. Events service 303 can change the Status property from active to inactive upon deactivating an eventseries.

Each eventseries may include a set of events. Each event may include the following properties: EventID, State, StartTimestamp, EndTimestamp, and EventseriesID. The EventID property may be a unique ID generated by eventseries generator 315 when a new event is created. The EventID property can be used to uniquely identify a particular event and distinguish the event from other events in the eventseries. The State property may be a text string that defines the state associated with the event. Each event may be uniquely associated with one state. The StartTimestamp property may indicate the start time of the event, whereas the EndTimestamp property may indicate the end time of the event. The StartTimestamp and EndTimestamp properties may be timestamps in any of a variety of formats (e.g., 2017-01-01T00:00:00). The EventseriesID property may identify the eventseries which includes the event. The EventseriesID property may be the same unique identifier used to identify and distinguish eventseries from each other.

Event Service

Referring again to FIG. 3, timeseries service 228 is shown to include an event service 303. In some embodiments, event service 303 is part of timeseries service 228. In other embodiments, event service 303 is a separate service (i.e., separate from timeseries service 228) within platform services 220. Event service 303 can be configured to receive and process requests for information relating to various events and eventseries. Event service 303 can also create and update events and eventseries in response to a request from an application or a user. Several examples of how event service 303 can handle requests are described below. The following table identifies the types of actions event service 303 can perform with respect to events and eventseries:

| Resource | GET (read) | POST (create) | PUT (update) |
|---|---|---|---|
| /Eventseries | Retrieve list of Eventseries | Create one or more new Eventseries | N/A |
| /Eventseries/ {eventseriesId} | Read a specific Eventseries | Create a specific Eventseries | Update the specific Eventseries |
| /Events | Retrieve a list of Events | Create one or more new Events | N/A |
| /Events/{eventId} | Read a specific Event | Create a specific Event | Update the specific Event |

Event service 303 can be configured to create a new eventseries in response to a request containing an OrgID attribute and a processing type attribute. For example, event service 303 can receive the following request:

```
Post {timeseriesV2}/eventseries/new
{
    "orgId": "Abc Inc",
    "ProcessingType" : "none"
}
``` where "Abc Inc" is the ID of the organization to which the new eventseries will belong and no processing type is specified.

In response to this request, event service 303 can create a new eventseries (i.e., an empty eventseries container) and assign an EventseriesID to the eventseries. For example, event service 303 can respond to the request as follows:

```
{
    "eventseriesId": "c7c157e4-303f-4b25-b182-ce7b0f8291d8",
    "orgId": "Abc Inc",
    "inputTimeseriesId": null,
    "stateTimeseriesId": null,
    "rules": null,
    "status": "active",
    "processingType": "stream"
}
```

In some embodiments, event service 303 is configured to create a new eventseries in response to a request containing an OrgID attribute, an InputTimeseriesID attribute, a StateTimeseriesID attribute, and a Rules attribute. For example, event service 303 can receive the following request:

```
{
    "orgId": "Abc Inc",
    "inputTimeseriesId": "793c156e4-303f-4b2e-bt82-ce7b0f829uj3",
    "stateTimeseriesId": "uic157e4-6r2f-4b25-b682-ct7b0f82917u",
    "rules": [
        {"compareOp": "Gt", "scalar": 100, "state": "Hot"},
        {"compareOp": "Gt", "scalar": 80, "state": "Warm"},
        {"compareOp": "Gt", "scalar": 50, "state": "Cool"},
        {"compareOp": "Lte", "scalar": 50, "state": "Cold"}
    ]
}
``` where "793 c156e4-303f-4b2e-bt82-ce7b0f829uj3" is the ID of the input timeseries used to generate the eventseries, "uic157e4-6r2f-4b25-b682-ct7b0f82917u" is the ID of the state timeseries containing the states assigned to each sample of the input timeseries, and the "rules" attribute contains a set of rules used to assign a state to each sample of the input timeseries.

In response to this request, event service 303 can create a new eventseries (i.e., an empty eventseries container) and assign an EventseriesID to the eventseries. For example, event service 303 can respond to the request as follows:

```
{
    "eventseriesId": "c7c157e4-303f-4b25-b182-ce7b0f8291d8",
    "orgId": "Abc Inc",
    "inputTimeseriesId": "793c156e4-303f-4b2e-bt82-ce7b0f829uj3",
    "stateTimeseriesId": "uic157e4-6r2f-4b25-b682-ct7b0f82917u",
    "rules": [
        {"compareOp": "Gt", "scalar": 100, "state": "Hot"},
        {"compareOp": "Gt", "scalar": 80, "state": "Warm"},
        {"compareOp": "Gt", "scalar": 50, "state": "Cool"},
        {"compareOp": "Lte", "scalar": 50, "state": "Cold"}
    ],
    "status": "active",
    "processingType": "stream"
}
```

In some embodiments, event service 303 is configured to add new events to an existing eventseries. For example, event service 303 can receive a request to add a new event to an eventseries. The request may specify the EventseriesID, the start time of the event, the end time of the event, and the state associated with the event, as shown in the following request:

```
Post {timeseriesV2}/eventseries/c7c157e4-303f-4b25-b182-ce7b0f8291d8/events
[
    {
        "eventseriesId": "c7c157e4-303f-4b25-b182-ce7b0f8291d8",
        "startTimestamp": "2017-04-01 13:48:23-05:00",
        "endTimestamp": "2017-04-01 13:54:11-05:00",
        "state": "High Pressure Alarm"
    }
]
```

In response to this request, event service 303 can generate a new EventID for the new event and can add the new event to the eventseries designated by the EventseriesID "c7c157e4-303f-4b25-b182-ce7b0f8291d8." The new event may have the start time "2017-04-01 13:48:23-05:00," the end time "2017-04-01 13:54:11-05:00," and the state "High Pressure Alarm" as specified in the request. In some embodiments, event service 303 responds to the request by acknowledging that the new event has been added to the eventseries.

In some embodiments, event service 303 is configured to update existing events in an eventseries. For example, event service 303 can receive a request to add update one or more properties of an existing event in an eventseries. The request may specify the EventseriesID, the updated start time of the event, the updated end time of the event, and/or the updated state associated with the event, as shown in the following request:

```
Put {timeseriesV2}/eventseries/c7c157e4-303f-4b25-b182-ce7b0f8291d8/events/
c7c157e4-303f-4b25-b182-ce7b0f8291d8
{
    "eventseriesId": "c7c157e4-303f-4b25-b182-ce7b0f8291d8",
    "startTimestamp": "2017-04-01 13:48:23-05:00",
    "endTimestamp": "2017-04-01 13:54:11-05:00",
    "state": "High Pressure Alarm"
}
```

In response to this request, event service 303 can update the specified properties of the event designated by EventseriesID "c7c157e4-303f-4b25-b182-ce7b0f8291d8." The updated event may have the start time "2017-04-01 13:48:23-05:00," the end time "2017-04-01 13:54:11-05:00," and the state "High Pressure Alarm" as specified in the request. In some embodiments, event service 303 responds to the request by acknowledging that the event has been updated.

In some embodiments, event service 303 is configured to read the events of an eventseries. For example, event service 303 can receive a request to identify all of the events associated with an eventseries. The request may be specified as a get request as follows:

Get {timeseriesV2}/eventseries/c7c157e4-303f-4b25-b182-ce7b0f8291d8/events where "c7c157e4-303f-4b25-b182-ce7b0f8291d8" is the EventseriesID of a specific eventseries.

In response to this request, event service 303 can search for all events of the specified eventseries and can return a list of the identified events. An example response which can be provided by event service 303 is as follows:

```
[
    {
        "eventid": "g9c197e4-003f-4u25-b182-se7b0f81945y",
        "eventseriesId": "c7c157e4-303f-4b25-b182-ce7b0f8291d8",
```

-continued

```
        "startTimestamp": "2017-04-01 13:48:23-05:00",
        "endTimestamp": "2017-04-01 13:54:11-05:00",
```

```
    "state": "High Pressure Alarm"
  }
]
``` where "g9c197e4-003f-4u25-b182-se7b0f81945y" is the EventID of an identified event matching the search parameters. The response may specify the EventseriesID, StartTimestamp, EndTimestamp, and State properties of each identified event.

In some embodiments, event service 303 is configured to search for the events of an eventseries that have a specific state. For example, event service 303 can receive a request to identify all of the events associated with a particular eventseries which have a specific state. The request may be specified as a get request as follows:

Get {timeseriesV2}/eventseries/c7c157e4-303f-4b25-b182-ce7b0f8291d8/events? state=Hot where "c7c157e4-303f-4b25-b182-ce7b0f8291d8" is the EventseriesID of a particular eventseries and "state=Hot" specifies that the search should return only events of the eventseries that have the state "Hot." In response to this request, event service 303 may search for all matching events (i.e., events of the specified eventseries that have the specified state) and may return a list of events that match the search parameters.

In some embodiments, event service 303 is configured to search for the events of an eventseries that have a start time or end time matching a given value. For example, event service 303 can receive a request to identify all of the events of a particular eventseries that have a start time or end time that matches a specified timestamp. The request may be specified as a get request as follows:

Get {timeseriesV2}/eventseries/c7c157e4-303f-4b25-b182-ce7b0f8291d8/events?startTime=2017-04-01%2010:00:00-05:00&endTime=2017-04-01%2010:00:00-05:00 where "c7c157e4-303f-4b25-b182-ce7b0f8291d8" is the EventseriesID of a particular eventseries and the "startTime" and "endTime" parameters specify the start time and end time of the event. In response to this request, event service 303 may search for all matching events (i.e., (startTimestamp of event <startTime and endTimestamp of event> endTime) and may return a list of events that match the search parameters.

In some embodiments, event service 303 is configured to search for the events of an eventseries that have a time range overlapping (at least partially) with a specified time range. For example, event service 303 can receive a request to identify all of the events of a particular eventseries that have (1) an event start time before a specified start time and an event end time after the specified start time or (2) an event start time before a specified end time and an event end time after the specified end time. The request may be specified as a get request as follows:

Get {timeseriesV2}/eventseries/c7c157e4-303f-4b25-b182-ce7b0f8291d8/events?startTime=2017-04-01%2010:00:00-05:00&endTime=2017-04-01%2011:59:00-05:00 where "c7c157e4-303f-4b25-b182-ce7b0f8291d8" is the EventseriesID of a particular eventseries and the "startTime" and "endTime" parameters specify the start time and end time of the event. In response to this request, event service 303 may search for all events that match the following criteria:

[(startTimestamp of event<startTime of query) AND (endTimestamp of event>startTime of query)] OR [(startTimestamp of event<endTime of query) AND (endTimestamp of event>endTime of query)]

and may return a list of events that match these criteria.

In some embodiments, event service 303 is configured to search for events of an eventseries that have a specific state and a time range that overlaps (at least partially) with a given time range. For example, event service 303 can receive a request to identify all of the events of a particular eventseries that have a particular state and either (1) an event start time before a specified start time and an event end time after the specified start time or (2) an event start time before a specified end time and an event end time after the specified end time. The request may be specified as a get request as follows:

Get {timeseriesV2}/eventseries/c7c157e4-303f-4b25-b182-ce7b0f8291d8/events?state=Hot&startTime=2017-04-01%2010:00:00-05:00&endTime=2017-04-01%2011:59:00-05:00 where "c7c157e4-303f-4b25-b182-ce7b0f8291d8" is the EventseriesID of a particular eventseries, the "state" parameter specifies a particular state, and the "startTime" and "endTime" parameters specify the start time and end time of the event. In response to this request, event service 303 may search for all events that match the following criteria:

State=Hot AND

[(startTimestamp of event<startTime of query) AND (endTimestamp of event>startTime of query)] OR [(startTimestamp of event<endTime of query) AND (endTimestamp of event>endTime of query)]

and may return a list of events that match these criteria.

Directed Acyclic Graphs

Referring again to FIG. 3, timeseries processing engine 304 is shown to include a directed acyclic graph (DAG) generator 320. DAG generator 320 can be configured to generate one or more DAGs for each raw data timeseries. Each DAG may define a workflow or sequence of operations which can be performed by timeseries operators 306 on the raw data timeseries. When new samples of the raw data timeseries are received, workflow manager 322 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL). In some embodiments, each DAG (i.e., each timeseries processing workflow) applies to one or more input timeseries and is triggered when a new sample of any of the one or more input timeseries is received.

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 308 can use the DAG to identify the duration of the time window (e.g., an hour, a day, a week, etc.) over which the data aggregation operation will be performed. Sample aggregator 308 can use the timestamps of the data samples in the timeseries provided as an input to the DAG to identify the location of the time window (i.e., the start time and the end time). Sample aggregator 308 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Referring now to FIG. 10A, an example of a DAG 1000 which can be created by DAG generator 320 is shown, according to an exemplary embodiment. DAG 1000 is shown as a structured tree representing a graph of the dataflow rather than a formal scripting language. Blocks 1002 and 1004 represent the input timeseries which can be specified by timeseries ID (e.g., ID 123, ID 456, etc.). Blocks 1006 and 1008 are functional blocks representing data cleansing operations. Similarly, block 1010 is a functional block representing a weekly rollup aggregation and block 1012 is a functional block representing an addition operation. Blocks 1014 and 1016 represent storage operations indicating where the output of DAG 1000 should be stored (e.g., local storage, hosted storage, etc.).

In DAG 1000, the arrows connecting blocks 1002-1016 represent the flow of data and indicate the sequence in which the operations defined by the functional blocks should be performed. For example, the cleansing operation represented by block 1006 will be the first operation performed on the timeseries represented by block 1002. The output of the cleansing operation in block 1006 will then be provided as an input to both the aggregation operation represented by block 1010 and the addition operation represented by block 1012. Similarly, the cleansing operation represented by block 1008 will be the first operation performed on the timeseries represented by block 1004. The output of the cleansing operation in block 1008 will then be provided as an input to the addition operation represented by block 1012.

In some embodiments, DAG 1000 can reference other DAGs as inputs. Timeseries processing engine 304 can stitch the DAGs together into larger groups. DAG 1000 can support both scalar operators (e.g., run this function on this sample at this timestamp) and aggregate window operators (e.g., apply this function over all the values in the timeseries from this time window). The time windows can be arbitrary and are not limited to fixed aggregation windows. Logical operators can be used to express rules and implement fault detection algorithms. In some embodiments, DAG 1000 supports user-defined functions and user-defined aggregates.

In some embodiments, DAG 1000 is created based on user input. A user can drag-and-drop various input blocks 1002-1004, functional blocks 1006-1012, and output blocks 1014-1016 into DAG 1000 and connect them with arrows to define a sequence of operations. The user can edit the operations to define various parameters of the operations. For example, the user can define parameters such as upper and lower bounds for the data cleansing operations in blocks 1006-1008 and an aggregation interval for the aggregation operation in block 1010. DAG 1000 can be created and edited in a graphical drag-and-drop flow editor without requiring the user to write or edit any formal code. In some embodiments, DAG generator 320 is configured to automatically generate the formal code used by timeseries operators 306 based on DAG 1000.

Referring now to FIG. 10B, an example of code 1050 which can be generated by DAG generator 320 is shown, according to an exemplary embodiment. Code 1050 is shown as a collection of JSON objects 1052-1056 that represent the various operations defined by DAG 1000. Each JSON object corresponds to one of the functional blocks in DAG 1000 and specifies the inputs/sources, the computation, and the outputs of each block. For example, object 1052 corresponds to the cleansing operation represented by block 1006 and defines the input timeseries (i.e., "123_Raw"), the particular cleansing operation to be performed (i.e., "BoundsLimitingCleanseOP"), the parameters of the cleansing operation (i.e., "upperbound" and "lowerbound") and the outputs of the cleansing operation (i.e., "123_Cleanse" and "BLCleanseFlag").

Similarly, object 1054 corresponds to the aggregation operation represented by block 1010 and defines the input timeseries (i.e., "123_Cleanse"), the aggregation operation to be performed (i.e., "AggregateOP"), the parameter of the aggregation operation (i.e., "interval": "week") and the output of the aggregation operation (i.e., "123_WeeklyRollup"). Object 1056 corresponds to the addition operation represented by block 1012 and defines the input timeseries (i.e., "123_Cleanse" and "456_Cleanse"), the addition operation to be performed (i.e., "AddOP"), and the output of the addition operation (i.e., "123+456"). Although not specifically shown in FIG. 10B, code 1050 may include an object for each functional block in DAG 1000.

Advantageously, the declarative views defined by the DAGs provide a comprehensive view of the operations applied to various input timeseries. This provides flexibility to run the workflow defined by a DAG at query time (e.g., when a request for derived timeseries data is received) or prior to query time (e.g., when new raw data samples are received, in response to a defined event or trigger, etc.). This flexibility allows timeseries processing engine 304 to perform some or all of their operations ahead of time and/or in response to a request for specific derived data timeseries.

Referring again to FIG. 3, timeseries processing engine 304 is shown to include a DAG optimizer 318. DAG optimizer 318 can be configured to combine multiple DAGs or multiple steps of a DAG to improve the efficiency of the operations performed by timeseries operators 306. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 318 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 318 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 318 schedules timeseries operators 306 to nodes where data is resident in memory in order to further reduce the amount of data required to be loaded from timeseries storage 214.

Entity Graph

Figure 11A:
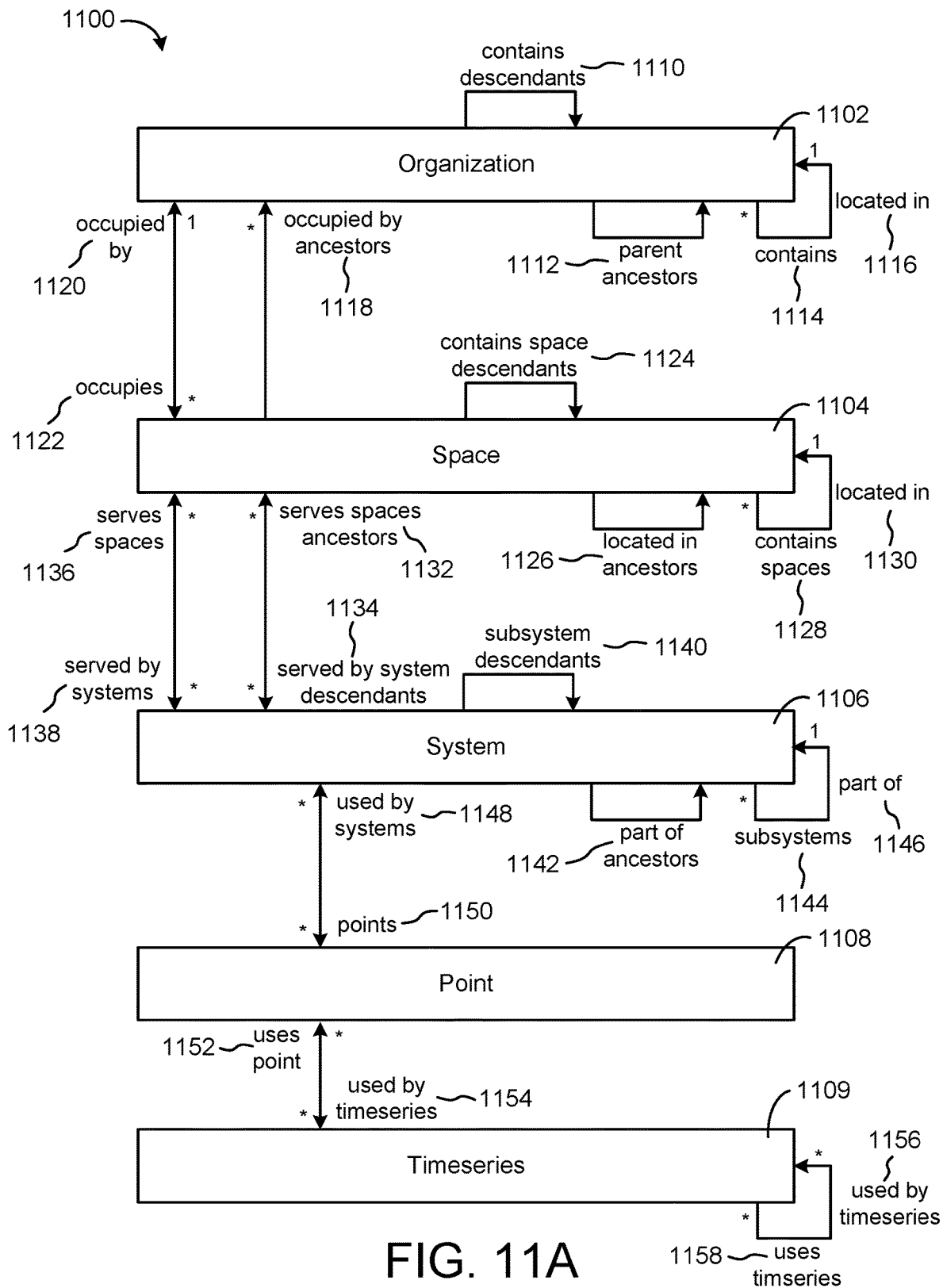
FIG. 11A is an entity graph illustrating relationships between an organization, a space, a system, a point, and a timeseries, which can be used by the data collector of FIG. 2, according to some embodiments.

Referring now to FIG. 11A, an entity graph 1100 is shown, according to some embodiments. In some embodiments, entity graph 1100 is generated or used by data collector 212, as described with reference to FIG. 2. Entity graph 1100 describes how collection of devices and spaces are organized and how the different devices and spaces relate to each other. For example, entity graph 1100 is shown to include an organization 1102, a space 1104, a system 1106, a point 1108, and a timeseries 1109. The arrows interconnecting organization 1102, space 1104, system 1106, point 1108, and timeseries 1109 identify the relationships between such entities. In some embodiments, the relationships are stored as attributes of the entity described by the attribute.

Organization 1102 is shown to include a contains descendants attribute 1110, a parent ancestors attribute 1112, a contains attribute 1114, a located in attribute 1116, an occupied by ancestors attribute 1118, and an occupies by attribute 1122. The contains descendants attribute 1110 identifies any descendant entities contained within organization 1102. The parent ancestors attribute 1112 identifies any parent entities to organization 1102. The contains attribute 1114 identifies any other organizations contained within organization 1102. The asterisk alongside the contains attribute 1114 indicates that organization 1102 can contain any number of other organizations. The located in attribute 1116 identifies another organization within which organization 1102 is located. The number 1 alongside the located in attribute 1116 indicates that organization 1102 can be located in exactly one other organization. The occupies attribute 1122 identifies any spaces occupied by organization 1102. The asterisk alongside the occupies attribute 1122 indicates that organization 1102 can occupy any number of spaces.

Space 1104 is shown to include an occupied by attribute 1120, an occupied by ancestors attribute 1118, a contains space descendants attribute 1124, a located in ancestors attribute 1126, a contains spaces attribute 1128, a located in attribute 1130, a served by systems attribute 1138, and a served by system descendants attribute 1134. The occupied by attribute 1120 identifies an organization occupied by space 1104. The number 1 alongside the occupied by attribute 1120 indicates that space 1104 can be occupied by exactly one organization. The occupied by ancestors attribute 1118 identifies one or more ancestors to organization 1102 that are occupied by space 1104. The asterisk alongside the occupied by ancestors attribute 1118 indicates that space 1104 can be occupied by any number of ancestors.

The contains space descendants attribute 1124 identifies any descendants to space 1104 that are contained within space 1104. The located in ancestors attribute 1126 identifies any ancestors to space 1104 within which space 1104 is located. The contains spaces attribute 1128 identifies any other spaces contained within space 1104. The asterisk alongside the contains spaces attribute 1128 indicates that space 1104 can contain any number of other spaces. The located in attribute 1130 identifies another space within which space 1104 is located. The number 1 alongside the located in attribute 1130 indicates that space 1104 can be located in exactly one other space. The served by systems attribute 1138 identifies any systems that serve space 1104. The asterisk alongside the served by systems attribute 1138 indicates that space 1104 can be served by any number of systems. The served by system descendants attribute 1134 identifies any descendent systems that serve space 1104. The asterisk alongside the served by descendant systems attribute 1134 indicates that space 1104 can be served by any number of descendant systems.

System 1106 is shown to include a serves spaces attribute 1136, a serves space ancestors attribute 1132, a subsystem descendants attribute 1140, a part of ancestors attribute 1142, a subsystems attribute 1144, a part of attribute 1146, and a points attribute 1150. The serves spaces attribute 1136 identifies any spaces that are served by system 1106. The asterisk alongside the serves spaces attribute 1136 indicates that system 1106 can serve any number of spaces. The serves space ancestors attribute 1132 identifies any ancestors to space 1104 that are served by system 1106. The asterisk alongside the serves ancestor spaces attribute 1132 indicates that system 1106 can serve any number of ancestor spaces.

The subsystem descendants attribute 1140 identifies any subsystem descendants of other systems contained within system 1106. The part of ancestors attribute 1142 identifies any ancestors to system 1106 that system 1106 is part of. The subsystems attribute 1144 identifies any subsystems contained within system 1106. The asterisk alongside the subsystems attribute 1144 indicates that system 1106 can contain any number of subsystems. The part of attribute 1146 identifies any other systems that system 1106 is part of. The number 1 alongside the part of attribute 1146 indicates that system 1106 can be part of exactly one other system. The points attribute 1150 identifies any data points that are associated with system 1106. The asterisk alongside the points attribute 1150 indicates that any number of data points can be associated with system 1106.

Point 1108 is shown to include a used by system attribute 1148. The asterisk alongside the used by system attribute 1148 indicates that point 1108 can be used by any number of systems. Point 1108 is also shown to include a used by timeseries attribute 1154. The asterisk alongside the used by timeseries attribute 1154 indicates that point 1108 can be used by any number of timeseries (e.g., raw data timeseries virtual point timeseries, data rollup timeseries, etc.). For example, multiple virtual point timeseries can be based on the same actual data point 1108. In some embodiments, the used by timeseries attribute 1154 is treated as a list of timeseries that subscribe to changes in value of data point 1108. When the value of point 1108 changes, the timeseries listed in the used by timeseries attribute 1154 can be identified and automatically updated to reflect the changed value of point 1108.

Timeseries 1109 is shown to include a uses point attribute 1152. The asterisk alongside the uses point attribute 1152 indicates that timeseries 1109 can use any number of actual data points. For example, a virtual point timeseries can be based on multiple actual data points. In some embodiments, the uses point attribute 1152 is treated as a list of points to monitor for changes in value. When any of the points identified by the uses point attribute 1152 are updated, timeseries 1109 can be automatically updated to reflect the changed value of the points used by timeseries 1109.

Timeseries 1109 is also shown to include a used by timeseries attribute 1156 and a uses timeseries attribute 1158. The asterisks alongside the used by timeseries attribute 1156 and the uses timeseries attribute 1158 indicate that timeseries 1109 can be used by any number of other timeseries and can use any number of other timeseries. For example, both a data rollup timeseries and a virtual point timeseries can be based on the same raw data timeseries. As another example, a single virtual point timeseries can be based on multiple other timeseries (e.g., multiple raw data timeseries). In some embodiments, the used by timeseries attribute 1156 is treated as a list of timeseries that subscribe to updates in timeseries 1109. When timeseries 1109 is updated, the timeseries listed in the used by timeseries attribute 1156 can be identified and automatically updated to reflect the change to timeseries 1109. Similarly, the uses timeseries attribute 1158 can be treated as a list of timeseries to monitor for updates. When any of the timeseries identified by the uses timeseries attribute 1158 are updated, timeseries 1109 can be automatically updated to reflect the updates to the other timeseries upon which timeseries 1109 is based.

Figure 11B:
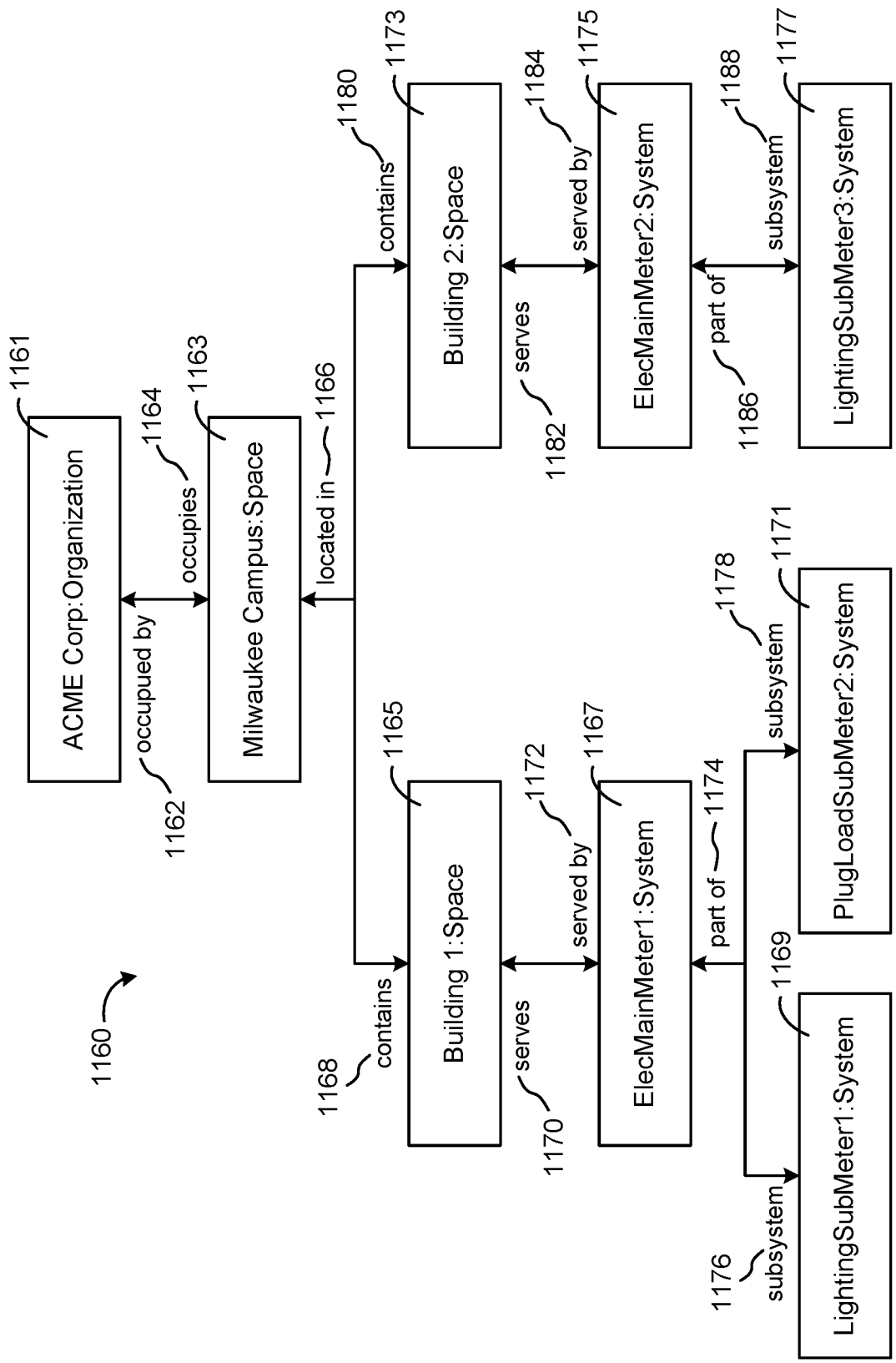
FIG. 11B is an example of an entity graph for a particular system of devices, according to some embodiments.

Referring now to FIG. 11B, an example of an entity graph 1160 for a particular system of devices is shown, according to some embodiments. Entity graph 1160 is shown to include an organization 1161 ("ACME Corp"). Organization 1161 be a collection of people, a legal entity, a business, an agency, or other type of organization. Organization 1161 occupies space 1163 ("Milwaukee Campus"), as indicated by the occupies attribute 1164. Space 1163 is occupied by organization 1161, as indicated by the occupied by attribute 1162.

In some embodiments, space 1163 is a top level space in a hierarchy of spaces. For example, space 1163 can represent an entire campus (i.e., a collection of buildings). Space 1163 can contain various subspaces (e.g., individual buildings) such as space 1165 ("Building 1") and space 1173 ("Building 2"), as indicated by the contains attributes 1168 and 1180. Spaces 1165 and 1180 are located in space 1163, as indicated by the located in attribute 1166. Each of spaces 1165 and 1173 can contain lower level subspaces such as individual floors, zones, or rooms within each building. However, such subspaces are omitted from entity graph 1160 for simplicity.

Space 1165 is served by system 1167 ("ElecMainMeter1") as indicated by the served by attribute 1172. System 1167 can be any system that serves space 1165 (e.g., a HVAC system, a lighting system, an electrical system, a security system, etc.). The serves attribute 1170 indicates that system 1167 serves space 1165. In entity graph 1160, system 1167 is shown as an electrical system having a subsystem 1169 ("LightingSubMeter1") and a subsystem 1171 ("PlugLoadSubMeter2") as indicated by the subsystem attributes 1176 and 1178. Subsystems 1169 and 1171 are part of system 1167, as indicated by the part of attribute 1174.

Space 1173 is served by system 1175 ("ElecMainMeter2") as indicated by the served by attribute 1184. System 1175 can be any system that serves space 1173 (e.g., a HVAC system, a lighting system, an electrical system, a security system, etc.). The serves attribute 1182 indicates that system 1175 serves space 1173. In entity graph 1160, system 1175 is shown as an electrical system having a subsystem 1177 ("LightingSubMeter3") as indicated by the subsystem attribute 1188. Subsystem 1177 is part of system 1175, as indicated by the part of attribute 1186.

In addition to the attributes shown in FIG. 11B, entity graph 1160 can include "ancestors" and "descendants" attributes on each entity in the hierarchy. The ancestors attribute can identify (e.g., in a flat list) all of the entities that are ancestors to a given entity. For example, the ancestors attribute for space 1165 may identify both space 1163 and organization 1161 as ancestors. Similarly, the descendants attribute can identify all (e.g., in a flat list) of the entities that are descendants of a given entity. For example, the descendants attribute for space 1165 may identify system 1167, subsystem 1169, and subsystem 1171 as descendants. This provides each entity with a complete listing of its ancestors and descendants, regardless of how many levels are included in the hierarchical tree. This is a form of transitive closure.

In some embodiments, the transitive closure provided by the descendants and ancestors attributes allows entity graph 1160 to facilitate simple queries without having to search multiple levels of the hierarchical tree. For example, the following query can be used to find all meters under the Milwaukee Campus space 1163:

/Systems?$filter=(systemType eq Jci.Be.Data.SystemType'Meter') and ancestorSpaces/any(a:a/name eq 'Milwaukee Campus')

and can be answered using only the descendants attribute of the Milwaukee Campus space 1163. For example, the descendants attribute of space 1163 can identify all meters that are hierarchically below space 1163. The descendants attribute can be organized as a flat list and stored as an attribute of space 1163. This allows the query to be served by searching only the descendants attribute of space 1163 without requiring other levels or entities of the hierarchy to be searched.

Figure 12:
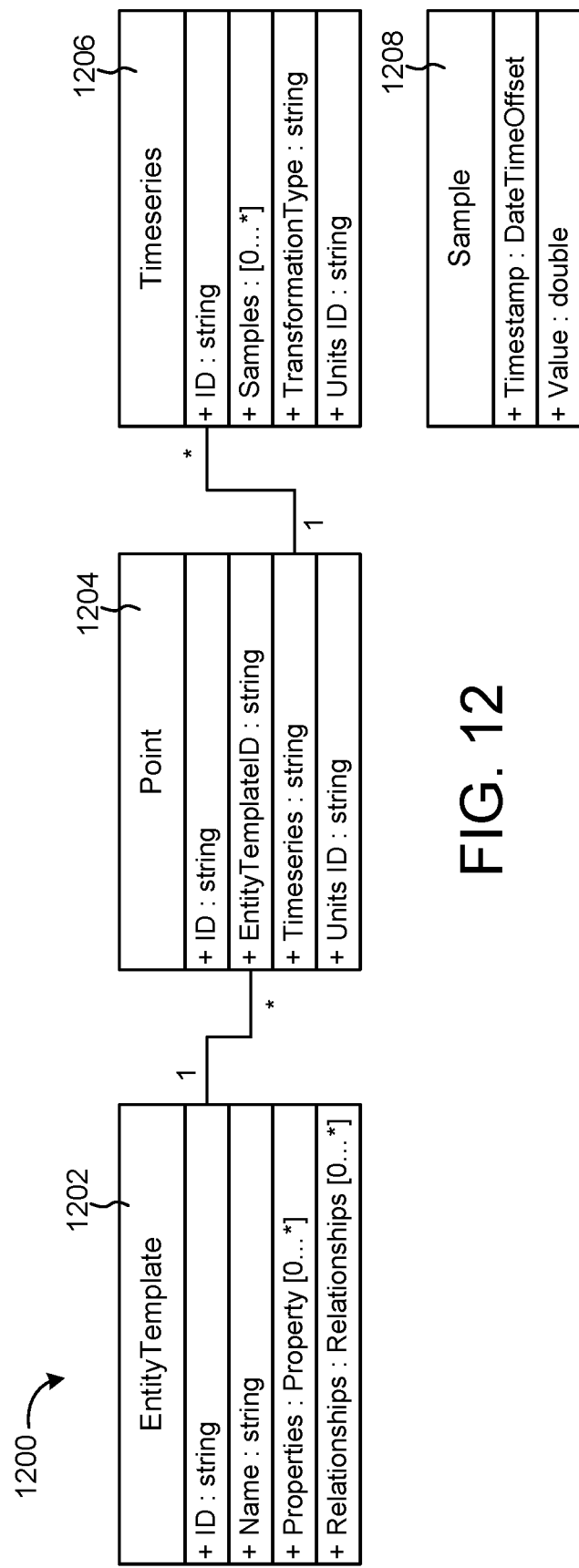
FIG. 12 is an object relationship diagram illustrating relationships between an entity template, a point, a timeseries, and a data sample, which can be used by the data collector of FIG. 2 and the timeseries service of FIG. 3, according to some embodiments.

Referring now to FIG. 12, an object relationship diagram 1200 is shown, according to some embodiments. Relationship diagram 1200 is shown to include an entity template 1202, a point 1204, a timeseries 1206, and a sample 1208. In some embodiments, entity template 1202, point 1204, timeseries 1206, and sample 1208 are stored as data objects within memory 210 or timeseries storage 214. Relationship diagram 1200 illustrates the relationships between entity template 1202, point 1204, and timeseries 1206.

Entity template 1202 can include various attributes such as an ID attribute, a name attribute, a properties attribute, and a relationships attribute. The ID attribute can be provided as a text string and identifies a unique ID for entity template 1202. The name attribute can also be provided as a text string and identifies the name of entity template 1202. The properties attribute can be provided as a vector and identifies one or more properties of entity template 1202. The relationships attribute can also be provided as a vector and identifies one or more relationships of entity template 1202.

Point 1204 can include various attributes such as an ID attribute, an entity template ID attribute, a timeseries attribute, and a units ID attribute. The ID attribute can be provided as a text string and identifies a unique ID for point 1204. The entity template ID attribute can also be provided as a text string and identifies the entity template 1202 associated with point 1204 (e.g., by listing the ID attribute of entity template 1202). Any number of points 1204 can be associated with entity template 1202. However, in some embodiments, each point 1204 is associated with a single entity template 1202. The timeseries attribute can be provided as a text string and identifies any timeseries associated with point 1204 (e.g., by listing the ID string of any timeseries 1206 associated with point 1204). The units ID attribute can also be provided as a text string and identifies the units of the variable quantified by point 1204.

Timeseries 1206 can include various attributes such as an ID attribute, a samples attribute, a transformation type attribute, and a units ID attribute. The ID attribute can be provided as a text string and identifies a unique ID for timeseries 1206. The unique ID of timeseries 1206 can be listed in the timeseries attribute of point 1204 to associate timeseries 1206 with point 1204. Any number of timeseries 1206 can be associated with point 1204. Each timeseries 1206 is associated with a single point 1204. The samples attribute can be provided as a vector and identifies one or more samples associated with timeseries 1206. The transformation type attribute identifies the type of transformation used to generate timeseries 1206 (e.g., average hourly, average daily, average monthly, etc.). The units ID attribute can also be provided as a text string and identifies the units of the variable quantified by timeseries 1206.

Sample 1208 can include a timestamp attribute and a value attribute. The timestamp attribute can be provided in local time and can include an offset relative to universal time. The value attribute can include a data value of sample 1208. In some instances, the value attribute is a numerical value (e.g., for measured variables). In other instances, the value attribute can be a text string such as "Fault" if sample 1208 is part of a fault detection timeseries.

Nested Stream Generation

Referring now to FIGS. 13A-15B, web services platform 102 can be configured to generate nested streams of timeseries data. Nested streams can include various types of derived timeseries created by processing DAGs. For example, nested streams can include data rollup timeseries, virtual point timeseries, weather point timeseries, fault detection timeseries, assigned state timeseries, abnormal event timeseries, and/or any other type of derived timeseries previously described. In some embodiments, the nested streams are created from input timeseries retrieved from timeseries storage 214 (as described with reference to FIGS. 13A-13B). In other embodiments, the nested streams are created from streaming data received in real-time from IoT devices 203 and/or other data sources (as described with reference to FIG. 14). In some embodiments, the nested streams are used as an intermediate timeseries in a timeseries processing workflow. For example, a first derived timeseries can be created by processing a first DAG and used as an input to a second DAG to create a second derived timeseries (as described with reference to FIGS. 15A-15B).

Timeseries Processing Workflow

Figure 13A:
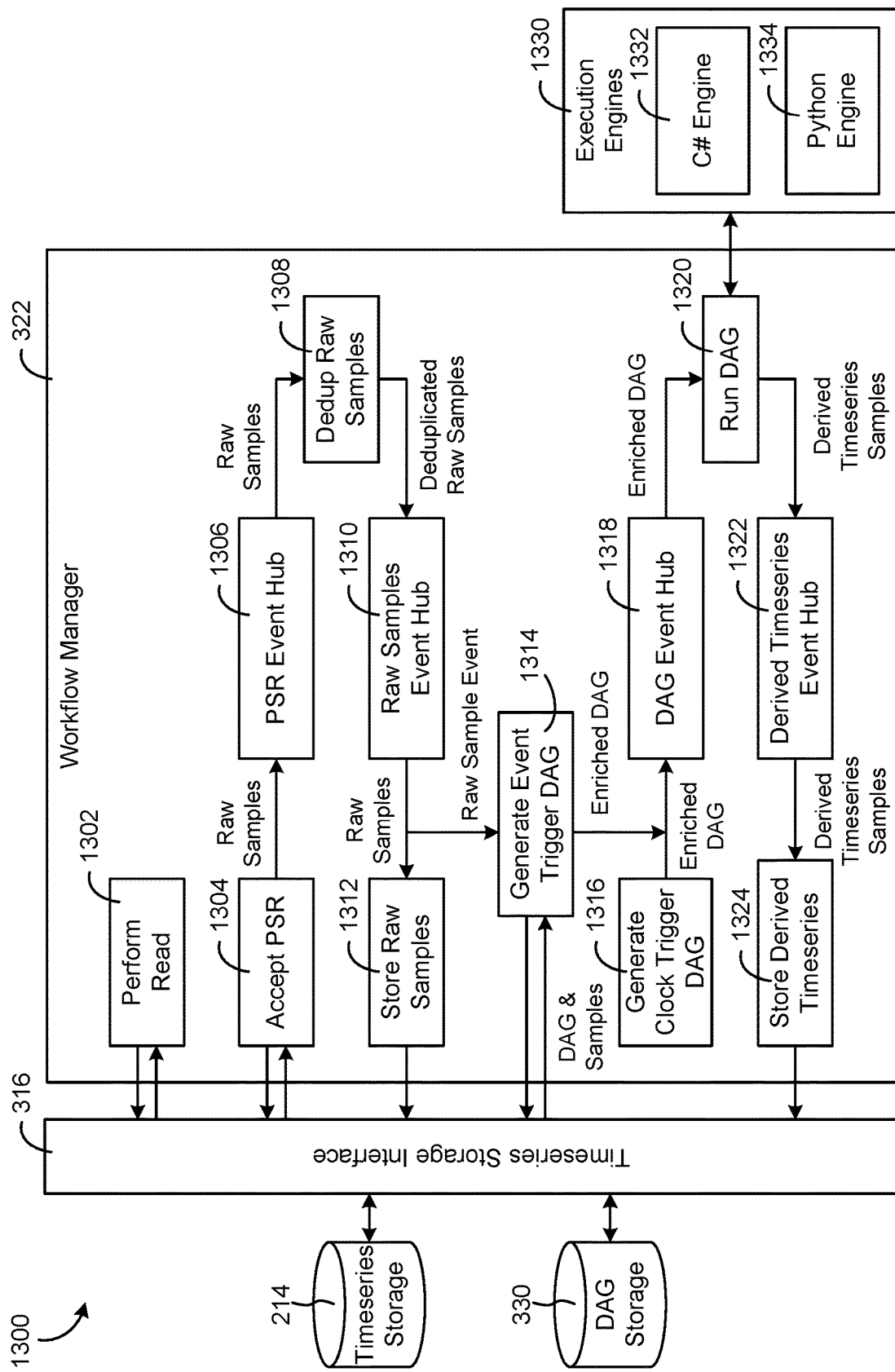
FIG. 13A is a block diagram illustrating a timeseries processing workflow which can be performed by the timeseries service of FIGS. 2-3, according to some embodiments.

Referring particularly to FIG. 13A, a block diagram illustrating a timeseries processing workflow 1300 is shown, according to an exemplary embodiment. Workflow 1300 may be performed by workflow manager 322 in combination with other components of timeseries service 228. Workflow 1300 is shown to include performing a read of the timeseries data (step 1302). Step 1302 may include reading raw data samples and/or the derived data samples provided by timeseries storage interface 316. The timeseries data may be stored in timeseries storage 214. In some embodiments, timeseries storage 214 includes on-site data storage (e.g., Redis, PostgreSQL, etc.) and/or cloud data storage (e.g., Azure Redis, DocDB, HBase, etc.).

Timeseries storage interface 316 can be configured to read and write a timeseries collection, a samples collection, and a post sample request (PSR) collection. Each of these collections can be stored in timeseries storage 214. The timeseries collection may contain all the timeseries registered in workflow manager 322. The timeseries collection may also contain the DAG for each timeseries. The timeseries collection can be used by workflow manager 322 to accept only PSRs related to valid timeseries registered in workflow manager 322. The timeseries collection can also be used in steps 1314-1316 to lookup the DAG for a specific timeseries ID.

In some embodiments, the entire timeseries collection is loaded into local memory. The timeseries collection can be a regular collection or a partitioned collection (e.g., one partition for approximately every 100 timeseries). In some embodiments, the timeseries collection contains about 200,000 to 250,000 timeseries. The ID for each document in the timeseries collection may be the timeseries ID. The DAG for each timeseries may contain a set of operations and/or transformations that need to be performed to generate the derived timeseries data based on the timeseries. On registration of a new timeseries, the DAG for the timeseries can be selected from DAG templates. The DAG template may include a set of standard operations applicable to the timeseries. On definition of a new metric for a timeseries, the new metric and the list of operations to generate that metric can be added to the DAG.

The samples collection may contain all of the timeseries samples (e.g., raw samples, derived timeseries samples). The samples collection can be used for all GET requests for a specific timeseries ID. A portion of the samples collection can be stored in local memory (e.g., past 48 hours) whereas the remainder of the samples collection can be stored in timeseries storage 214. The samples collection may act as a partitioned collection instead of a regular collection to improve efficiency and performance. In some embodiments, the samples collection is stored in a JSON format and partitioned on timeseries ID. The ID field may be unique for each partition and may have the form "Metric: Timestamp."

The PSR collection may contain all of the PSRs and can be used to provide status updates to the user for a PSR related to a specific timeseries ID. A portion of the PSR collection can be stored in local memory (e.g., past 48 hours) whereas the remainder of the PSR collection can be stored in timeseries storage 214. The PSR collection can be partitioned on timeseries ID. In some embodiments, the ID for each document in the PSR collection has the form "TimeseriesID: Timestamp."

Still referring to FIG. 13A, workflow 1300 is shown to include accepting a PSR (step 1304). Step 1304 may be performed by executing a PSR process. In some embodiments, the PSR process receives a PSR and determines whether the PSR contains more than one timeseries ID. In response to a determination that the PSR contains more than one timeseries ID, the PSR process may break the PSR into multiple PSRs, each of which is limited to a single timeseries ID. The PSRs can be provided to PSR event hub 1306. PSR event hub 1306 can be configured to store PSR events. Each PSR event may include a PSR for one timeseries ID. In some embodiments, each PSR event is stored in the form "TimeseriesID: Timestamp."

Workflow 1300 is shown to include deduplicating raw samples (step 1308). Step 1308 may be performed by executing a deduplication process. In some embodiments, the deduplication process includes accepting PSR events from PSR event hub 1306 and splitting each PSR into a list of samples. Step 1308 may include tagging each sample as a new sample, an updated sample, or a duplicate sample. New samples and updated samples can be sent to raw samples event hub 1310, whereas duplicate samples may be discarded. In some embodiments, step 1308 is deployed on Azure using Azure Worker Roles. Step 1308 can include checking for duplicate samples in timeseries storage 214 as well as the samples that are currently in raw samples event hub 1310.

In some embodiments, the deduplication process in step 1308 removes all duplicate data samples such that only a single unique copy of each data sample remains. Removing all duplicate samples may ensure that aggregate operations produce accurate aggregate values. In other embodiments, the deduplication process in step 1308 is configured to remove most, but not all, duplicate samples. For example, the deduplication process can be implemented using a Bloom filter, which allows for the possibility of false positives but not false negatives. In step 1308, a false positive can be defined as a non-duplicate new or updated sample. Accordingly, some duplicates may be flagged as non-duplicate, which introduces the possibility that some duplicate samples may not be properly identified and removed. The deduplicated raw samples can be sent to raw samples event hub 1310.

Workflow 1300 is shown to include storing the raw samples (step 1312). Step 1312 can include accepting the raw samples from raw samples event hub 1310 and pushing the raw samples to persistent storage. In some embodiments, step 1312 is deployed on Azure using Azure Worker Roles. The worker role may generate requests at a rate based on X % of the capacity of the storage. For example, if the capacity of the storage is 10,000 storage units and X % is 20% (e.g., 20% of the storage throughput is reserved for sample writes), and each write takes 5 storage units, step 1312 may generate a total of 400 writes per second $$\left(\text{i.e., } \frac{10{,}000*20\%}{5} = 400\right).$$

Workflow 1300 is shown to include generating an event trigger DAG (step 1314). Step 1314 can be performed by executing an event trigger DAG process. Step 1314 may include accepting events (samples) from raw samples event hub 1310. For each sample event, step 1314 may include identifying the timeseries ID of the sample and accessing the timeseries collection to obtain the DAG for the corresponding timeseries. Step 1314 may include identifying each derived data timeseries generated by the DAG and each operation included in the DAG. In some embodiments, step 1314 tags each operation to indicate whether the operation should be sent to the C #engine 1332 or the Python engine 1334 for execution. Step 1314 may include identifying and fetching any additional data (e.g., samples, timeseries, parameters, etc.) which may be necessary to perform the operations defined by the DAG. Step 1314 may generate an enriched DAG which includes the original DAG along with all the data necessary to perform the operations defined by the DAG. The enriched DAG can be sent to the DAG event hub 1318.

In some embodiments, workflow 1300 includes generating a clock trigger DAG (step 1316). Step 1316 can be performed by executing a clock trigger DAG process. Step 1316 may be similar to step 1314. However, step 1316 may be performed in response to a clock trigger rather than in response to receiving a raw sample event. The clock trigger can periodically trigger step 1316 to perform batch queries (e.g., every hour). Step 1316 may include identifying a timeseries ID specified in the clock trigger and accessing the timeseries collection to obtain the DAG for the corresponding timeseries. Step 1316 may include identifying each derived data timeseries generated by the DAG and each operation included in the DAG. In some embodiments, step 1316 tags each operation to indicate whether the operation should be sent to the C #engine 1332 or the Python engine 1334 for execution. Step 1316 may include identifying and fetching any additional data (e.g., samples, timeseries, parameters, etc.) which may be necessary to perform the operations defined by the DAG. Step 1316 may generate an enriched DAG which includes the original DAG along with all the data necessary to perform the operations defined by the DAG. The enriched DAG can be sent to the DAG event hub 1318.

DAG event hub 1318 can be configured to store enriched DAG events. Each enriched DAG event can include an enriched DAG. The enriched DAG may include a DAG for a particular timeseries along with all the data necessary to perform the operations defined by the DAG. DAG event hub 1318 can provide the enriched DAG events to step 1320.

Still referring to FIG. 13A, workflow 1300 is shown to include running the DAG (step 1320). Step 1320 can include accepting enriched DAG events from DAG event hub 1318 and running through the sequence of operations defined by the DAG. Workflow manager 322 can submit each operation in series to execution engines 1330 and wait for results before submitting the next operation. Execution engines 1330 may include a C #engine 1332, a Python engine 1334, or any other engine configured to perform the operations defined by the DAG. In some embodiments, execution engines 1330 include timeseries operators 306. When a given operation is complete, execution engines 1330 can provide the results of the operation to workflow manager 322. Workflow manager 322 can use the results of one or more operations as inputs for the next operation, along with any other inputs that are required to perform the operation. In some embodiments, the results of the operations are the derived timeseries samples. The derived timeseries samples can be provided to derived timeseries event hub 1322.

Derived timeseries event hub 1322 can be configured to store derived timeseries sample. Each derived timeseries sample may include a sample of a derived timeseries. The derived timeseries may include the results of the operations performed by execution engines 1330. Derived timeseries event hub 1322 can provide the derived timeseries samples to step 1324.

Workflow 1300 is shown to include storing the derived timeseries samples (step 1324). Step 1324 can include accepting derived timeseries samples from derived timeseries event hub 1322 and storing the derived timeseries samples in persistent storage (e.g., timeseries storage 214). In some embodiments, step 1324 is deployed on Azure using Azure Worker Roles. The worker role may generate requests at a rate based on Y % of the capacity of the storage. For example, if the capacity of the storage is 10,000 storage units and Y % is 50% (e.g., 50% of the storage throughput is reserved for sample writes), and each write takes 5 storage units, step 1324 may generate a total of 1,000 writes per second $$\left(\text{i.e., } \frac{10{,}000*50\%}{5} = 1{,}000\right).$$

Figure 13B:
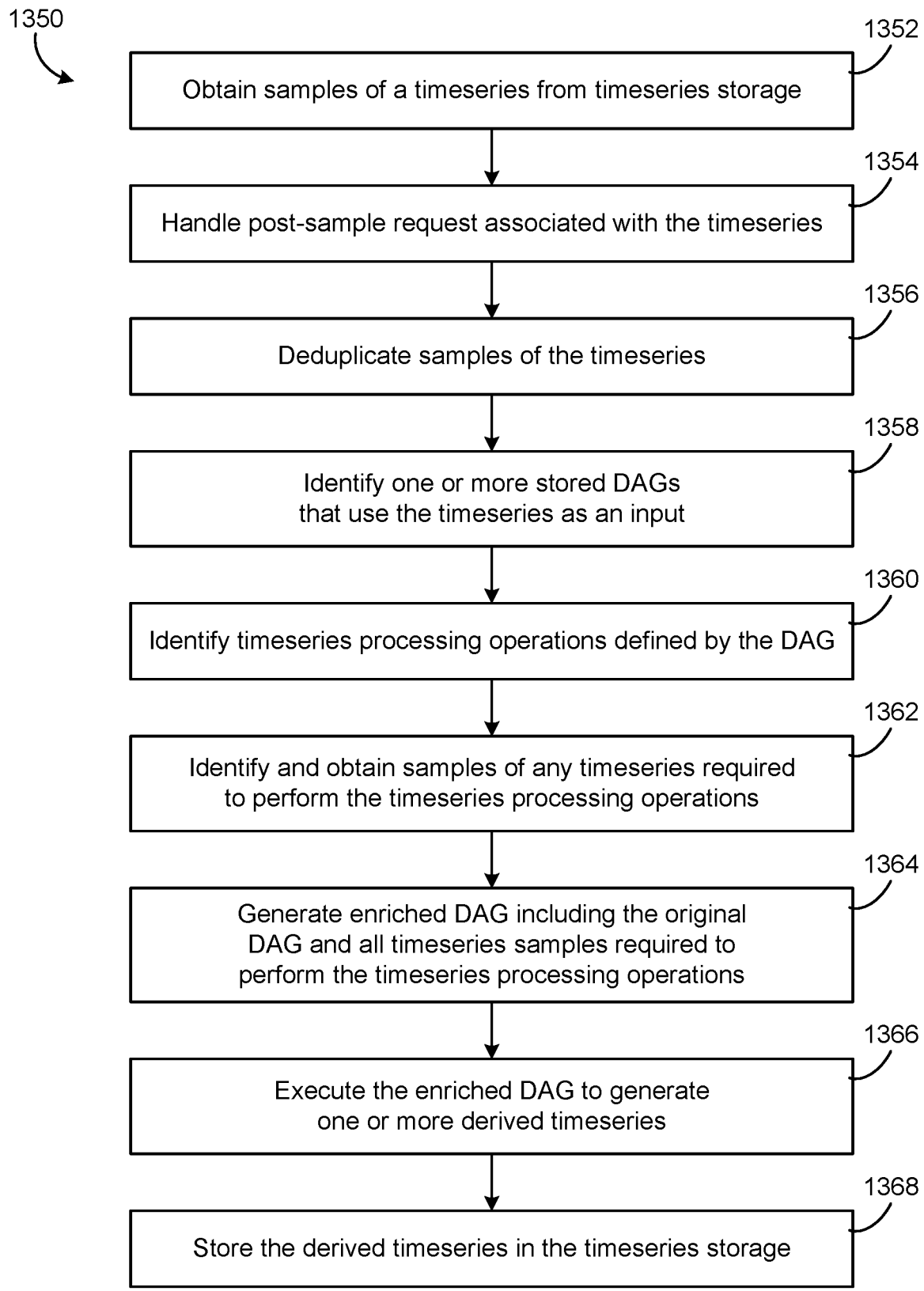
FIG. 13B is a flowchart of a process which can be performed by the workflow manager of FIG. 13A, according to some embodiments.

Referring now to FIG. 13B, a flowchart of a process 1350 for obtaining and processing timeseries data is shown, according to an exemplary embodiment. Process 1350 can be performed by workflow manager 322 in combination with other components of timeseries service 228. Process 1350 is shown to include obtaining samples of a timeseries from timeseries storage (step 1352). Step 1352 may include obtaining raw data samples and/or derived data samples via timeseries storage interface 316. The samples of the timeseries may be obtained from timeseries storage 214 or received in real-time from a sensor or other device that generates the samples. Step 1352 can include loading the entire timeseries or a subset of the samples of the timeseries into local memory. For example, some of the samples of the timeseries may be stored in local memory (e.g., past 48 hours) whereas the remainder of the samples of the timeseries can be stored in timeseries storage 214.

Process 1350 is shown to include handling a post-sample request (PSR) associated with the timeseries (step 1354). The PSR may be obtained from a PSR collection via timeseries storage interface 316. The PSR can be used to provide status updates to the user for a specific timeseries ID. In some embodiments, step 1354 includes receiving a PSR and determining whether the PSR contains more than one timeseries ID. In response to a determination that the PSR contains more than one timeseries ID, step 1354 may include breaking the PSR into multiple PSRs, each of which is limited to a single timeseries ID. The PSRs can be provided to PSR event hub 1306 and stored as PSR events. Each PSR event may include a PSR for one timeseries ID. In some embodiments, each PSR event is stored in the form "TimeseriesID: Timestamp."

Process 1350 is shown to include deduplicating samples of the timeseries (step 1356). Step 1356 may be performed by executing a deduplication process. In some embodiments, the deduplication process includes accepting PSR events from PSR event hub 1306 and splitting each PSR into a list of samples. Step 1356 may include tagging each sample as a new sample, an updated sample, or a duplicate sample. New samples and updated samples can be sent to raw samples event hub 1310, whereas duplicate samples may be discarded. In some embodiments, step 1356 is deployed on Azure using Azure Worker Roles. Step 1356 can include checking for duplicate samples in timeseries storage 214 as well as the samples that are currently in raw samples event hub 1310.

In some embodiments, the deduplication process in step 1356 removes all duplicate data samples such that only a single unique copy of each data sample remains. Removing all duplicate samples may ensure that aggregate operations produce accurate aggregate values. In other embodiments, the deduplication process in step 1356 is configured to remove most, but not all, duplicate samples. For example, the deduplication process can be implemented using a Bloom filter, which allows for the possibility of false positives but not false negatives. In step 1356, a false positive can be defined as a non-duplicate new or updated sample. Accordingly, some duplicates may be flagged as non-duplicate, which introduces the possibility that some duplicate samples may not be properly identified and removed. The deduplicated samples can be sent to raw samples event hub 1310.

Still referring to FIG. 13B, process 1350 is shown to include identifying one or more stored DAGs that use the timeseries as an input (step 1358). Step 1358 can include obtaining the stored DAGs via timeseries via timeseries storage interface 316 and identifying the required timeseries inputs of each DAG. For each DAG that uses the timeseries as an input, process 1350 can identify the timeseries processing operations defined by the DAG (step 1360). The timeseries processing operations can include data cleansing operations, data aggregation operations, timeseries adding operations, virtual point calculation operations, or any other type of operation that can be applied to one or more input timeseries.

Process 1350 is shown to include identifying and obtaining samples of any timeseries required to perform the timeseries processing operations (step 1362). The timeseries can be identified by inspecting the inputs required by each of the timeseries processing operations identified in step 1360. For example, DAG 1000 in FIG. 10A is shown to include both "Timeseries ID: 123" and "Timeseries ID: 456" as required inputs. Assuming that samples of the timeseries ID 123 are obtained in step 1352, DAG 1000 can be identified in step 1358 as a DAG that uses the timeseries ID 123 as an input. The timeseries identified in step 1362 can include timeseries ID 123, timeseries ID 456, or any other timeseries used as an input to DAG 1000. Step 1362 may include identifying and fetching any additional data (e.g., samples, timeseries, parameters, etc.) which may be necessary to perform the operations defined by the DAG.

In some embodiments, the samples obtained in step 1362 are based on the timeseries processing operations defined by the DAG, as well as the timestamps of the original samples obtained in step 1352. For example, the DAG may include a data aggregation operation that aggregates a plurality of data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the samples obtained in step 1352.

Step 1362 can include using the DAG to identify the duration of the time window (e.g., an hour, a day, a week, etc.) over which the data aggregation operation will be performed. Step 1362 can include using the timestamps of the data samples obtained in step 1352 identify the location of the time window (i.e., the start time and the end time). Step 1362 can include setting the start time and end time of the time window such that the time window has the identified duration and includes the timestamps of the data samples obtained in step 1352. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries. Once the appropriate time window has been set and the other input timeseries are identified, step 1362 can obtain samples of any input timeseries to the DAG that have timestamps within the appropriate time window. The input timeseries can include the original timeseries identified in step 1352 and any other timeseries used as input to the DAG.

Process 1350 is shown to include generating an enriched DAG including the original DAG and all timeseries samples required to perform the timeseries processing operations (step 1364). The original DAG may be the DAG identified in step 1358. The timeseries samples required to perform the timeseries processing operations may include any of the timeseries samples obtained in step 1362. In some embodiments, step 1364 includes identifying each derived data timeseries generated by the DAG and each operation included in the DAG. In some embodiments, step 1364 tags each operation to indicate a particular execution engine (e.g., C #engine 1332, Python engine 1334, etc.) to which the processing operation should be sent for execution.

Process 1350 is shown to include executing the enriched DAG to generate one or more derived timeseries (step 1366). Step 1366 can include submitting each timeseries processing operation in series to execution engines 1330 and waiting for results before submitting the next operation.

When a given operation is complete, execution engines 1330 can provide the results of the operation to workflow manager 322. Process 1350 can use the results of one or more operations as inputs for the next operation, along with any other inputs that are required to perform the operation. In some embodiments, the results of the operations are the derived timeseries samples.

Process 1350 is shown to include storing the derived timeseries in the timeseries storage (step 1368). The derived timeseries may include the results of the operations performed in step 1366. Step 1368 can include accepting derived timeseries samples from derived timeseries event hub 1322 and storing the derived timeseries samples in persistent storage (e.g., timeseries storage 214). In some embodiments, step 1368 is deployed on Azure using Azure Worker Roles. The worker role may generate requests at a rate based on Y % of the capacity of the storage. For example, if the capacity of the storage is 10,000 storage units and Y % is 50% (e.g., 50% of the storage throughput is reserved for sample writes), and each write takes 5 storage units, step 1368 may generate a total of 1,000 writes per second $$\left(\text{i.e., } \frac{10{,}000 * 50\%}{5} = 1{,}000\right).$$

Streaming Data Processing

Figure 14:
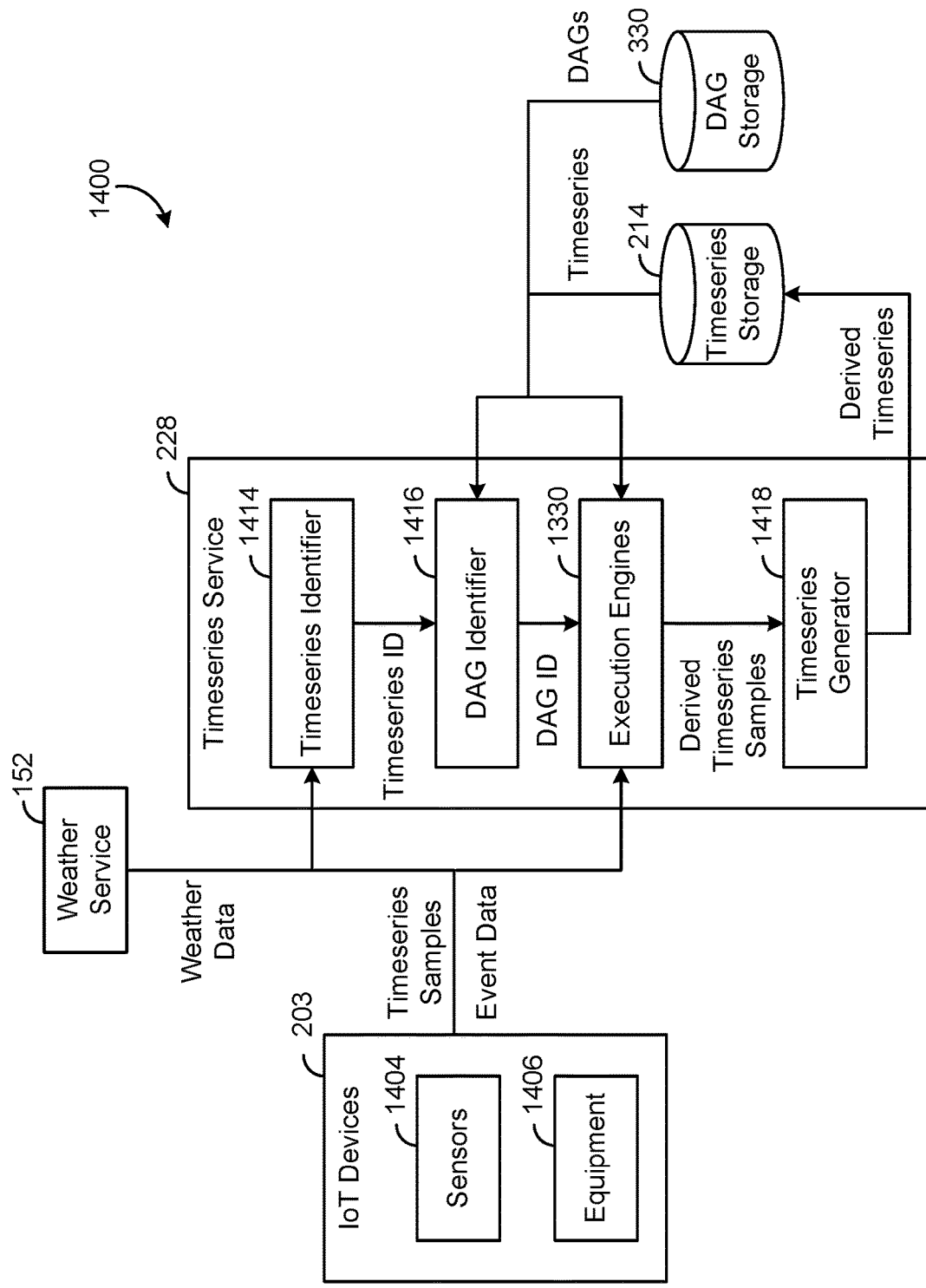
FIG. 14 is a block diagram of a system for processing streaming data, which may be implemented as part of the web services platform of FIG. 2, according to some embodiments.

Referring now to FIG. 14, a system 1400 for processing streaming data is shown, according to an exemplary embodiment. System 1400 can be implemented as part of web services platform 102 and may include various systems or devices configured to collect and process timeseries data. For example, system 1400 is shown to include IoT devices 203, timeseries service 228, a weather service 152, timeseries storage 214.

IoT devices 203 may include any of a variety of sensors 1404, physical devices or equipment 1406 (e.g., actuators, electronics, vehicles, home appliances, etc.) and/or other items having network connectivity which enable IoT devices 203 to communicate with web services platform 102. For example, IoT devices 203 can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. In some embodiments, IoT devices 203 include some or all of devices 112-116, 122-126, 132-136, and 142-146, as described with reference to FIG. 1.

IoT devices 203 are shown providing timeseries samples and event data to timeseries service 228. Timeseries samples can include measurements obtained by sensors 1404. For example, sensors 1404 can collect various types of measurements and send the measurements to timeseries service 228. In some embodiments, each measurement includes a measured value indicating a value of the measured variable and a timestamp indicating a time at which the variable was measured. Timeseries samples may also include monitored variables or states of equipment 1406. For example, IoT devices 203 may store internal variables that represent equipment states (e.g., equipment on/off, door open/closed, equipment operating at 50% capacity, etc.). Each timeseries sample may include a values of a particular variable or state and a timestamp indicating a time at which the variable or state was observed.

Event data may include any type of data describing various events observed by IoT devices 203. Each sample of event data may include a description or indication of the event and a timestamp indicating when the event occurred. For example, event data may include badge access events that occur when a person scans an ID badge at a card reader of equipment 1406 (e.g., a particular badge was scanned at a particular card reader at a particular time). Event data may include security events generated by security equipment (e.g., intruder detected at south entrance). Event data may include alarms or faults detected by equipment 1406 and/or other types of IoT devices 203 (e.g., a particular fault occurred within a particular device of equipment 1406 at a particular time).

Weather service 152 is shown providing weather data to timeseries service 228. Weather data may include samples of various weather-related variables observed by weather service 152. For example, weather data can include temperature data, humidity data, precipitation data, wind speed data, cloud position data, atmospheric pressure data, and/or other types of weather-related variables. Weather data can include current values of the weather-related variables, past values of the weather-related variables (e.g., historical values), and/or future values of the weather-related variables (e.g., predicted or estimated values). Each sample of the weather data may include a value of a particular weather-related variable and a timestamp indicating a time at which the corresponding value was observed or a time for which the corresponding value is predicted.

Timeseries service 228 is shown to include a timeseries identifier 1414, a DAG identifier 1416, execution engines 1330, and a timeseries generator 1418. Timeseries identifier 1414 can receive the timeseries samples and event data from IoT devices 203 and the weather data from weather service 152. Timeseries identifier 1414 can identify a timeseries associated with each incoming data sample. The identified timeseries for a particular data sample may be a raw data timeseries stored in timeseries storage 214 that contains a series of values for the same variable or data source. For example, timeseries can be stored in the following format: [<key, timestamp$_1$, value$_1$>, <key, timestamp$_2$, value$_2$>, <key, timestamp$_3$, value$_3$>] where key is an identifier of the source of the data samples (e.g., timeseries ID, sensor ID, etc.), timestamp$_i$ identifies a time associated with the ith sample, and value$_i$ indicates the value of the ith sample. Timeseries identifier 1414 can use attributes of the incoming data samples (e.g., data source, sensor ID, variable ID, etc.) to identify a particular timeseries associated with each sample and can provide the identified timeseries ID to DAG identifier 1416.

DAG identifier 1416 can use the timeseries ID received from timeseries identifier 1414 to identify one or more DAGs that use the identified timeseries as an input. As described above, a DAG may be a predefined sequence of processing operations that transform one or more input timeseries into one or more output timeseries. Accordingly, each DAG may have one or more input timeseries associated therewith. In some embodiments, the input timeseries for each DAG are stored as attributes of the DAG in DAG storage 330. DAG identifier 1416 can read such information from DAG storage 330 to determine which of the stored DAGs use the identified timeseries as an input. DAG identifier 1416 can then provide an indication of the identified DAGs to execution engines 1330 in the form of one or more DAG IDs.

As described above, execution engines 1330 can include a C #engine 1332, a Python engine 1334, or any other engine configured to perform the operations defined by a DAG. In some embodiments, execution engines 1330 include timeseries operators 306. Execution engines 1330 can receive the incoming data from IoT devices 203 and weather service 152 (i.e., the timeseries samples, event data, and weather data), as well as the DAG IDs from DAG identifier 1416. Execution engines 1330 can execute the DAGs, using the incoming data as an input, to generate derived timeseries samples. Each derived timeseries sample may be the result of a timeseries processing operation that uses an incoming data sample as an input. In some embodiments, each derived timeseries sample includes a key (e.g., a timeseries ID), a timestamp, and a value.

One type of derived timeseries sample is a virtual point sample. Execution engines 1330 can calculate virtual data points by applying any of a variety of mathematical operations or functions to actual data points or other virtual data points. For example, execution engines 1330 can calculate a virtual data point ($pointID_3$) by adding two or more actual data points ($pointID_1$ and $pointID_2$) (e.g., $pointID_3 = pointID_1 + pointID_2$). As another example, execution engines 1330 can calculate an enthalpy data point ($pointID_4$) based on a measured temperature data point ($pointID_5$) and a measured pressure data point ($pointID_6$) (e.g., $pointID_4 = enthalpy(pointID_5, pointID_6)$). In some instances, a virtual data point can be derived from a single actual data point. For example, execution engines 1330 can calculate a saturation temperature ($pointID_7$) of a known refrigerant based on a measured refrigerant pressure ($pointID_8$) (e.g., $pointID_7 = T_{sat}(pointID_8)$).

Another type of derived timeseries sample is a virtual weather point sample. Execution engines 1330 can calculate values of virtual weather point samples by applying the timeseries processing operations defined by a DAG to the incoming weather data. For example, execution engines 1330 can perform weather-based calculations using the incoming weather data to generate values for weather-related variables such as cooling degree days (CDD), heating degree days (HDD), cooling energy days (CED), heating energy days (HED), and normalized energy consumption. These and other examples of weather-related derived timeseries samples are described in detail with reference to weather point calculator 312.

Another type of derived timeseries sample is a sample of a fault detection timeseries. Execution engines 1330 can evaluate fault detection rules defined by a DAG to detect faults in the incoming data. For example, execution engines 1330 can apply the fault detection rules to the input timeseries samples to determine whether each sample of the input timeseries qualifies as a fault. In some embodiments, each derived timeseries sample includes a timestamp and a fault detection value. The timestamp can be the same as the timestamp of the corresponding data sample of the input timeseries. The fault detection value can indicate whether the corresponding data sample of the data timeseries qualifies as a fault. For example, the fault detection value can have a value of "Fault" if a fault is detected and a value of "Not in Fault" if a fault is not detected in the corresponding data sample of the data timeseries.

Another type of derived timeseries sample is a sample of an abnormal event timeseries. Execution engines 1330 can evaluate abnormal event detection rules defined by a DAG to detect abnormal events in the event data. For example, execution engines 1330 can apply the abnormal event detection rules to the event data to determine whether each sample of the event data qualifies as an abnormal event. In some embodiments, each derived timeseries sample of an abnormal event timeseries includes a timestamp and an abnormal event value. The timestamp can be the same as the timestamp of the corresponding sample of the event data. The abnormal event value can indicate whether the corresponding sample of the event data is normal or abnormal. For example, the abnormal event value can have a value of "Abnormal" if the event meets the criteria for abnormal events and a value of "Normal" if the event does not meet the criteria for abnormal events.

In some embodiments, an event is considered abnormal if it deviates significantly from other similar events (e.g., events associated with the same individual, the same space, the same equipment, etc.). For example, if the event data indicates that a particular person typically badges into a building between 8:30 AM and 9:00 AM every day, an event indicating that the person is badging into the building at 3:00 AM may be considered abnormal. Similarly, if the weather data indicates that a particular building typically experiences outdoor air temperatures between 30° F. and 40° F. during a particular month, a temperature of 60° F. during that month may be considered abnormal.

Timeseries generator 1418 can use the derived timeseries samples to generate various derived timeseries. The derived timeseries can include data rollup timeseries, virtual point timeseries, weather point timeseries, fault detection timeseries, assigned state timeseries, abnormal event timeseries, and/or any other type of derived timeseries created by executing the identified DAGs. Timeseries generator 1418 can store the derived timeseries in timeseries storage 214 or other persistent storage.

Iterative Timeseries Processing

Figure 15A:
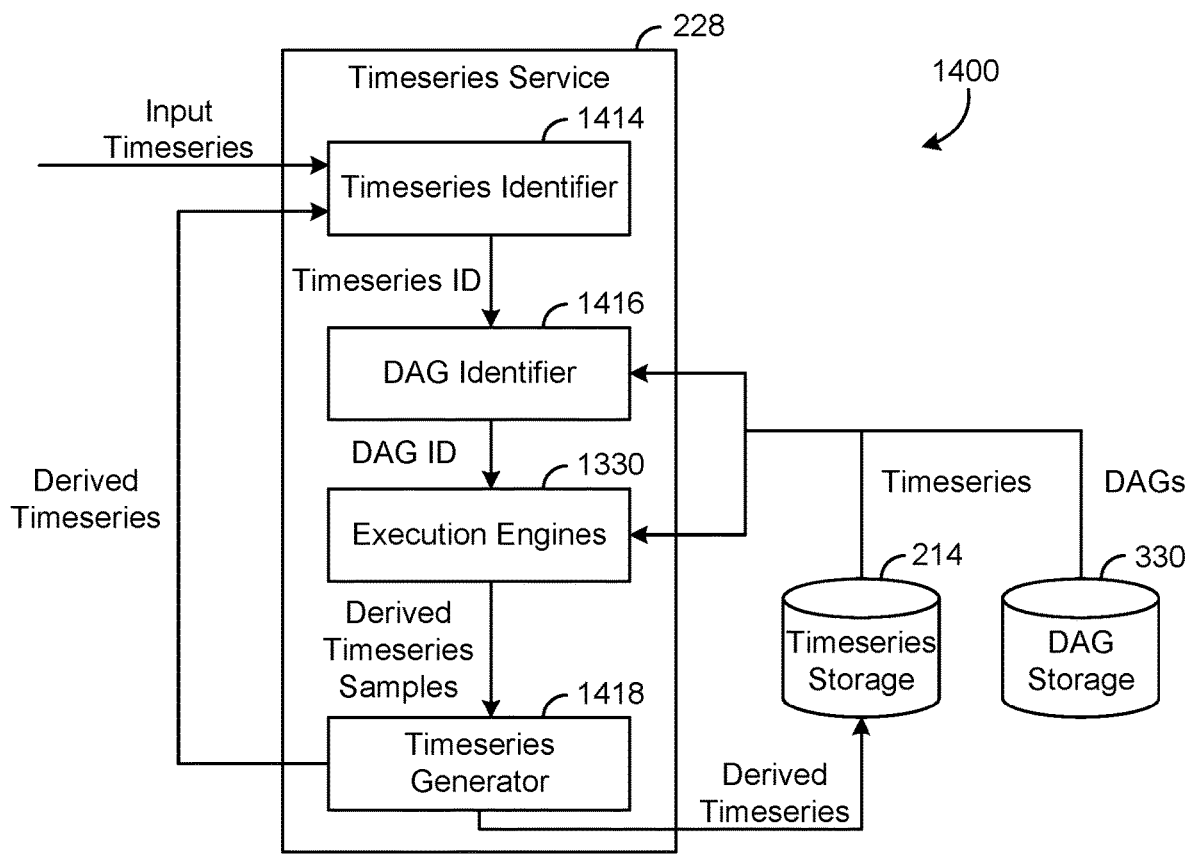
FIG. 15A is a block diagram illustrating an iterative timeseries processing technique used by the system of FIG. 14, according to some embodiments.

Referring now to FIG. 15A, system 1400 can be configured perform iterative timeseries processing. For example, timeseries identifier 1414 is shown receiving an input timeseries. The input timeseries can be a raw data timeseries, a derived timeseries, or a collection of timeseries samples received from IoT devices 203 or weather service 152 in real-time (e.g., incoming streaming data). Timeseries identifier 1414 identify a timeseries ID associated with the input timeseries and can provide the timeseries ID to DAG identifier 1416.

DAG identifier 1416 can use the timeseries ID received from timeseries identifier 1414 to identify one or more DAGs that use the input timeseries as an input. As described above, a DAG may be a predefined sequence of processing operations that transform one or more input timeseries into one or more output timeseries. Accordingly, each DAG may have one or more input timeseries associated therewith. In some embodiments, the input timeseries for each DAG are stored as attributes of the DAG in DAG storage 330. DAG identifier 1416 can read such information from DAG storage 330 to determine which of the stored DAGs use the input timeseries as an input. DAG identifier 1416 can then provide an indication of the identified DAGs to execution engines 1330 in the form of one or more DAG IDs.

Execution engines 1330 can execute the identified DAGs, using the input timeseries as an input, to generate derived timeseries samples. Timeseries generator 1418 can then assemble the derived timeseries samples into a first derived timeseries. The first derived timeseries can be stored in timeseries storage 214. The first derived timeseries can also be provided as an input to timeseries identifier 1414.

Timeseries identifier 1414 can treat the first derived timeseries as an input and the entire process can be repeated. For example, timeseries identifier 1414 identify a timeseries ID associated with the first derived timeseries and can provide the timeseries ID to DAG identifier 1416. DAG identifier 1416 can use the timeseries ID received from timeseries identifier 1414 to identify one or more DAGs that use the first derived timeseries as an input. DAG identifier 1416 can then provide an indication of the identified DAGs to execution engines 1330 in the form of one or more DAG IDs. Execution engines 1330 can execute the identified DAGs, using the first derived timeseries as an input, to generate derived timeseries samples. Timeseries generator 1418 can then assemble the derived timeseries samples into a second derived timeseries. The second derived timeseries can be stored in timeseries storage 214.

Figure 15B:
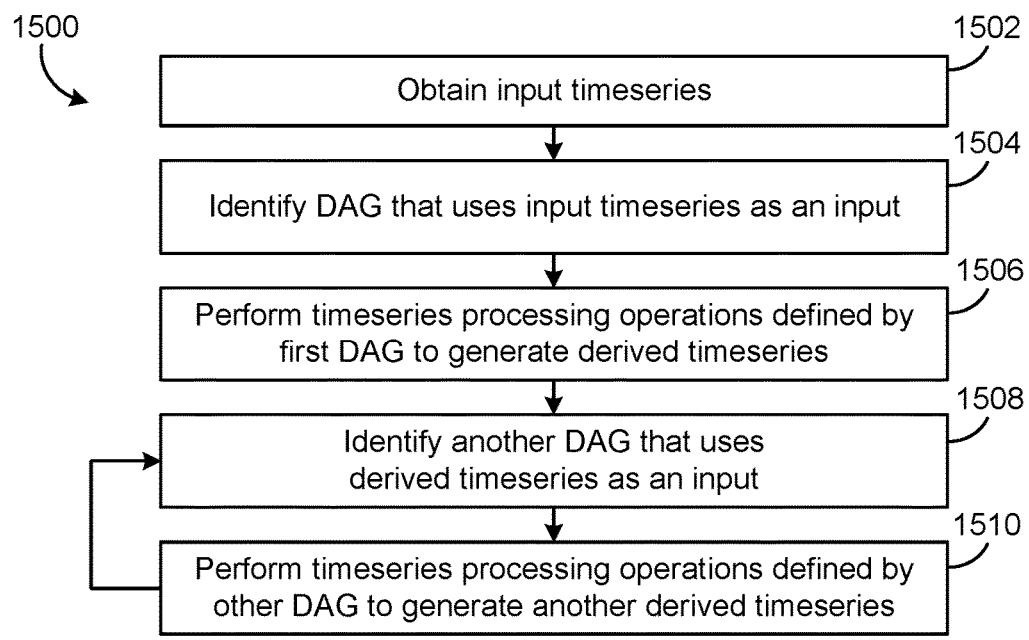
FIG. 15B is a flowchart of an iterative timeseries processing process which can be performed by the system of FIG. 14, according to some embodiments.

Referring now to FIG. 15B, a flowchart of an iterative timeseries processing process 1500 is shown, according to an exemplary embodiment. Process 1500 can be performed by one or more components of web services platform 102 or system 1400 as previously described. Process 1500 is shown to include obtaining an input timeseries (step 1502) and identifying a first DAG that uses the input timeseries as an input (step 1504). Process 1500 is shown to include performing timeseries processing operations defined by the DAG to generate a derived timeseries (step 1506). The derived timeseries can be stored in timeseries storage 214.

The derived timeseries can then be treated as an input to timeseries service 228. For example, process 1500 is shown to include identifying another DAG that uses the derived timeseries as an input (step 1508) and performing timeseries processing operations defined by the other DAG to generate another derived timeseries (step 1510). In some embodiments, the DAG that uses the derived timeseries as an input is different from the first DAG that uses the input timeseries as an input. The derived timeseries created in step 1510 can be stored in timeseries storage 214.

The derived timeseries created in step 1510 can also be treated as another input to timeseries service 228. Steps 1508-1510 can be repeated iteratively until the timeseries created in the most recent iteration of step 1510 is not used as an input to any of the DAGs. Each iteration of steps 1508-1510 may generate another derived timeseries which can be stored in timeseries storage 214.

Cloud-Based Feedback Control

Figure 16:
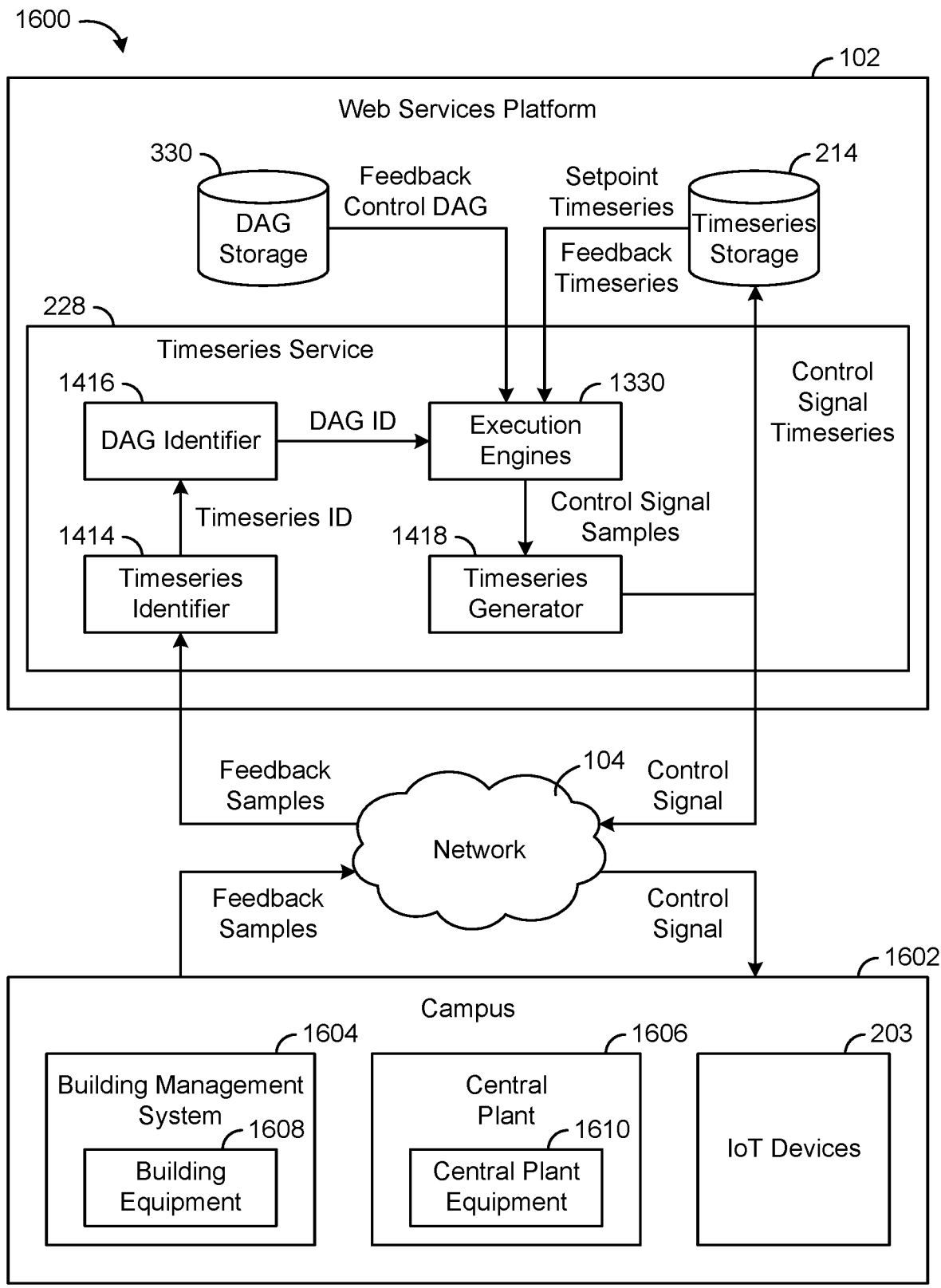
FIG. 16 is a block diagram of a cloud-based feedback control system including the web services platform of FIG. 2, according to some embodiments.

Referring now to FIG. 16, a block diagram of a cloud-based feedback control system 1600 is shown, according to an exemplary embodiment. Conventional feedback control systems typically include an on-site feedback controller located nearby the controlled system or device. For example, control systems for building equipment typically include a controller located within in the same building or facility as the building equipment. The building equipment provide measurements or other feedback to the controller via a wired or wireless communications link (e.g., Ethernet, Wi-Fi, etc.) or local area network (LAN) within the building. The controller uses the feedback from the building equipment to generate an appropriate control signal, which is provided as a control input to the building equipment via the wired or wireless communications link or LAN.

Cloud-based feedback control system 1600 makes use of web services platform 102 to provide feedback control as a cloud-based platform service. For example, control system 1600 is shown to include web services platform 102, network 104, and campus 1602. In brief overview, campus 1602 provides feedback samples (e.g., measurements, samples of monitored variables, system states, values of points, etc.) to web services platform 102 via network 104. Web services platform 102 uses the feedback samples as an input to a cloud-based feedback control algorithm (e.g., PID, MPC, etc.) that uses the feedback samples to generate control signal samples. In some embodiments, web services platform 102 treats the feedback samples as samples of an input timeseries and processes the input timeseries using a feedback control DAG. The feedback control DAG converts the feedback samples into control signal samples, which are a type of derived timeseries samples. The control signal samples are then provided as a control signal back to campus 102 via network 104.

As described above, web services platform 102 can be distributed across multiple processing devices and can therefore make use of multiple processing devices to generate the control signals. The use of multiple processing devices provides several advantages relative to conventional on-site controllers that use only a single processing device. For example, the use of multiple remote processing devices reduces need for in-building processing devices or other on-site resources such as physical controllers located at the building site. The use of multiple remote processing devices also reduces processing latency relative to a single processing device by enabling parallel processing across multiple devices. For example, some portions of the feedback control DAG can be processed by a first processing device, whereas other portions of the feedback control DAG can be processed by other processing devices. This allows for faster execution and more responsive feedback control relative to conventional on-site controllers with a single processing device.

Campus 1602 is shown to include a building management system (BMS) 1604, a central plant 1606, and IoT devices 203. A BMS is, in general, a system of devices configured to control, monitor, and manage equipment in or around a building or building area. For example, BMS 1604 may include a HVAC system, a security system, a lighting system, a fire alerting system, any other system that is capable of managing building functions or devices, or any combination thereof. An example of a BMS which can be used as BMS 1604 is described in detail in U.S. patent application Ser. No. 14/717,593, titled "Building Management System for Forecasting Time Series Values of Building Variables" and filed May 20, 2015, the entire disclosure of which is incorporated by reference herein.

BMS 1604 may include a variety of building subsystems including, for example, a building electrical subsystem, an information communication technology (ICT) subsystem, a security subsystem, a HVAC subsystem, a lighting subsystem, a lift/escalators subsystem, and a fire safety subsystem. In various embodiments, the building subsystems can include fewer, additional, or alternative subsystems. For example, the building subsystems can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a variable state or condition of a building.

Each of the building subsystems can include any number of devices, controllers, and connections (referred to collectively as building equipment 1608) for completing its individual functions and control activities. Building equipment 1608 can include HVAC equipment such as chillers, boilers, air handling units, economizers, field controllers, supervisory controllers, actuators, sensors (e.g., temperature, humidity, flow rate, etc.), and other devices for controlling the temperature, humidity, airflow, or other variable conditions within a building. In some embodiments, building equipment 1608 includes lighting equipment such as light fixtures, ballasts, lighting sensors, dimmers, or other devices configured to controllably adjust the amount of light provided to a building space. In some embodiments, building equipment 1608 includes security equipment such as occupancy sensors, video surveillance cameras, digital video recorders, video processing servers, intrusion detection devices, access control devices and servers, or other security-related devices.

Central plant 1606 may include one or more subplants that consume resources from utilities (e.g., water, natural gas, electricity, etc.) to satisfy the loads of campus 1602. For example, central plant 1606 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve campus 1602. Each of the subplants may include a variety of central plant equipment 1610 (e.g., boilers, chillers, heat recovery chillers, cooling towers, thermal energy storage tanks, batteries, etc.). The subplants may be configured to convert input resources (e.g., electricity, water, natural gas, etc.) into output resources (e.g., cold water, hot water, chilled air, heated air, etc.) that are provided to buildings of campus 1602. An exemplary central plant which may be used as central plant 1606 is described U.S. patent application Ser. No. 14/634,609, titled "High Level Central Plant Optimization" and filed Feb. 27, 2015, the entire disclosure of which is incorporated by reference herein.

IoT devices 203 may include any of a variety of sensors, physical devices or equipment (e.g., actuators, electronics, vehicles, home appliances, etc.), and/or other items having network connectivity which enable IoT devices 203 to communicate with web services platform 102. For example, IoT devices 203 can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. In some embodiments, IoT devices 203 include some or all of devices 112-116, 122-126, 132-136, and 142-146, as described with reference to FIG. 1.

Campus 1602 is shown providing feedback samples to web services platform 102, specifically to timeseries service 228. The feedback samples can include measurements obtained by sensors of building equipment 1608, central plant equipment 1610, and/or IoT devices 203. For example, the sensors can collect various types of measurements and send the measurements to timeseries service 228. In some embodiments, each measurement includes a measured value indicating a value of the measured variable and a timestamp indicating a time at which the variable was measured. Feedback samples may also include monitored variables or states of building equipment 1608, central plant equipment 1610, and/or IoT devices 203. For example, building equipment 1608, central plant equipment 1610, and/or IoT devices 203 may store internal variables that represent equipment states (e.g., equipment on/off, door open/closed, equipment operating at 50% capacity, etc.). Each feedback sample may include a value of a particular variable or state and a timestamp indicating a time at which the variable or state was observed.

Timeseries service 228 is shown to include a timeseries identifier 1414, a DAG identifier 1416, execution engines 1330, and a timeseries generator 1418. Timeseries identifier 1414 can receive the feedback samples from campus 1602 and can identify a timeseries associated with each incoming data sample. The identified timeseries for a particular feedback sample may be a feedback timeseries (i.e., a type of raw data timeseries) stored in timeseries storage 214 that contains a series of values for the same variable or data source. For example, feedback timeseries can be stored in the following format:

[<key, timestamp$_1$, value$_1$>, <key, timestamp$_2$, value$_2$>, <key, timestamp$_3$, value$_3$>]

where key is an identifier of the source of the feedback samples (e.g., timeseries ID, sensor ID, etc.), timestamp$_i$ identifies a time associated with the ith sample, and value$_i$ indicates the value of the ith sample. Timeseries identifier 1414 can use attributes of the incoming feedback samples (e.g., data source, sensor ID, variable ID, etc.) to identify a particular feedback timeseries associated with each sample and can provide the identified timeseries ID to DAG identifier 1416.

DAG identifier 1416 can use the timeseries ID received from timeseries identifier 1414 to identify one or more feedback control DAGs that use the identified feedback timeseries as an input. As described above, a DAG may be a predefined sequence of processing operations that transform one or more input timeseries into one or more output timeseries. Accordingly, each DAG may have one or more input timeseries associated therewith. A feedback control DAG is a type of DAG that defines a feedback control algorithm. For example, a feedback control DAG can accept the feedback samples as an input and can define a sequence of processing operations that transform the feedback samples into control signal samples using a feedback control technique. The processing operations defined by a feedback control DAG can implement any of a variety of feedback control techniques including, for example, state-based control, extremum seeking control (ESC), proportional-integral (PI) control, proportional-integral-derivative (PID) control, model predictive control (MPC), or any other type of feedback control technique.

One example of a feedback control DAG is a PID control DAG. A PID control DAG may cause execution engines 1330 to perform a set of processing operations typically performed by a PID controller. For example, the PID control DAG may cause execution engines 1330 to calculate a difference between the feedback timeseries and a setpoint timeseries. The calculated difference can be saved as an error timeseries. The PID control DAG may cause execution engines 1330 to apply a proportional gain to the error timeseries (e.g., multiplying the error timeseries by a proportional gain parameter) to generate a proportional gain component of the control signal.

The PID control DAG may cause execution engines 1330 to integrate the error timeseries over time to calculate an integrated error value for each sample of the error timeseries. The integrated error values may be summations (i.e., numerical integrals) of the most recent error sample and a predetermined number of previous error samples. In some embodiments, the integrated error values are saved as another derived timeseries (e.g., an integrated error timeseries). The PID control DAG may cause execution engines 1330 to apply an integral gain to the integrated error timeseries (e.g., multiplying the integrated error timeseries by an integral gain parameter) to generate an integral gain component of the control signal.

The PID control DAG may cause execution engines 1330 calculate a derivative error value for each sample of the error timeseries. The derivative error values may be the slope or rate-of-change of the error timeseries relative to the previous sample. In some embodiments, the derivative error values are saved as another derived timeseries (e.g., a derivative error timeseries). The PID control DAG may cause execution engines 1330 to apply a derivative gain to the derivative error timeseries (e.g., multiplying the derivative error timeseries by a derivative gain parameter) to generate a derivative gain component of the control signal. The PID control DAG may cause execution engines 1330 to combine (e.g., sum) the proportional gain component, the integral gain component, and the derivative gain component to generate a value for the next sample of the control signal timeseries.

In some embodiments, the feedback timeseries for each feedback control DAG are stored as attributes of the feedback control DAG in DAG storage 330. DAG identifier 1416 can read such information from DAG storage 330 to determine which of the stored feedback control DAGs use the identified feedback timeseries as an input. DAG identifier 1416 can then provide an indication of the identified feedback control DAGs to execution engines 1330 in the form of one or more DAG IDs.

In some embodiments, DAG identifier 1416 also identifies any other input timeseries that are required as inputs to the identified feedback control DAGs. For example, a feedback control DAG for controlling the temperature of a building space may have two inputs. The first input may be a feedback timeseries that includes temperature measurements collected from a temperature sensor within the building space. The second input may be a setpoint timeseries that defines the temperature setpoint for the building space at each of a plurality of times. DAG identifier 1416 can identify all of the timeseries that are required as inputs to the identified feedback control DAGs and can provide an indication of the identified timeseries to execution engines 1330 in the form of one or more timeseries IDs.

As described above, execution engines 1330 can include a C #engine 1332, a Python engine 1334, or any other engine configured to perform the operations defined by a DAG. In some embodiments, execution engines 1330 include timeseries operators 306. Execution engines 1330 can receive the incoming feedback samples from campus 1602, as well as the DAG IDs and timeseries IDs from DAG identifier 1416. Execution engines 1330 can retrieve the identified feedback control DAGs from DAG storage 330 and can retrieve the identified timeseries from timeseries storage 214 and execute the feedback control DAGs, using the feedback samples as an input, to generate control signal samples. Each control signal sample may be the result of a timeseries processing operation that uses the feedback samples (and possibly other timeseries samples) as an input. In some embodiments, each control signal sample includes a key (e.g., a timeseries ID), a timestamp, and a value.

The timeseries retrieved from timeseries storage 214 may include samples of any of the input timeseries required by one or more of the feedback control DAGs, including (in some instances) previous samples of the feedback timeseries. For example, some types of feedback control such as PI control or PID control may require both the current value of a feedback signal (i.e., the most recent feedback sample) and one or more past values of the feedback signal (i.e., one or more previous samples of the same feedback timeseries) in order to generate a control signal sample (e.g., to evaluate an integrated error over time). Accordingly, execution engines 1330 may retrieve one or more past samples of the feedback timeseries from timeseries storage 214. Execution engines 1330 may use the past samples of the feedback timeseries in combination with the current sample of the feedback timeseries and any other input timeseries to execute the feedback control DAG, thereby generating control signal samples.

Timeseries generator 1418 can use the control signal samples to generate a control signal timeseries. The control signal timeseries can be stored in timeseries storage 214 and/or provided as an output of web services platform 102. Timeseries generator 1418 is shown providing a control signal to network 104 and campus 1602. The control signal can include the value of the most recent control signal sample generated by executing the feedback control DAG and/or the control signal timeseries generated by timeseries generator 1418. Campus 1602 can use the control signal to operate building equipment 1608, central plant equipment 1610, and/or IoT devices 203. For example, the control signal can be provided as an input to building equipment 1608 (e.g., via BMS 1604), central plant equipment 1610 (e.g., via central plant 1606), and/or IoT devices 203.

Advantageously, the cloud-based feedback control provided by web services platform 102 can replace local (e.g., on-site or in-building) control loops typically used by conventional feedback control systems. Instead of requiring a local feedback controller to receive feedback data and generate control signals, the feedback data are provided as an input to web services platform 102. Web services platform 102 identifies and executes feedback control DAGs that provide the functionality of a feedback controller. The output of the feedback control DAGs are control signal samples that can be provided back to campus 102 and used to control the equipment of campus 102.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A web services platform for monitoring and controlling equipment of a building management system, the web services platform comprising one or more processing circuits and one or more memory storing instructions thereon that, when executed by the one or more processors, cause the one or more processors to perform:

a data collector, implemented by the one or more processing circuits, configured to collect feedback samples provided by one or more sensors of the building management system and generate a feedback timeseries comprising a plurality of the feedback samples;

a timeseries service, implemented by the one or more processing circuits, configured to:

select, from a plurality of feedback control workflows, a feedback control workflow that uses the feedback timeseries as an input and defines one or more processing operations to be applied to the feedback samples of the feedback timeseries;

perform the one or more processing operations defined by the feedback control workflow to generate a control signal timeseries comprising a set of control signal samples; and provide a control signal comprising at least one of the control signal samples or the control signal timeseries to controllable building equipment of the building management system that operate using the control signal.

2. The web services platform of claim 1, wherein generating the control signal timeseries comprises:

transforming one or more samples of the feedback timeseries into one or more samples of the control signal samples by applying the one or more samples of the feedback timeseries as an input to the feedback control workflow; and assembling the control signal samples to form the control signal timeseries.

3. The web services platform of claim 1, wherein the timeseries service is configured to:

identify one or more other timeseries required as inputs to the feedback control workflow, wherein the one or more other timeseries comprise a setpoint timeseries comprising a plurality of setpoint samples, each of the plurality of setpoint samples defining a setpoint corresponding to one of the feedback samples; and generate an enriched feedback control workflow comprising the feedback control workflow, the feedback timeseries, and the one or more other timeseries.

4. The web services platform of claim 1, further comprising a directed acyclic graph (DAG) database storing a plurality of feedback DAGs, each of the plurality of feedback DAGs defining a particular feedback control workflow;

wherein the timeseries service comprises a DAG identifier configured to determine whether any of the plurality of feedback DAGs stored in the DAG database are configured to use the feedback timeseries as an input.

5. The web services platform of claim 1, wherein the feedback control workflow comprises at least one of a state-based control workflow, an extremum seeking control (ESC) workflow, a proportional-integral (PI) control workflow, a proportional-integral-derivative (PID) control workflow, or a model predictive control (MPC) workflow that causes the timeseries service to transform the feedback timeseries into the control signal timeseries using a feedback control technique.

6. The web services platform of claim 1, wherein the feedback control workflow comprises a proportional-integral-derivative (PID) control workflow that causes the timeseries service to:

generate an error timeseries comprising a plurality of error samples, each of the error samples indicating a difference between one or the feedback samples and a corresponding setpoint; and generate the control signal timeseries by applying a set of PID control operations to the error timeseries.

7. The web services platform of claim 6, wherein applying the set of PID control operations to the error timeseries comprises:
generating an integrated error timeseries based on a plurality of the error samples;
generating a derivative error timeseries based on a change in value between consecutive samples of the error timeseries;
calculating a proportional gain component by multiplying the error timeseries by a proportional gain parameter;
calculating an integral gain component by multiplying the integrated error timeseries by an integral gain parameter;
calculating a derivative gain component by multiplying the derivative error timeseries by a derivative gain parameter; and
combining the proportional gain component, the integral gain component, and the derivative gain component to generate the control signal timeseries.

8. The web services platform of claim 1, wherein the timeseries service is configured to select the feedback control workflow by:
analyzing inputs of the plurality of feedback control workflows including the feedback control workflow; and
selecting the feedback control workflow from the plurality of feedback control workflows in response to a determination that the input of the feedback control workflow utilizes the feedback timeseries.

9. A web services platform for monitoring and controlling equipment of a building management system, the web services platform comprising:
one or more computer-readable storage media having instructions stored thereon that, when executed by one or more processors, cause the one or more processors to:
collect feedback samples provided by one or more sensors of the building management system and generate a feedback timeseries comprising a plurality of the feedback samples;
select, from a plurality of feedback control workflows, a feedback control workflow that uses the feedback timeseries as an input and defines one or more processing operations to be applied to the feedback samples of the feedback timeseries;
perform the one or more processing operations defined by the feedback control workflow to generate a control signal timeseries comprising a set of control signal samples; and
provide a control signal comprising at least one of the control signal samples or the control signal timeseries to controllable building equipment of the building management system that operate using the control signal.

10. The web services platform of claim 9, wherein generating the control signal timeseries comprises:
transforming one or more samples of the feedback timeseries into one or more samples of the control signal samples by applying the one or more samples of the feedback timeseries as an input to the feedback control workflow; and
assembling the control signal samples to form the control signal timeseries.

11. The web services platform of claim 9, wherein the instructions cause the one or more processors to:
identify one or more other timeseries required as inputs to the feedback control workflow, wherein the one or more other timeseries comprise a setpoint timeseries comprising a plurality of setpoint samples, each of the plurality of setpoint samples defining a setpoint corresponding to one of the feedback samples; and
generate an enriched feedback control workflow comprising the feedback control workflow, the feedback timeseries, and the one or more other timeseries.

12. The web services platform of claim 9, further comprising a directed acyclic graph (DAG) database storing a plurality of feedback DAGs, each of the plurality of feedback DAGs defining a particular feedback control workflow;
wherein the instructions cause the one or more processors to determine whether any of the plurality of feedback DAGs stored in the DAG database are configured to use the feedback timeseries as an input.

13. The web services platform of claim 9, wherein the feedback control workflow comprises at least one of a state-based control workflow, an extremum seeking control (ESC) workflow, a proportional-integral (PI) control workflow, a proportional-integral-derivative (PID) control workflow, or a model predictive control (MPC) workflow that causes the one or more processors to transform the feedback timeseries into the control signal timeseries using a feedback control technique.

14. The web services platform of claim 9, wherein the feedback control workflow comprises a proportional-integral-derivative (PID) control workflow that causes the one or more processors to:
generate an error timeseries comprising a plurality of error samples, each of the error samples indicating a difference between one or the feedback samples and a corresponding setpoint; and
generate the control signal timeseries by applying a set of PID control operations to the error timeseries.

15. The web services platform of claim 14, wherein applying the set of PID control operations to the error timeseries comprises:
generating an integrated error timeseries based on a plurality of the error samples; and
generating a derivative error timeseries based on a change in value between consecutive samples of the error timeseries;
calculating a proportional gain component by multiplying the error timeseries by a proportional gain parameter;
calculating an integral gain component by multiplying the integrated error timeseries by an integral gain parameter;
calculating a derivative gain component by multiplying the derivative error timeseries by a derivative gain parameter; and
combining the proportional gain component, the integral gain component, and the derivative gain component to generate the control signal timeseries.

16. A method for monitoring and controlling equipment of a building management system, the method comprising:
collecting, by a processing circuit, feedback samples provided by one or more sensors of the building management system and generating a feedback timeseries comprising a plurality of the feedback samples;
selecting, by the processing circuit, from a plurality of feedback control workflows, a feedback control workflow that uses the feedback timeseries as an input and defines one or more processing operations to be applied to the feedback samples of the feedback timeseries;
performing, by the processing circuit, the one or more processing operations defined by the feedback control workflow to generate a control signal timeseries comprising a set of control signal samples; and providing, by the processing circuit, a control signal comprising at least one of the control signal samples or the control signal timeseries to controllable building equipment of the building management system that operate using the control signal.

17. The method of claim 16, wherein generating the control signal timeseries comprises:

transforming, by the processing circuit, one or more samples of the feedback timeseries into one or more samples of the control signal samples by applying the one or more samples of the feedback timeseries as an input to the feedback control workflow; and assembling, by the processing circuit, the control signal samples to form the control signal timeseries.

18. The method of claim 16, further comprising:

identifying, by the processing circuit, one or more other timeseries required as inputs to the feedback control workflow, wherein the one or more other timeseries comprise a setpoint timeseries comprising a plurality of setpoint samples, each of the plurality of setpoint samples defining a setpoint corresponding to one of the feedback samples; and generating, by the processing circuit, an enriched feedback control workflow comprising the feedback control workflow, the feedback timeseries, and the one or more other timeseries.

19. The method of claim 16, wherein the feedback control workflow comprises at least one of a state-based control workflow, an extremum seeking control (ESC) workflow, a proportional-integral (PI) control workflow, a proportional-integral-derivative (PID) control workflow, or a model predictive control (MPC) workflow that causes the feedback timeseries to be transformed into the control signal timeseries using a feedback control technique.

20. The method of claim 16, wherein the feedback control workflow comprises a proportional-integral-derivative (PID) control workflow and performing the one or more processing operations defined by the feedback control workflow comprises:

generating, by the processing circuit, an error timeseries comprising a plurality of error samples, each of the error samples indicating a difference between one or the feedback samples and a corresponding setpoint; and generating, by the processing circuit, the control signal timeseries by applying a set of PID control operations to the error timeseries.

21. The method of claim 20, wherein applying the set of PID control operations to the error timeseries comprises:

generating, by the processing circuit, an integrated error timeseries based on a plurality of the error samples; and generating, by the processing circuit, a derivative error timeseries based on a change in value between consecutive samples of the error timeseries;

calculating, by the processing circuit, a proportional gain component by multiplying the error timeseries by a proportional gain parameter;

calculating, by the processing circuit, an integral gain component by multiplying the integrated error timeseries by an integral gain parameter;

calculating, by the processing circuit, a derivative gain component by multiplying the derivative error timeseries by a derivative gain parameter; and combining the proportional gain component, the integral gain component, and the derivative gain component to generate the control signal timeseries.

* * * * *

UNITED STATES PATENT AND TRADEMARK OFFICE
CERTIFICATE OF CORRECTION

PATENT NO. : 11,307,538 B2
APPLICATION NO. : 16/142578
DATED : April 19, 2022
INVENTOR(S) : Youngchoon Park et al.

It is certified that error appears in the above-identified patent and that said Letters Patent is hereby corrected as shown below:

On the Title Page

In Item (54) and in the Specification, Column 1, Lines 1-2, please delete "WEB SERVICES PLATFORM WITH CLOUD-EASED FEEDBACK CONTROL" and insert -- WEB SERVICES PLATFORM WITH CLOUD-BASED FEEDBACK CONTROL --

Signed and Sealed this
Twenty-seventh Day of February, 2024

Katherine Kelly Vidal
*Director of the United States Patent and Trademark Office*